(12) United States Patent
Wang et al.

(10) Patent No.: US 10,992,924 B2
(45) Date of Patent: Apr. 27, 2021

(54) STEREO-POLARIMETRIC COMPRESSED ULTRAFAST PHOTOGRAPHY (SP-CUP) SYSTEMS AND METHODS

(71) Applicant: California Institute of Technology, Pasadena, CA (US)

(72) Inventors: Lihong Wang, Arcadia, CA (US); Peng Wang, Pasadena, CA (US); Jinyang Liang, Varennes (CA); Liren Zhu, Sunnyvale, CA (US)

(73) Assignee: California Institute of Technology, Pasadena, CA (US)

( * ) Notice: Subject to any disclaimer, the term of this patent is extended or adjusted under 35 U.S.C. 154(b) by 0 days.

(21) Appl. No.: 16/810,630

(22) Filed: Mar. 5, 2020

(65) Prior Publication Data

US 2020/0288110 A1  Sep. 10, 2020

Related U.S. Application Data

(60) Provisional application No. 62/813,974, filed on Mar. 5, 2019.

(51) Int. Cl.
*H04N 13/282* (2018.01)
*H04N 13/254* (2018.01)
*H04N 13/25* (2018.01)
*H04N 13/161* (2018.01)

(52) U.S. Cl.
CPC ......... *H04N 13/282* (2018.05); *H04N 13/161* (2018.05); *H04N 13/25* (2018.05); *H04N 13/254* (2018.05)

(58) Field of Classification Search
USPC .......................................... 348/47
See application file for complete search history.

(56) References Cited

U.S. PATENT DOCUMENTS

| | | | |
|---|---|---|---|
| 7,859,679 B2 * | 12/2010 | Bouma | G01N 21/4795 356/479 |
| 9,645,377 B2 | 5/2017 | Bosworth et al. | |
| 10,473,916 B2 | 11/2019 | Wang et al. | |
| 2001/0017727 A1 * | 8/2001 | Sucha | G01N 21/4795 359/326 |
| 2011/0260036 A1 | 10/2011 | Baraniuk et al. | |
| 2013/0046175 A1 * | 2/2013 | Sumi | A61B 8/08 600/431 |
| 2016/0157828 A1 * | 6/2016 | Sumi | G01N 29/262 702/189 |
| 2017/0163971 A1 | 6/2017 | Wang et al. | |
| 2018/0224552 A1 | 8/2018 | Wang et al. | |

OTHER PUBLICATIONS

Aghababaei Nejad, et al., "Polarization investigation of laser-induced breakdown plasma emission from Al, Cu, Mo, W, and Pb elements using nongated detector," J. Laser Appl. 30, 022005 (2018).

(Continued)

*Primary Examiner* — Behrooz M Senfi
(74) *Attorney, Agent, or Firm* — Sheila Martinez-Lemke; Weaver Austin Villeneuve & Sampson LLP

(57) ABSTRACT

Systems and methods for stereo-polarimetric compressed-sensing ultrafast imaging.

21 Claims, 40 Drawing Sheets

(56) References Cited

OTHER PUBLICATIONS

Astapenko, V., et al., "Polarization mechanism for bremsstrahlung and radiative recombination in a plasma with heavy ions," Plasma Phys. Rep. vol. 28, No. 4, (2002) pp. 303-311.
Baker, et al., High resolution imaging of photosynthetic activities of tissues, cells and chloroplasts in leaves, J. Exp. Bot. 52, 615-621 (2001).
Balistreri, et al., "Tracking Femtosecond Laser Pulses in Space and Time" Science 294, 1080-1082 (2001).
Barty, A. et al. "Ultrafast single-shot diffraction imaging of nanoscale dynamics" Nature Photonics 2, 415-419 (2008).
Batabyal, S. et al. "Label-free optical detection of action potential in mammalian neurons," Biomedical Optics Express 8, (2017) pp. 3700-3713.
Bergmann, et al., "Multiwavelength fluorescence lifetime imaging by TCSPC" Proc. SPIE, Advanced Photon Counting Techniques, vol. 6372, (2006) pp. 637204-1-637204-6.
Berezin, et al., "Fluorescence Lifetime Measurements and Biological Imaging" Chemical Reviews 110, pp. 2641-2684 (2010).
Bindhu, S. et al., "Measurement of the absolute fluorescence quantum yield of rhodamine B solution using a dual-beam thermal lens technique," Journal of Physics D: Applied Physics 29, (1996) pp. 1074-1079.
"Bioucas-Dias, et al., ""A new TwIST: two-step iterative shrinkage/thresholding algorithms for image restoration,"" IEEE Trans. Image Process. 16, 2992-3004 (2007)".
"Bonse, J., et al., ""Time-and space-resolved dynamics of melting, ablation, and solidification phenomena induced by femtosecond laser pulses in germanium,"" Phys. Rev. B 74, 134106 (2006)".
Bosworth, B. T. et al., "High-speed flow microscopy using compressed sensing with ultrafast laser pulses," Opt. Express 23, 10521-10532 (2015).
Bowlan, P., et al., "Measuring the spatiotemporal electric field of tightly focused ultrashort pulses with sub-micron spatial resolution" Optics Express 16, 13663-13675 (2008).
Bradley, et al. "High-speed gated x-ray imaging for ICF target experiments (invited)" Review of Scientific Instruments 63(10), Oct. 1992, pp. 4813-4817.
Brennen, C. E. "Cavitation and bubble dynamics" Cambridge University Press, 2014 pp. 1-254. [Part 1].
Brenner, et al., "Single-bubble sonoluminescence," Rev. Mod. Phys. 74,425 (2002).
Brinks, D., Klein, A. J. & Cohen, A. E., "Two-photon lifetime imaging of voltage indicating proteins as a probe of absolute membrane voltage," Biophys. J. 109, 914-921 (2015).
Bub, G., et al., ""Temporal pixel multiplexing for simultaneous high-speed, high-resolution imaging," Nat. Methods 7,209 (2010)".
Byun, et al., "A Model of Laser-Induced Cavitation" Japanese Journal of Applied Physics 43, (2004) pp. 621-630.
Cadby, A., et al., "Mapping the Fluorescence Decay Lifetime of a Conjugated Polymer in a Phase-Separated Blend Using a Scanning Near-Field Optical Microscope" Nano Letters vol. 5, No. 11, (2005) pp. 2232-2237.
Campbell, J.B. & Wynne, R.H., "Introduction to Remote Sensing," Fifth Edition, Guilford Press (2011) pp. 1-23. [ISBN 978-1-60918-176-5].
Candes, E. J., "The restricted isometry property and its implications for compressed sensing," C.R. Math. 346, 589-592 (2008).
Chang, D. E., "Quantum nonlinear optics —photon by photon" Nature Photonics 8, 685-694 (2014).
Chen, M., et al., "3D differential phase contrast microscopy" Biomedical Optics Express 7, (2016) pp. 3940-3950.
Choi, W. et al. "Tomographic phase microscopy" Nature Methods 4, 717 (2007) pp. 1-3.
Corsi, M. et al., "Temporal and spatial evolution of a laser-induced plasma from a steel target," Appl. Spectrosc. 57, 715-721 (2003),.
Cotte, Y. et al. "Marker-free phase nanoscopy" Nature Photonics 7, 113 (2013) pp. 1-5.

Davis, T. J., et al., "Phase-contrast imaging of weakly absorbing materials using hard X-rays," Nature 373, pp. 595-598 (1995).
De Giacomo, et al., "Laser-induced plasma emission: from atomic to molecular spectra" J. Phys. D: Appl. Phys. 50 (2017) 183002 (17pp).
De Lucia Jr, F. C., Gottfried, J. L., Munson, C. A. & Miziolek, A. W., "Current status of standoff LIBS security applications at the United States Army Research Laboratory (2009)".
Dikmelik, et al., "Femtosecond and nanosecond laser-induced breakdown spectroscopy of trinitrotoluene," Opt. Express 16, 5332-5337 (2008).
"Ehn, A. et al., ""Frame: femtosecond videography for atomic and molecular dynamics,"" Light Sci Appl. 6, el 7045 (2017)".
El-Desouki, M. et al. "CMOS Image Sensors for High Speed Applications" Sensors 9, 430-444 (2009).
Etoh, G. T. et al. "The Theoretical Highest Frame Rate of Silicon Image Sensors" Sensors 17, 483 (2017).
Farber, et al., "Compressive 4D spectra-volumetric imaging," Optics Letters vol. 41, No. 22, Nov. 15, 2016, pp. 5174-5177.
Ferraro, J. R., "Introductory Raman spectroscopy, 2nd Ed." Academic press (2003) pp. 1-195. <ISBN:978-0-12-254105-6> [Part I].
Ferraro, J. R., "Introductory Raman spectroscopy, 2nd Ed." Academic press (2003) pp. 196-434. <ISBN:978-0-12-254105-6> [Part 2].
Fuller, P. "An introduction to high-speed photography and photonics," Imaging Sci. J. 57, 293-302 (2009).
Gabolde, et al., "Single-frame measurement of the complete spatiotemporal intensity and phase of ultrashort laser pulses using wavelength-multiplexed digital holography" the Journal of the Optical Society of America B 25, (2008) pp. A25-A33.
Gabolde, et al., "Single-shot measurement of the full spatiotemporal field of ultrashort pulses with multi-spectral digital holography" Optics Express 14, 11460-11467 (2006).
Gage, S. H. "Modern dark-field microscopy and the history of its development" Transactions of the American Microscopical Society vol. 39, No. 2, Apr. 1920, pp. 95-141.
Gao and Wang, "A review of snapshot multidimensional optical imaging: measuring photon tags in parallel" Phys Rep., Feb. 29, 2016, vol. 616, pp. 1-37. <doi:10.1016/j.physrep.2015.12.004>.
Gao, et al., "A review of snapshot multidimensional optical imaging: measuring photon tags in parallel" Phys Rep. 2016 Feb. 29; 616, pp. 1-37. <doi:10.1016/j.physrep.2015.12.004>.
Gao, et al., "Single-shot compressed ultrafast photography at one hundred billion frames per second," Nature 516(7529) 74-77 (2014).
Gao, G. et al., "Ultrafast all-optical solid-state framing camera with picosecond temporal resolution," Opt. Express 25, 8721-8729 (2017).
Gao, L., "Compact Image Slicing Spectrometer (ISS) for hyperspectral fluorescence microscopy," Opt. Express 17, 12293-12308 (2009).
Gorkic, et al., "Analysis of sonic waves generated during laser engraving of printed circuits," Int. J. Adv. Manuf. Technol. 42, 138-144 (2009).
Gosta, M. & Grgic, M., "Accomplishments and challenges of computer stereo vision," 52nd Intl. Symp. ELMAR-2010, Sep. 15-17, 2010, Zadar, Croatia, pp. 57-64.
Gruev, et al., "Dual-tier thin film polymer polarization imaging sensor," Opt. Express 18, 19292-19303 (2010).
Gruev, V., et al., "CCD polarization imaging sensor with aluminum nanowire optical filters," Opt. 13 Express 18, pp. 19087-19094 (2010).
Hamamatsu Photonics K.K. "Guide to Streak Cameras" Hamamatsu Corp., Hamamatsu City, Japan, 2008, pp. 1-12. <www.hamamatsu.com>.
Hawking, S. W. "Gravitational Radiation from Colliding Black Holes" Physical Review Letters 26, (1971) pp. 1344-1346.
Heikkila, J. & Silven, 0., "A four-step camera calibration procedure with implicit image correction," Proceedings of IEEE Computer Society Conference on Computer Vision and Pattern Recognition, 1106-1112 (1997).
Herink, G., et al., "Real-time spectral interferometry probes the internal dynamics of femtosecond soliton molecules" Science 356, 50-54 (2017).
Heist, S., et al., "High-speed 3D shape measurement by GOBO projection of aperiodic sinusoidal fringes: a performance analysis," Proc. SPIE 10667-106670A (2018).

(56) References Cited

OTHER PUBLICATIONS

Heshmat, et al., "Single-shot ultrafast imaging using parallax-free alignment with a tilted lenslet array," CLEO: 2014 STu3E.7 (2014).
Hirschmuller, H., "Accurate and efficient stereo processing by semi-global matching and mutual information," 2005 IEEE Computer Society Conference on Computer Vision and Pattern Recognition (CVPR'05) 807-814 (2005).
Hirschmuller, H., "Stereo processing by semiglobal matching and mutual information," IEEE Trans. Pattern Anal. Mach. Intell. 30, 328-341 (2008).
Hori, et al., "Laser-Induced Breakdown Plasma Observed using a Streak Camera," Jpn. J. Appl. Phys. 47, 4759 (2008).
Horstmeyer, et al., "Diffraction tomography with Fourier ptychography" Optica 3, (2016) pp. 827-835.
Hunt, J. et al., "Metamaterial Apertures for Computational Imaging," Science 339, 310-313 (2013).
Jagadeesh, G. et al. "Needleless vaccine delivery using micro-shock waves" Clinical and vaccine immunology: CVI 18, (2011) pp. 539-545.
Jiang, H. et al. "Quantitative 3D imaging of whole, unstained cells by using X-ray diffraction microscopy" Proceedings of the National Academy of Sciences 107, 11234-11239 (2010).
Jiang, X. et al. "Chaos-assisted broadband momentum transformation in optical microresonators" Science 358, 344-347 (2017).
Johnsen, S. et al., "Polarization vision seldom increases the sighting distance of silvery fish," Current Biology 26, R752-R754 (2016).
Jung, J. et al. "Label-free non-invasive quantitative measurement of lipid contents in individual microalgal cells using refractive index tomography," Scientific Reports 8, 6524 (2018) pp. 1-10.
Kakue, et al., "Digital Light-in-Flight Recording by Holography by Use of a Femtosecond Pulsed Laser" IEEE Journal of Selected Topics in Quantum Electronics vol. 18, No. 1, Jan./Feb. 2012, pp. 479-485.
Kandel, M. E. et al. "Three-dimensional intracellular transport in neuron bodies and neurites investigated by label-free dispersion-relation phase spectroscopy" Cytometry Part A 91, (2017) pp. 519-526.
Kim, et al., "Picosecond-resolution phase-sensitive imaging of transparent objects in a single shot," Science Advances 6(3) eaay6200 (2020).
Kim, G. et al. "Measurements of three-dimensional refractive index tomography and membrane deformability of live erythrocytes from Pelophylax nigromaculatus," Scientific Reports 8, 9192 (2018) pp. 1-8.
Kim, K. et al., "Tomographic active optical trapping of arbitrarily shaped objects by exploiting 3D refractive index maps," Nature Communications 8, 15340 (2017) pp. 1-8.
Kim, T. et al. White-light diffraction tomography of unlabelled live cells. Nature Photonics 8, 256 (2014) pp. 1-20.
Kodama, R. et al. "Fast heating of ultrahigh-density plasma as a step towards laser fusion ignition" Nature 412, (2001) pp. 798-802.
Kodama, R., et al., "Development of a two-dimensional space-resolved high-speed sampling camera," Rev. Sci. Instrum. 70, (1999) pp. 625-628.
Komatsu, et al. "Dependence of reconstructed image characteristics on the observation condition in light-in-flight recording by holography" The Journal of the Optical Society of America A, vol. 22, No. 8, Aug. 2005, pp. 1678-1682.
Lazaros, N., Sirakoulis, G. C. & Gasteratos, A., "Review of stereo vision algorithms: from software to hardware," Int. J. Optomechatronics 2, 435-462 (2008).
Le Blanc, et al., "Single-shot measurement of temporal phase shifts by frequency-domain holography" Optics Letters 25, (2000) pp. 764-766.
Leuthold, J., et al., "Nonlinear silicon photonics" Nature Photonics 4, (2010) pp. 535-544.
Li, Z. et al. "Single-Shot Visualization of Evolving Laser Wakefields Using an All-Optical Streak Camera," Physical Review Letters 113, (2014) pp. 085001-1-085001-5.
Li, Z., et al., "Single-shot tomographic movies of evolving light-velocity objects," Nat. Commun. 5, 3085 (2014).
Liang et al., "Single-shot real-time video recording of a photonic Mach cone induced by a scattered light pulse" Science Advances, Jan. 20, 2017, 3(1): e1601814, pp. 1-7.
Liang, et al., "Encrypted three-dimensional dynamic imaging using snapshot time-of-flight compressed ultrafast photography," Scientific Reports 5(15504) (2015) pp. 1-10.
Liang, et al., "Homogeneous one-dimensional optical lattice generation using a digital micromirror devicebased high-precision beam shaper," J Micro. Nanolithogr. MEMS MOEMS 11, 023002 (2012).
Liang, et al., "Single-shot real-time femtosecond imaging of temporal focusing," Light-Science & Applications 7(1) 42 (2018).
Liang, J. and Wang, L. V., "Single-shot ultrafast optical imaging," Optica 5, 1113-1127 (2018).
Liang, J., et al., "Grayscale laser image formation using a programmable binary mask," Opt. Eng. 51, 108201 (2012).
Liu, X., et al., "Singleshot compressed optical-streaking ultra-high-speed photography," Optics Letters 44, 1387-1390, (2019).
Liu, X., "Single-shot real-time sub-nanosecond electron imaging aided by compressed sensing: Analytical modeling and simulation" Micron 117, 47-54 (2019).
Llull, et al., "Coded aperture compressive temporal imaging," Optics Express 21, 10526-10545 (2013).
Lohse, et al., "Snapping shrimp make flashing bubbles" Nature 413, 477-478 (2001). <https://doi.org/10.1038/35097152>.
Lu, Y., "Compressed ultrafast spectral-temporal photography" Phys. Rev. Lett. 122, (2019) pp. 193904-1-193904-4.
Luo, Y. et al., "Talbot holographic illumination nonscanning (Thin) fluorescence microscopy," Laser Photonics Rev. 8, L71-L75 (2014).
Majd, et al., "Polarization resolved laser induced breakdown spectroscopy by single shot nanosecond pulsed Nd: Y AG laser," Opt. Laser Eng. 48, (2010) pp. 750-753.
Markiewicz-Keszycka, et al., "Laser-induced breakdown spectroscopy (LIBS) for food analysis: a review," Trends Food, Sci. Technol. 65, (2017) pp. 80-93.
Marquet, P. et al. "Digital holographic microscopy: a noninvasive contrast imaging technique allowing quantitative visualization of living cells with subwavelength axial accuracy," Optics Letters 30, pp. 468-470 (2005).
Marquet, P., et al. "Review of quantitative phase-digital holographic microscopy: promising novel imaging technique to resolve neuronal network activity and identify cellular biomarkers of psychiatric disorders" vol. 1 (SPIE, 2014) pp. 020901-1-020901-15.
Maths, N. H. et al. "Snapshots of laser wakefields" Nature Physics 2, 749-753 (2006).
Medhi, B., et al., "Shock-wave imaging by density recovery from intensity measurements" Applied Optics vol. 57, No. 15, May 20, 2018, pp. 4297-4308.
Merritt, D., et al., "Dark Matter Spikes and Annihilation Radiation from the Galactic Center" Physical Review Letters 88, 191301 (2002).
Michel, A. P., "Applications of single-shot laser-induced breakdown spectroscopy," Spectrochim. Acta B 65, 185-191 (2010).
Mikami, H., Gao, L. & Goda, K., "Ultrafast optical imaging technology: principles and applications of emerging methods," Nanophotonics 5, 98-110 (2016).
Milchberg, et al., "Polarization of recombination radiation from nonequilibrium plasmas," Physical Review A, vol. 26, No. 2, Aug. 1982, pp. 1023-1029.
Mochizuki, F. et al., "Single-event transient imaging with an ultra-high-speed temporally compressive multiaperture CMOS image sensor," Opt. Express 24, 4155-4176 (2016).
Morgner, et al. "Sub-two-cycle pulses from a Kerr-lens mode-locked Ti:sapphire laser" Optics Letters vol. 24, No. 6, (1999) pp. 411-413.
Momose, et al., "Phase-contrast X—ray computed tomography for observing biological soft tissues" Nature Medicine 2, 473-475 (1996).
Nakagawa, et al., "Sequentially timed all-optical mapping photography (STAMP)," Nat. Photon. 8, 695-700 (2014).

(56) References Cited

OTHER PUBLICATIONS

Ng, R. et al., "Light field photography with a hand-held plenoptic camera," Comput. Sci. Tech. Rep. 2, 1-11 (2005).
Nguyen, et al., "Gradient light interference microscopy for 3D imaging of unlabeled specimens" Nature Communications 8, 210 (2017) pp. 1-9.
Nomarski, G. & Weill, A. Application àla métallographie des méthodes interférentielles àdeux ondes polarisées. Revue de métallurgie 52, 121-134 (1955).
Nordin, G. P., Meier, J. T., Deguzman, P. C. & Jones, M. W., "Micropolarizer array for infrared imaging polarimetry," J. Opt. Soc. Am. A 16, 1168-1174 (1999).
Oh, S. et al. "Label-Free Imaging of Membrane Potential Using Membrane Electromotility" Biophysical Journal 103, (2012) pp. 11-18.
Okabe, K. et al., "Intracellular temperature mapping with a fluorescent polymeric thermometer and fluorescence lifetime imaging microscopy," Nat. Commun. 3, 705 (2012) pp. 1-7.
Pégard, N. C. et al. Three-dimensional scanless holographic optogenetics with temporal focusing (3D-Shot). Nature Communications 8, 1228 (2017) pp. 1-14.
Penczak Jr, et al., "The mechanism for continuum polarization in laser induced breakdown spectroscopy of Si (111)," Spectrochim. Acta B 74, 3-10 (2012).
Pian, Q., et al., "Compressive hyperspectral time-resolved widefield fluorescence lifetime imaging" Nat. Photon. 11, 411-414 (2017).
Pfeiffer, F. et al. "Hard-X-ray dark-field imaging using a grating interferometer" Nature Materials 7, 134 (2008).
Qian, Z. et al., "Structure, mechanical properties and surface morphology of the snapping shrimp claw," J. Mater. Sci. 53, 10666-10678 (2018).
Qian, B., et al., "Electron pulse broadening due to space charge effects in a photoelectron gun for electron diffraction and streak camera systems," Journal of Applied Physics 91, 462-468 (2002).
Rivenson, Yair, et al. "Multi-dimensional Imaging by Compressive Digital Holography." Chapt. 4, Multi-Dimensional Imaging (2014), pp. 75-99.
Rohrlich, D. et al., "Cherenkov radiation of superluminal particles" Physical Review A 66, 042102 (2002).
Rouan, D., et al., "The four-quadrant phase-mask coronagraph. I. Principle," Publications of the Astronomical Society of the Pacific 112, 1479 (2000).
Sabatke, D. S. et al., "Snapshot imaging spectropolarimeter," Opt. Eng. 41, (2002) pp. 1048-1055.
Santos Jr, D. et al. "Laser-induced breakdown spectroscopy for analysis of plant materials: a review" Spectrochim. Acta B 71, 3-13 (2012).
Sarafraz, et al., "Enhancing images in scattering media utilizing 72 stereovision and polarization," 2009 Workshop on Applications of Computer Vision (WACV) 1-8.
Selanger, et al., "Fluorescence lifetime studies of Rhodamine 6G in methanol," the Journal of Physical Chemistry 81, 1960-1963 (1977).
Serabyn, E., et al., "An image of an exoplanet separated by two diffraction beamwidths from a star" Nature 464, 1018 (2010).
Shen, Y. R. "The principles of nonlinear optics: Chapter 1" Wiley, 2003, Ch.1 pp. 1-12.
Shin, S., et al., "Super-resolution three-dimensional fluorescence and optical diffraction tomography of live cells using structured illumination generated by a digital micromirror device," Scientific Reports 8, 9183 (2018) pp. 1-8.
"Shiraga, H., et al.,""Two-dimensional sampling-image x-ray streak camera for ultrafast imaging of inertial confinement fusion plasmas,"" Rev. Sci. Instrum. 70, 620-623 (1999)".
Shrestha, S. et al. "High-speed multispectral fluorescence lifetime imaging implementation for in vivo applications" Optics Letters 35, 2558-2560 (2010).
Šiaulys, et al., "Direct holographic imaging of ultrafast laser damage process in thin films" Optics Letters vol. 39, No. 7, Apr. 1, 2014, pp. 2164-2167.

Solli, et al., "Optical rogue waves," Nature 450, Dec. 13, 2007, pp. 1054-1057.
Suzuki, T. et al. "Sequentially timed alloptical mapping photography (STAMP) utilizing spectral filtering," Opt. Express 23, 30512-30522 (2015).
Tamamitsu, M. et al. "Design for sequentially timed all-optical mapping photography with optimum temporal performance" Optics Letters vol. 40, No. 4, pp. 633-636 (2015).
Takeda, J. et al. "Time-resolved luminescence spectroscopy by the optical Kerr-gate method applicable to ultrafast relaxation processes" Physical Review B 62, pp. 10083-10087 (2000).
Tong, T., Li, J. & Longtin, J.P., Real-time control of ultrafast laser micromachining by laser-induced breakdown spectroscopy,Appl. Opt. 43, 1971-1980 (2004).
Tyo, J. S., "Hybrid division of aperture/division of a focalplane polarimeter for real-time polarization imagery without an instantaneous field-of-view error," Opt. Lett. 31, 2984-2986 (2006).
Velasco, E., "Ultrafast Camera Takes 1 Trillion Frames Per Second of Transparent Objects and Phenomena," Caltech, Jan. 17, 2020, pp. 1-2. <URL:https://www.caltech.edu/about/news/ultrafast-camera-takes-1-trillion-frames-second-transparent-objects-and-phenomena>.
Veysset, D. et al. Single-bubble and multibubble cavitation in water triggered by laser-driven focusing shock waves. Physical Review E 97, 053112 (2018).
Veysset, et al., "Interferometric analysis of laser-driven cylindrically focusing shock waves in a thin liquid layer" Scientific Reports 6, 24 (2016) pp. 1-7.
Vogel, et al., "Shock wave emission and cavitation bubble generation by picosecond and nanosecond optical breakdown in water" The Journal of the Acoustical Society of America 100, (1996) pp. 148-165.
Wang Jingge et al., "Temporal and Spatial Evolution of Laser-Induced Plasma from a Slag Sample" Plasma Sci. Technol. 17, 649 (2015) pp. 649-655.
Wang, P. & Menon, R., "Computational multispectral video imaging," J. Opt. Soc. Am. A 35, pp. 189-199 (2018).
Wang, P. & Menon, R., "Ultra-high-sensitivity color imaging via a transparent diffractive-filter array and computational optics," Optica 2, pp. 933-939 (2015).
Wetzstein, et al., "On plenoptic multiplexing and reconstruction," Int. J. Comput. Vis. 101, 384-400 (2013).
Wu, J.-L. et al., "Ultrafast laser-scanning time-stretch imaging at visible wavelengths," Light Sci. Appl. 6, e16196 (2017).
Yang, C. et al., "Optimizing codes for compressed ultrafast photography by the genetic algorithm," Optica 5, 147-151 (2018).
Yang, et al., "Compressed ultrafast photography by multi-encoding imaging," Laser Physics Letters 15(11) 116202 (2018).
Yeola, S., Kuk, D. & Kim, K.-Y., "Single-shot ultrafast imaging via spatiotemporal division of femtosecond laser pulses," J. Opt. Soc. Am. B 35, (2018) pp. 2822-2827.
Yu, Z., et al., "Efficiency and temporal response of crystalline Kerr media in collinear optical Kerr gating" Optics Letters vol. 36, No. 15, Aug. 1, 2011, pp. 2904-2906.
Yue, Q.-Y., et al., "One-shot time-resolved holographic polarization microscopy for imaging laser-induced ultrafast phenomena" Optics Express 25, 14182-14191 (2017).
Zdora, et al., "X-ray Phase-Contrast Imaging and Metrology through Unified Modulated Pattern Analysis" Physical Review Letters 118, 203903 (2017).
Zeng, X. et al. "High-resolution single-shot ultrafast imaging at ten trillion frames per second" arXiv:1807.00685 (2018).
Zernike, F. "How I discovered phase contrast" Science 121, Mar. 11, 1955, pp. 345-349. <URL:http://www.jstor.org/stable/1682470>.
Zewail, A. H. "Four-Dimensional Electron Microscopy" Science 328, 187-193 (2010).
Zhao, Y., et al., "Polarization-resolved laser-induced breakdown spectroscopy," Opt. Lett. 34, 494-496 (2009).
Zhou, R., et al., "Detecting 20 nm Wide Defects in Large Area Nanopatterns Using Optical Interferometric Microscopy" Nano Letters 13, 3716-3721 (2013).
Zhu, B., et al., "Image reconstruction by domain-transform manifold learning" Nature 555, 487 (2018).

(56) References Cited

OTHER PUBLICATIONS

Zhu, P., et al., "Complete measurement of spatiotemporally complex multi-spatial-mode ultrashort pulses from multimode optical fibers using delay-scanned wavelength-multiplexed holography" Optics Express 25, (2017) pp. 24015-24032.
Zhu, et al., "Space-and intensity-constrained reconstruction for compressed ultrafast photography," Optica 3(7) 694-697 (2016).
Zipunnikov, V. et al., "Functional principal component model for high-dimensional brain imaging," NeuroImage 58, 772-784 (2011).
U.S. Appl. No. 16/806,691, filed Mar. 2, 2020, Wang et al.
U.S. Appl. No. 17/030,056, filed Sep. 23, 2020, Wang et al.
Brennen, C. E. "Cavitation and bubble dynamics" Cambridge University Press, 2014 pp. 1-50. [Part 1].
Brennen, C. E. "Cavitation and bubble dynamics" Cambridge University Press, 2014 pp. 51-100. [Part 2].
Brennen, C. E. "Cavitation and bubble dynamics" Cambridge University Press, 2014 pp. 101-200. [Part3].
Brennen, C. E. "Cavitation and bubble dynamics" Cambridge University Press, 2014 pp. 201-254. [Part 4].

\* cited by examiner

US 10,992,924 B2

STEREO-POLARIMETRIC COMPRESSED ULTRAFAST PHOTOGRAPHY (SP-CUP) SYSTEMS AND METHODS

FEDERALLY SPONSORED RESEARCH OR DEVELOPMENT

This invention was made with government support under Grant No(s). EB016986 & CA186567 awarded by the National Institute of Health. The government has certain rights in the invention.

CROSS-REFERENCES TO RELATED APPLICATIONS

This application claims priority to and benefit of U.S. Provisional Patent Application No. 62/813,974, titled "Stereo-Polarimetric Compressed-Sensing Ultrafast Photography (SP-CUP)" and filed on Mar. 5, 2019, which is hereby incorporated by reference in its entirety and for all purposes.

FIELD

Certain embodiments generally relate to ultrafast imaging, and more specifically, to multidimensional optical imaging that may be implemented to image transient events in various areas such as, e.g., physics, chemistry, and/or biology.

BACKGROUND

Capturing transient scenes at a high imaging speed has been pursued by photographers for centuries, tracing back to Muybridge's 1878 recording of a horse in motion and Mach's 1887 photography of a supersonic bullet. However, not until the late 20th century were breakthroughs achieved in demonstrating high-speed imaging over one hundred thousand (100,000) frames per second. In particular, the introduction of electronic imaging sensors, such as the charge-coupled device (CCD) and complementary metal-oxide-semiconductor (CMOS), revolutionized high-speed photography, enabling acquisition rates up to ten million (10,000,000) frames per second. Despite the widespread impact of these sensors, further increasing frame rates of imaging systems using CCD or CMOS is fundamentally limited by their on-chip storage and electronic readout speed.

SUMMARY

Certain aspects pertain to a stereo-polarimetric compressed ultrafast photography (SP-CUP) system comprising a dual-channel subsystem configured to receive light scattered by a subject being imaged and pass light as a first series of images and a second series of images rotated with respect to the first set of images and a first camera configured to receive light relayed from the dual-channel generation system and record raw images of a first view and a second view. The SP-CUP system also includes a spatial-encoding subsystem configured to (i) receive light relayed from the dual-channel generation system, (ii) spatially encode the first series of images with a first set of complementary patterns to generate a third series of spatially-encoded images and a fourth series of spatially-encoded images, and (iii) spatially encode the second series of images with a second set of complementary patterns to generate a fifth series of spatially-encoded images and a sixth series of spatially-encoded images. The SP-CUP system also includes a streak camera configured to (i) receive light relayed from the spatial-encoding subsystem, (ii) temporally shear each spatially-encoded image of the third series of spatially-encoded images and spatiotemporally integrate the temporally sheared images to record a third view, (iii) temporally shear each spatially-encoded image of the fourth series of spatially-encoded images and spatiotemporally integrate the temporally sheared images to record a fourth view, (iv) temporally shear each spatially-encoded image of the fifth series of spatially-encoded images and spatiotemporally integrate the temporally sheared images to record a fifth view, (v) temporally shear each spatially-encoded image of the sixth series of spatially-encoded images and spatiotemporally integrate the temporally sheared image to record a sixth view. In one aspect, the streak camera is configured to temporally shear each spatially-encoded image by deflecting a distance according to time-of arrival. In one aspect, the streak camera comprises an entrance slit that is in a fully opened position while light is received from the spatial-encoding subsystem. In one aspect, the dual-channel subsystem comprises at least one optical component (e.g., at least one beamsplitter) configured to receive light and generate a first component relayed to the first camera and a second component relayed to the spatial-encoding subsystem.

In certain aspects, a SP-CUP system comprises one or more polarizers inserted into at least one of the first view, the second view, the third view, the fourth view, the fifth view, and the sixth view. In one aspect, the SP-CUP system further comprises a computing device in electrical communication with the first camera and the streak camera to receive image data, wherein the computing device is configured to reconstruct a series of stereo-polarimetric images using image data from one or more of the first view, second view, third view, fourth view, fifth view, and sixth view. In one case, the series of stereo-polarimetric images reconstructed by the SP-CUP system is at a frame rate of about 10 trillion frames per second. In another aspect, the SP-CUP system further comprises a computing device in electrical communication with the first camera and the streak camera to receive image data, wherein the computing device is configured to reconstruct a plurality of images using image data of one or more of the first view, second view, third view, fourth view, fifth view, and sixth view, wherein the plurality of images reconstructed are one of stereo-polarimetric images, plano-polarimetric images, and planar images.

In one aspect, the streak camera is configured to temporally shear each spatially-encoded image by deflecting a distance according to time-of arrival. In one example, the streak camera comprises an entrance slit that is in a fully opened position while light is received from the spatial-encoding subsystem. In one aspect, a SP-CUP system includes a pulsed laser configured to illuminate the subject being imaged with a single light pulse during image acquisition by the first camera and the streak camera.

In one aspect, the dual-channel subsystem comprises at least one optical component (e.g., a pair of dove prisms) configured to rotate the first view and/or the second view such that the first view is rotated by 180° in image coordinates relative to the second view. In one aspect, at least one of the first set of complimentary patterns and the second set of complimentary patterns is a pseudo-random binary spatial pattern. In one aspect, the spatial-encoding subsystem comprises a digital micromirror device, e.g., comprising an array of micromirrors, each micromirror operable to be in a first position to reflect light at a first reflection angle or in a second position to reflect light at a second reflection angle.

In one aspect, the SP-CUP system includes a spatial-encoding subsystem that receives a first light beam at a first region and a second light beam at a second region from the dual-channel generation system, wherein the third series of spatially-encoded images includes portions of the first series of images reflected by micromirrors in the first region that are in the first position, wherein the fourth series of spatially-encoded images includes portions of the first series of images reflected by micromirrors in the first region that are the second position, wherein the fifth series of spatially-encoded images includes portions of the second series of images reflected by micromirrors in the second region that are in the first position, and wherein the sixth series of spatially-encoded images includes portions of the second series of images reflected by micromirrors in the second region that are the second position. In one aspect, the SP-CUP system further comprises front optics configured to collect light scattered by the subject being imaged and relay light to the dual-channel subsystem.

Certain aspects pertain to a stereo-polarimetric compressed ultrafast photography (SP-CUP) method, comprising rotating a first series of images and/or a second series of images to be rotated with respect to each other, record the first series of images of a first view and the second series of images of a second view, spatially encoding the first series of images with a first set of complementary pseudo-random binary spatial patterns to generate a third series of spatially-encoded images and a fourth series of spatially-encoded images, spatially encoding the second series of images with a second set of complementary pseudo-random binary spatial patterns to generate a fifth series of spatially-encoded images and a sixth series of spatially-encoded images, temporally shearing each spatially-encoded image of the third series, spatiotemporally integrating the temporally sheared images, and recording the third view, temporally shearing each spatially-encoded image of the fourth series, spatiotemporally integrating the temporally sheared images, and recording the fourth view, temporally shearing each spatially-encoded image of the fifth series, spatiotemporally integrating the temporally sheared images, and recording the fifth view, and temporally shearing each spatially-encoded image of the sixth series, spatiotemporally integrating the temporally sheared images, and recording the sixth view. In one aspect, the SP-CUP method further comprises polarizing light of at least one of the first view, second view, third view, fourth view, fifth view, and sixth view. In one case, the SP-CUP method further comprises comprising reconstructing a series of stereo-polarimetric images using image data recorded from the first view, the second view, the third view, the fourth view, the fifth view, and the sixth view. In one example, the series of stereo-polarimetric images reconstructed is at a frame rate of about 10 trillion frames per second. In one aspect, the temporal shearing and spatiotemporally integrating is performed by a streak camera with an entrance slit in a fully opened position.

These and other features are described in more detail below with reference to the associated drawings.

DETAILED DESCRIPTION

Figure 1A:
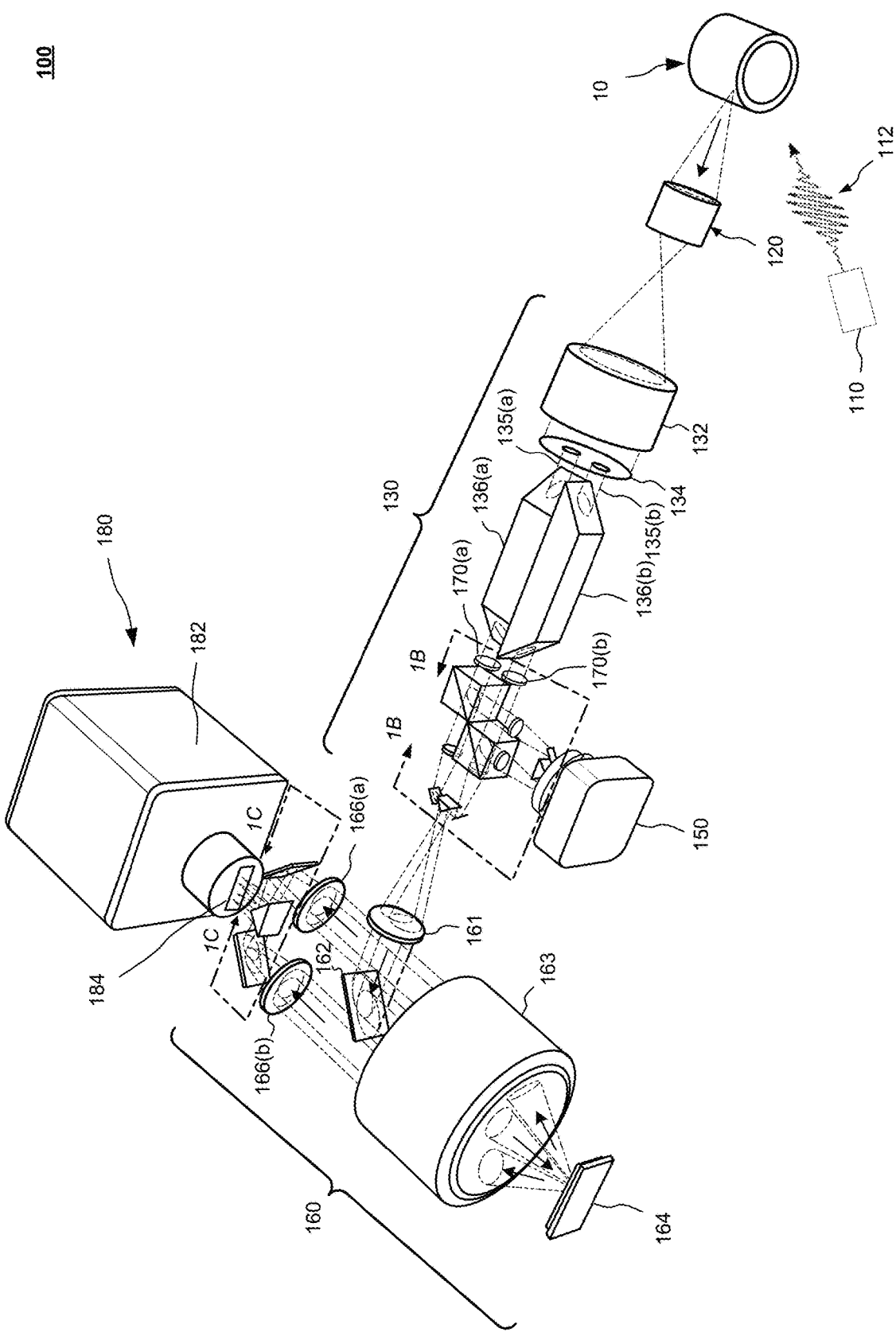
FIG. 1A is a schematic diagram of components of a stereo-polarimetric compressed ultrafast photography (SP-CUP) system, according to an implementation.

Different aspects are described below with reference to the accompanying drawings. The features illustrated in the drawings may not be to scale. In the following description, numerous specific details are set forth in order to provide a thorough understanding of the presented embodiments. The disclosed embodiments may be practiced without one or more of these specific details. In other instances, well-known operations have not been described in detail to avoid unnecessarily obscuring the disclosed embodiments. While the disclosed embodiments will be described in conjunction with the specific embodiments, it will be understood that it is not intended to limit the disclosed embodiments. Certain aspects pertain to stereo-polarimetric compressed ultrafast photography (SP-CUP) methods and/or systems that can be used, for example, to record light-speed high-dimensional events in a single exposure.

I. Introduction

A photon can be described by using a nine-dimensional matrix as discussed in Gao, L. & Wang, L. V., "A review of snapshot multidimensional optical imaging: Measuring photon tags in parallel," Phys. Rep. 616, 1-37 (2016), which is hereby incorporated by reference in its entirety. Each axis in this matrix represents a photon tag, which conveys rich information that lays down the foundation for a myriad of applications. The spatial coordinates (x, y, z), describing the position of an object, are key parameters in remote sensing. An example of remote sensing can be found in Campbell, J. B. & Wynne, R. H., "Introduction to remote sensing," Guilford Press (2011), which is hereby incorporated by reference in its entirety. The time of arrival (t), linking to the molecule's lifetime, enables scrutiny of the fluctuation in temperature, pH values, and membrane voltage such as discussed in Okabe, K. et al., "Intracellular temperature mapping with a fluorescent polymeric thermometer and fluorescence lifetime imaging microscopy," Nat. Commun. 3, 705 (2012) and Brinks, D., Klein, A. J. & Cohen, A. E., "Two-photon lifetime imaging of voltage indicating proteins as a probe of absolute membrane voltage," Biophys. J. 109, 914-921 (2015), which are hereby incorporated by reference in their entireties. The polar angles ($\theta$, $\psi$), characterizing the propagation direction of light rays, are fundamental to the development of light-field cameras. An example of light-field photography can be found in Ng, R. et al., "Light field photography with a hand-held plenoptic camera," Comput. Sci. Tech. Rep. 2, 1-11 (2005), which is hereby incorporated by reference in its entirety. The wavelength ($\lambda$), reflecting molecular energy levels, is closely related to the composition of materials. Related discussion can be found in Ferraro, J. R., "Introductory Raman spectroscopy, Academic press (2003), which is hereby incorporated by reference for this discussion. The polarization angle and ellipticity angle ($\psi$, $\chi$), associated with orientations of molecules, have been exploited in marine biology. An example of polarization angle being used in marine biology can be found in Johnsen, S. et al., "Polarization vision seldom increases the sighting distance of silvery fish," Curr. Biol. 26, R752-R754 (2016), which is hereby incorporated by reference in its entirety.

High-dimensional optical imaging can be used to maximally extract information carried by different photon tags. High-dimensional optical data is ubiquitously used in numerous fields of study, including, e.g., biomedicine, agriculture, and electronics. Some examples of their uses in these fields can be found in Zipunnikov, V. et al., "Functional principal component model for high-dimensional brain imaging," NeuroImage 58, 772-784 (2011), Shafi, U. et al., "Precision Agriculture Techniques and Practices: From Considerations to Applications," Sensors 19, 3796 (2019), and Sarbolandi, H., Lefloch, D. & Kolb, A., "Kinect range sensing: Structured-light versus Time-of-Flight Kinect," Computer vision and image understanding 139, 1-20 (2015), which are hereby incorporated by reference in their entireties. So far, most high-dimensional optical imaging systems acquire data through scanning. In brief, each measurement captures either a one-dimensional (1D) column or a two-dimensional (2D) slice. Examples of using 1D column or 2D slice can be found in Wu, J.-L. et al., "Ultrafast laser-scanning time-stretch imaging at visible wavelengths," Light Sci. Appl. 6, e16196 (2017) and Bosworth, B. T. et al., "High-speed flow microscopy using compressed sensing with ultrafast laser pulses," Opt. Express 23, 10521-10532 (2015), which are hereby incorporated by reference in their entireties. By repeating measurements with varied parameters in the other dimensions, a high-dimensional array can be assembled. However, this scheme is subject to the assumption that the event is precisely repeatable and also inherently suffers from a low measurement efficiency. An example of repeatability can be found in Hagen, N. A. & Kudenov, M. W., "Review of snapshot spectral imaging technologies," Opt. Eng. 52, 090901 (2013), which is hereby incorporated by reference in its entirety. An example of low measurement efficiency can be found in Hagen, N. A., Gao, L. S., Tkaczyk, T. S. & Kester, R. T., "Snapshot advantage: a review of the light collection improvement for parallel high-dimensional measurement systems," Opt. Eng. 51, 111702 (2012), which is hereby incorporated by reference in its entirety. To overcome these barriers, certain single-shot high-dimensional optical imaging techniques, in which multiple photon tags are measured in one acquisition, have been developed. An example of such a technique can be found in Javidi, B., Tajahuerce, E. & Andres, P., "Multi-dimensional imaging," John Wiley & Sons (2014), which is hereby incorporated by reference in its entirety. Such a parallel acquisition has maximized the captured information and measurement efficiency. Various single-shot high-dimensional optical imaging modalities have been implemented to measure different combinations of photon tags by three-dimensional [3D, e.g., spectral (x, y, $\lambda$), volumetric (x, y, z), and temporal (x, y, t)], four-dimensional [4D, e.g., spectro-volumetric (x, y, z, $\lambda$), plenoptic (x, y, u, v), and polarimetric (x, y, $\psi$, $\chi$)], and even five-dimensional [5D, e.g., spectro-polarimetric (x, y, $\lambda$, $\psi$, $\chi$)] imaging. Examples of spectral (x, y, $\lambda$) imaging can be found in Wang, P. & Menon, R., "Computational multispectral video imaging," J. Opt. Soc. Am. A 35, 189-199 (2018), Gao, L., Kester, R. T. & Tkaczyk, T. S., "Compact Image Slicing Spectrometer (ISS) for hyperspectral fluorescence microscopy," Opt. Express 17, 12293-12308 (2009), and Wang, P. & Menon, R., "Ultra-high-sensitivity color imaging via a transparent diffractive-filter array and computational optics," Optica 2, 933-939

(2015), which are hereby incorporated by reference in their entireties. An example of volumetric (x, y, z) imaging can be found in Luo, Y. et al., "Talbot holographic illumination nonscanning (THIN) fluorescence microscopy," *Laser Photonics Rev.* 8, L71-L75 (2014), which is hereby incorporated by reference in its entirety. An example of temporal (x, y, t) imaging can be found in Bub, G., Tecza, M., Helmes, M., Lee, P. & Kohl, P., "Temporal pixel multiplexing for simultaneous high-speed, high-resolution imaging," *Nat. Methods* 7, 209 (2010), which is hereby incorporated by reference in its entirety. An example of spectro-volumetric (x, y, z, $\lambda$) imaging can be found in Farber, V., Oiknine, Y., August, I. & Stern, A., "Compressive 4D spectro-volumetric imaging," *Opt. Lett.* 41, 5174-5177 (2016), which is hereby incorporated by reference in its entirety. An example of plenoptic (x, y, u, v) imaging can be found in Wetzstein, G., Ihrke, I. & Heidrich, W., "On plenoptic multiplexing and reconstruction," *Int. J. Comput. Vis.* 101, 384-400 (2013), which is hereby incorporated by reference in its entirety. Examples of polarimetric (x, y, $\psi$, $\chi$) imaging can be found in Nordin, G. P., Meier, J. T., Deguzman, P. C. & Jones, M. W., "Micropolarizer array for infrared imaging polarimetry," *J. Opt. Soc. Am. A* 16, 1168-1174 (1999) and Gruev, V., Perkins, R. & York, T., "CCD polarization imaging sensor with aluminum nanowire optical filters," *Opt. Express* 18, 19087-19094 (2010), which are hereby incorporated by reference in their entireties. An example of spectro-polarimetric (x, y, $\lambda$, $\psi$, $\chi$) imaging can be found in Sabatke, D. S. et al., "Snapshot imaging spectropolarimeter," *Opt. Eng.* 41, 1048-1055 (2002), which is hereby incorporated by reference in its entirety.

A subset of single-shot high-dimensional optical imaging is single-shot temporal imaging. The ability to capture photon's time of arrival without repeating the measurement opens new routes for understanding underlying mechanisms in physics, chemistry, and biology that are manifested in non-repeatable or difficult-to-reproduce events. Some examples in physics, chemistry, and biology can be found in Solli, D., Ropers, C., Koonath, P. & Jalali, B., "Optical rogue waves," *Nature* 450, 1054-1057 (2007) and Zewail, A. H., "Femtochemistry: Ultrafast Dynamics of the Chemical Bond:(Volumes I & II)," Vol. 3 (World Scientific, 1994), and Baker, N. R., Oxborough, K., Lawson, T. & Morison, J. I., "High resolution imaging of photosynthetic activities of tissues, cells and chloroplasts in leaves, *J. Exp. Bot.* 52, 615-621 (2001), which are hereby incorporated by reference for these examples. However, the speed of light imposes imaging frame rates at the billion-frame-per-second (Gfps) level, far beyond the readout speed of the state-of-the-art CCD and CMOS sensors. Some discussion of high-speed photography can be found in Mikami, H., Gao, L. & Goda, K., "Ultrafast optical imaging technology: principles and applications of emerging methods," *Nanophotonics* 5, 98-110 (2016) and Fuller, P. "An introduction to high-speed photography and photonics," *Imaging Sci. J.* 57, 293-302 (2009), which are hereby incorporated by reference in their entireties.

To achieve a sub-nanosecond frame interval, various active-illumination-based methods have been developed, including the frequency-dividing imaging, the angle-dividing imaging, sequentially-timed all-optical mapping photography, and frequency-domain streak imaging. However, these methods have a low sequence depth (i.e., the number of captured frames in each acquisition). An example of frequency-dividing imaging can be found in Ehn, A. et al., "FRAME: femtosecond videography for atomic and molecular dynamics," *Light Sci Appl.* 6, e17045 (2017), which is hereby incorporated by reference in its entirety. An example of angle-dividing imaging can be found in Yeola, S., Kuk, D. & Kim, K.-Y., "Single-shot ultrafast imaging via spatiotemporal division of femtosecond laser pulses," *J. Opt. Soc. Am. B* 35, 2822-2827 (2018), which is hereby incorporated by reference in its entirety. An example of sequentially-timed all-optical mapping photography can be found in Nakagawa, K. et al., "Sequentially timed all-optical mapping photography (STAMP)," *Nat. Photon.* 8, 695-700 (2014), which is hereby incorporated by reference in its entirety. Other examples of of sequentially-timed all-optical mapping photography can be found in Nakagawa, K. et al., "Sequentially timed all-optical mapping photography (STAMP)," *Nat Photon* 8, 695-700 (2014), Gao, G. et al., Ultrafast all-optical solid-state framing camera with picosecond temporal resolution," *Opt. Express* 25, 8721-8729 (2017), and Suzuki, T. et al. "Sequentially timed all-optical mapping photography (STAMP) utilizing spectral filtering," *Opt. Express* 23, 30512-30522 (2015), which are hereby incorporated by reference in their entireties. An example of frequency-domain streak imaging can be found in Li, Z., Zgadzaj, R., Wang, X., Chang, Y.-Y. & Downer, M. C., "Single-shot tomographic movies of evolving light-velocity objects," *Nat. Commun.* 5, 3085 (2014), which is hereby incorporated by reference in its entirety. In addition, relying on engineered illumination schemes to provide ultra-high temporal resolutions, these methods are inapplicable to imaging a variety of luminescent and color-selective objects—such as distant stars, bioluminescent molecules, and scattering targets. On the other hand, single-shot passive ultrafast imaging has been achieved by utilizing a streak camera—a traditional 1D ultrafast imager that converts time to space by deflecting photoelectrons with a sweeping voltage perpendicular to the device's narrow entrance slit. Recent advances have enabled 2D ultrafast imaging by a pinhole array, a dimension reduction fiber bundle, and a tilted lenslet array. An example of a pinhole array can be found in Shiraga, H., Nakasuji, M., Heya, M. & Miyanaga, N., "Two-dimensional sampling-image x-ray streak camera for ultrafast imaging of inertial confinement fusion plasmas," *Rev. Sci. Instrum.* 70, 620-623 (1999), which is hereby incorporated by reference in its entirety. An example of a dimension reduction fiber bundle can be found in Kodama, R., Okada, K. & Kato, Y., "Development of a two-dimensional space-resolved high-speed sampling camera," *Rev. Sci. Instrum.* 70, 625-628 (1999), which is hereby incorporated by reference in its entirety. An example of a tilted lenslet array can be found in Heshmat, B., Satat, G., Barsi, C. & Raskar, R., "Single-shot ultrafast imaging using parallax-free alignment with a tilted lenslet array," CLEO: 2014 STu3E.7 (2014), which is hereby incorporated by reference in its entirety. However, these methods suffer from limited sampling in the field of view (FOV).

In certain aspects, the stereo-polarimetric compressed ultrafast photography (SP-CUP) systems and/or methods disclosed herein can overcome the problems of the active-illumination-based methods discussed above. The SP-CUP systems and/or methods, in certain examples, can provide the world's fastest single-shot high-dimensional imaging modality to date. By combining compressed sensing, streak imaging, stereoscopy, and polarimetry, SP-CUP systems and/or methods provide single-shot passive ultrafast imaging that can capture non-repeatable five-dimensional (x, y, z, t, $\psi$) evolving phenomena at picosecond temporal resolution. In certain aspects, SP-CUP systems and/or methods can capture images at up to 10 trillion frames per second. For example, the SP-CUP system may generate a plurality of stereo-polarimetric images at a frame rate of about 10 trillion frames per second.

In certain aspects, SP-CUP systems and/or methods advance imaging capabilities over available CUP techniques by providing simultaneous and efficient ultrafast recording of polarization in three-dimensional space. Some examples of conventional CUP techniques can be found in Liang, J., Zhu, L. & Wang, L. V., "Single-shot real-time femtosecond imaging of temporal focusing," Light Sci. Appl. 7, 42 (2018), Liang, J. et al., "Single-shot real-time video recording of photonic Mach cone induced by a scattered light pulse," Sci. Adv. 3, e1601814 (2017), Liang, J., Gao, L., Hai, P., Li, C. & Wang, L. V., "Encrypted three-dimensional dynamic imaging using snapshot time-of-flight compressed ultrafast photography," Sci. Rep. 5, 15504 (2015), and Gao, L., Liang, J., Li, C. & Wang, L. V., "Single-shot compressed ultrafast photography at one hundred billion frames per second," *Nature* 516, 74-77 (2014); which are hereby incorporated by reference in their entireties. Compared with available single-shot ultrafast imaging techniques, certain aspects of SP-CUP methods and/or systems have advantages in light throughput, sequence depth, as well as spatiotemporal resolution and scalability in high-dimensional imaging. An example of an available single-shot ultrafast imaging technique can be found in Liang, J. and Wang, L. V., "Single-shot ultrafast optical imaging," Optica 5, 1113-1127 (2018), which is hereby incorporated by reference in its entirety.

Simultaneous and efficient ultrafast recording of multiple photon tags that are carried in optical signals may contribute to high-dimensional optical imaging and characterization in numerous fields. Existing high-dimensional optical imaging techniques that record space and polarization cannot detect the time of photon arrival owing to the limited speeds of the state-of-the-art electronic sensors. In certain aspects, SP-CUP methods and/or systems overcome this limitation, recording light-speed high-dimensional events in a single exposure. SP-CUP methods and/or systems combine compressed sensing and streak imaging with stereoscopy and polarimetry to achieve video-recording of five photon tags (x, y, z: space; t: time of arrival; and ψ: angle of polarization) at, e.g., 100 billion frames per second in single shot. Certain implementations of SP-CUP methods and/or systems have been used to perform spatiotemporal characterization of polarization dynamics in early-stage plasma emission from laser-induced breakdown with a picosecond temporal resolution (See, e.g., Section IV(A)(1)). These SP-CUP methods and/or systems have allowed for three-dimensional real-time imaging of the polarization properties of a single ultrashort laser pulse propagating in a scattering medium. The SP-CUP methods and/or systems, particularly as implemented to achieve the world's fastest single-shot high-dimensional camera, are expected to inspire widespread applications in, e.g., ultrafast physics, chemistry, and biology.

Certain aspects pertain to stereo-polarimetric compressed ultrafast photography (SP-CUP) systems and methods capable of real-time five-dimensional imaging. Capturing multiple photon tags at the same time provide technical advantages and is poised for diverse applications. While available high-dimensional optical imaging techniques have recorded information in space, polarization, and spectrum among the nine photon tags, the time of arrival has been scarcely detected thus far because it poses pressing requirements for imaging speeds much beyond the bandwidth of electronic sensors. In certain aspects, SP-CUP methods and/or systems have overcome this barrier.

In certain examples, SP-CUP methods and/or systems integrate stereoscopy and polarimetry to provide the world's fastest 2D camera. SP-CUP methods and/or systems can achieve simultaneous recording of information from five photon tags—three-dimensional space, time of arrival, and polarization angle—in real time. The SP-CUP methods and/or systems may provide advantages over other single-shot ultrafast optical imaging. Compared with conventional CUP techniques, SP-CUP methods and/or systems use an additional spatial dimension and also have polarization sensitivity. Conventional CUP techniques can suffer from an inaccurate and ambiguous detection of time of arrival when the transient event is in 3D space. In contrast, with the five-dimensional imaging capability, SP-CUP methods and/or systems, in some examples, have been used to record the full evolution of pulse propagation with clearly resolved 3D spatial positions and polarization states over time at 100 billion frames per second, which offers an accurate detection of time of arrival. Some examples of conventional CUP systems are discussed in U.S. patent application Ser. No. 15/505,853, titled "COMPRESSED-SENSING ULTRAFAST PHOTOGRAPHY (CUP) and filed on Feb. 22, 2017 and associated U.S. patent publication 2018/0224552 published on Aug. 9, 2018; and in U.S. patent application Ser. No. 15/441,207, titled "MULTIPLE-VIEW COMPRESSED-SENSING ULTRAFAST PHOTOGRAPHY (MV-CUP) and filed on Feb. 23, 2017 and associated U.S. patent publication 2017/0163971 published on Jun. 8, 2017; all of which are hereby incorporated by reference in their entireties. SP-CUP methods and/or systems provide high-dimensional optical imaging that can be implemented in next-generation measurement methodologies that rely on real-time, direct visualization rather than repetitive, indirect probing. SP-CUP methods and/or systems hold promise for imaging high-dimensional transient events in, e.g., physics, chemistry, and biology that are of great scientific significance and interest.

II. Stereo-Polarimetric Compressed Ultrafast Photography (SP-CUP) Systems

Certain aspects are directed to stereo-polarimetric compressed ultrafast photography (SP-CUP) systems that include a dual-channel generation subsystem, a spatial-encoding subsystem, and a temporal-encoding subsystem. For example, FIG. 1A is a schematic diagram of components of a stereo-polarimetric compressed ultrafast photography (SP-CUP) system 100, according to an implementation. The SP-CUP system 100 includes front optics 120, a dual-channel generation subsystem 130, a first camera with a lens and a two-dimensional light detector 150 (e.g., a CCD such as the GS3-U3-32S4M-C made by Point Grey®), a spatial-encoding subsystem 160, a first polarizer filter 170(*a*), and a second polarizer filter 170(*a*), and a temporal-encoding subsystem 180 with a streak camera 182 having a fully-opened entrance slit 184. The SP-CUP system 100 is shown during an exemplary image acquisition operation while an illumination source 110 provides an illumination beam 112 to a subject 10 being imaged. In this example, the subject 10 is in the form of a dynamic scene. In one aspect, the illumination source 110 is a component of the SP-CUP system 100, and in another aspect, the illumination source 110 is separate from the SP-CUP system 100. Although not shown, the SP-CUP system 100 may also include a computing system such as, e.g., the computing system 490 described with respect to FIG. 4.

The front optics 120 can collect incident light reflected from the subject 10 being imaged and relay light to the dual-channel generation subsystem 130. The front optics 120 may include one or more optical components configurable to vary magnification according to the field-of-view desired. The dual-channel generation subsystem 130 can generate two beams 135(a) and 135(b) (optical channels) and rotate at least one of the beams so that one beam is rotated (e.g., by 180°) with respect to the other beam. The dual-channel generation subsystem 130 is also configured to split each of the two beams into a first component and a second component and relay the first component to the two-dimensional light detector 150. The dimensional light detector 150 is configured to record images at two projected views (View 1-2) that are rotated (e.g., by 180 degrees) with respect to one another. The dual-channel generation subsystem 130 is also configured to relay the second component of the two beams to the spatial-encoding subsystem 160. The spatial-encoding subsystem 160 can spatially encode projected views with one or more pseudo-random patterns (e.g., pseudo-random binary patterns). For example, the spatial-encoding subsystem 160 may receive the second component relayed from the dual-channel generation subsystem 130, generate four light beams masked with complementary patterns, and relay the four light beams to the temporal-encoding subsystem 180 having a streak camera 182. The spatial-encoding subsystem 160 can output spatially-encoded images including (i) images of the subject superimposed with a first pseudo-random binary spatial pattern, (ii) images of the subject superimposed with a complementary first pseudo-random binary pattern (i.e. complementary to the first pseudo-random binary spatial pattern), (iii) images of the subject superimposed with a second pseudo-random binary spatial pattern, and (iv) images of the subject superimposed with a complementary second pseudo-random binary pattern (i.e. complementary to the second pseudo-random binary spatial pattern). The temporally-encoding subsystem 180 can temporally shear the spatially-encoded images relayed from the spatial-encoding subsystem 160 and record images at least four time-sheared projected views (Views 3-6). The four time-sheared views (Views 3-6) include a first set of time-sheared projected views (Views 3 and 4) with complementary spatial encoding and a second set of time-sheared projected views (Views 5 and 6) with complementary spatial encoding.

The dual-channel generation subsystem 130 includes a stereoscope objective 132 (e.g., 1× stereoscope objective) and a dual-channel generating device 134 that can generate a first optical channel 135(a) and a second optical channel 135(b). In this example, the dual-channel generating device 134 may be in the form of a pair of diaphragms. In one aspect, the pair of diaphragms is a plate with two apertures separated by a distance where each aperture has a lens. The dual-channel generation subsystem 130 also includes a first dove prism 136(a) and a second dove prism 136(b) that are positioned in parallel and rotated (along their axial direction) relative to each other. For example, the pair of dove prisms 136(a), 136(b) (e.g., PS994 dove prisms by Thorlabs®) may be at 90° rotation relative to each other.

Figure 1B:
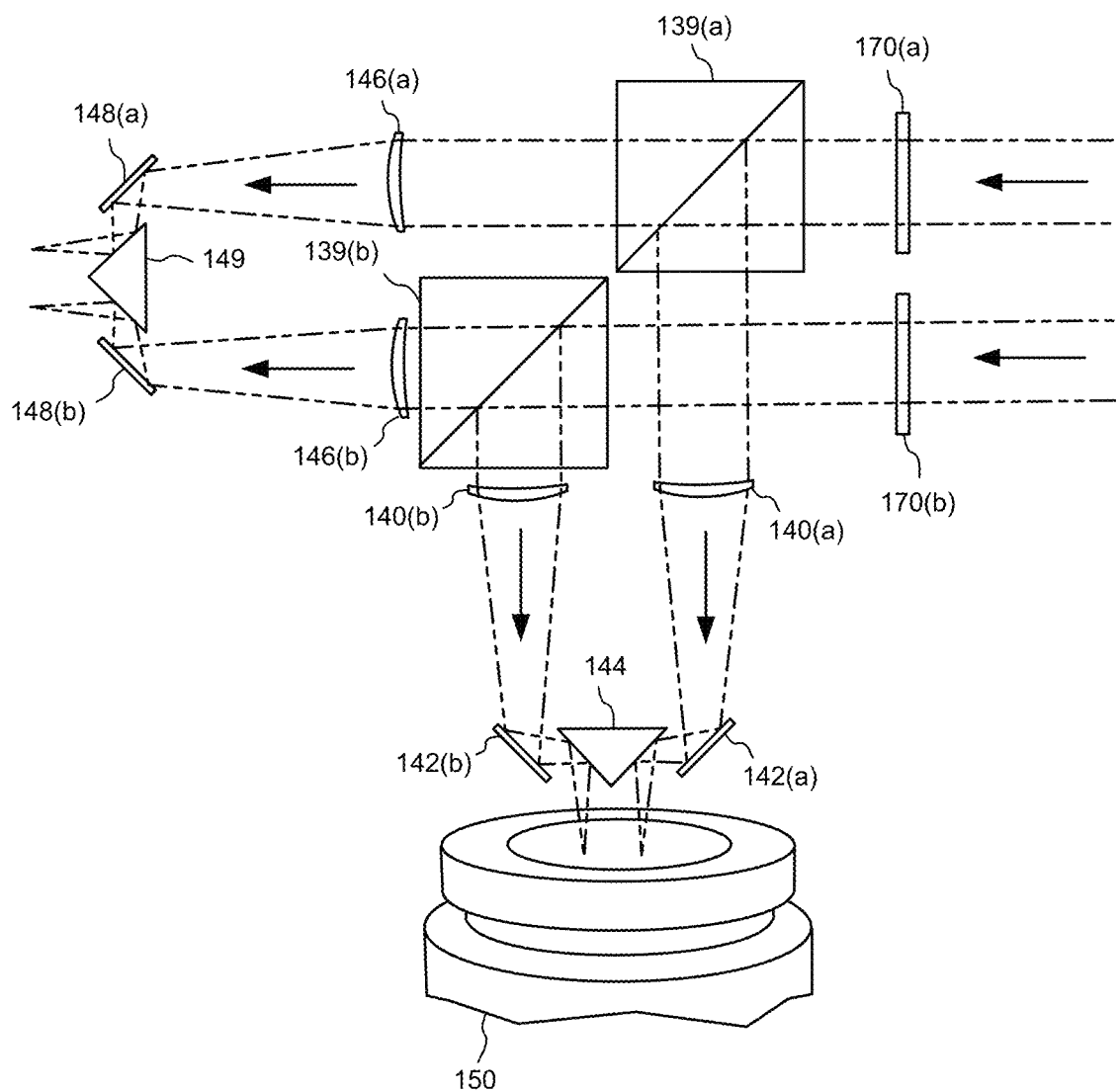
FIG. 1B is an enlarged view of a portion of the schematic diagram shown in FIG. 1A illustrating components of the dual-channel generation subsystem.

FIG. 1B is an enlarged view of a portion of the schematic diagram shown in FIG. 1A illustrating components of the dual-channel generation subsystem 130. As shown in FIG. 1B, the dual-channel generation subsystem 130 further includes a first beam splitter 139(a) and a second beam splitter 139(b) (e.g., BS013 beamsplitter made by Thorlabs®), a first lens 140(a), a second lens 140(b), a first mirror 142(a) (e.g., a planar mirror), a second mirror 142(b) (e.g., a planar mirror), a first right-angle prism mirror (e.g., knife-edge right-angle prism mirror (KRPM)) 144, a third lens 146(a), a fourth lens 146(b), a third mirror 148(a) (e.g., a planar mirror), a fourth mirror 148(b) (e.g., a planar mirror), and a second right-angle prism mirror 149 (e.g., knife-edge right-angle prism mirror (KRPM)). In one aspect, the first lens 140(a), the second lens 140(b), the third lens 146(a), and the fourth lens 146(b) are 50 mm focal length lenses such as, e.g., the commercially available AC254-050-A lens made by Thorlabs®.

Figure 1C:
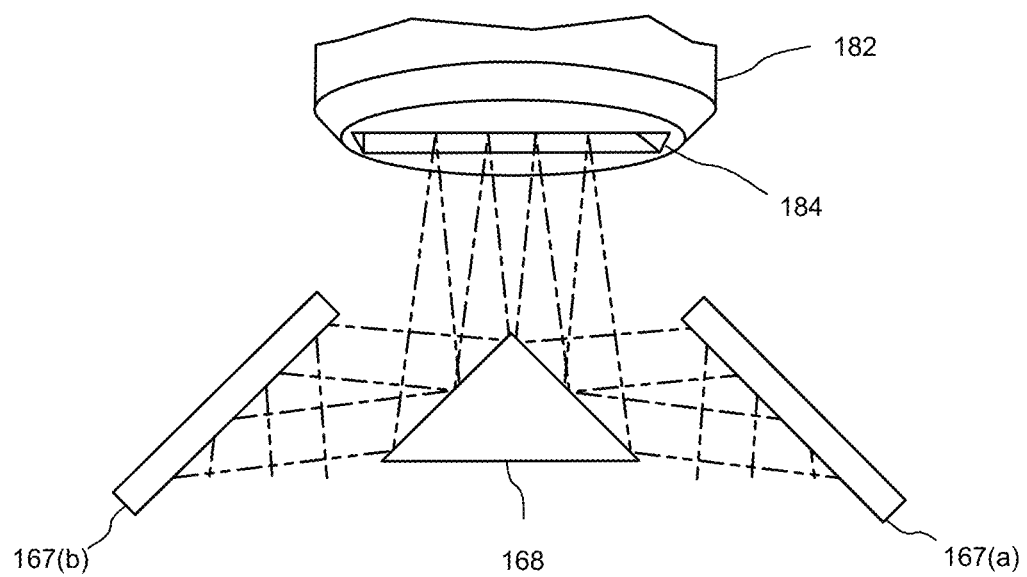
FIG. 1C is an enlarged view of a portion of the schematic diagram shown in FIG. 1A with some components of the spatial-encoding subsystem and a portion of the streak camera.

FIG. 1C is an enlarged view of a portion of the schematic diagram shown in FIG. 1A with some components of the spatial-encoding subsystem 160 and a portion of the streak camera 182. In the illustrated example, the spatial-encoding subsystem 160 includes a first lens 161 (e.g., a 100 mm focal length lens), a first mirror 162 (e.g., a planar mirror), a stereoscopic objective 163 (e.g., 2× stereoscope objective), a spatial-encoding device 164 (e.g., a DMD), a second lens 166(a), a third lens 166(b), a second mirror 167(a) (e.g., a planar mirror), a third mirror 167(b) (e.g., a planar mirror), and a right-angle prism mirror 168. The first lens 161 may be a tube lens such as, e.g., a 75-mm focal length lens. An example of a suitable commercially available 75-mm focal length lens is the AC508-100-A lens made by Thorlabs®. The second lens 166(a), third lens 166(b) may be 75 mm focal length lenses. An example of a suitable commercially available 75 mm focal length lens is the AC254-075-A lens made by Thorlabs®. In one aspect, one or more of the right-angle prism mirrors 144, 149, and 168 is the 49-413 right-angle prism mirror made by Edmund Optics.

FIGS. 1A-1C show the SP-CUP system 100 during an exemplary image acquisition operation. During the exemplary operation, the dynamic scene is first imaged by the front optics 122 to the intermediate image plane that interfaces the dual-channel generation subsystem 130. In one aspect, the front optics 120 includes one or more optical components configured or configurable to vary the magnification according to the field-of-view desired. In the dual-channel generation subsystem 130, incident light is collected by the stereoscope objective 132, followed by the dual-channel generating device 134 that can sample the pupil to generate the first optical channel 135(a) and the second optical channel 135(b). Light from the first optical channel 135(a) may be relayed to the first dove prism 136(a) and light from the second optical channel 135(b) may be relayed to the second dove prism 136(b). The pair of dove prisms 136(a), 136(b) are rotated with respect to each other by 90°. The dove prisms 136(a), 136(b) flip one of the views in the x-direction and the other in the y-direction, and thus, the two views are 180° rotated from each other. Light from the first dove prism 136(a) passes through the first polarization filter 170(a) (e.g., a 0° linear polarization filter) to be in a first polarization state. Light from the second dove prism 136(b) passes through the second polarization filter 170(b) (e.g. a 45° linear polarization filter) to be in a second polarization state. Light from the pair of dove prisms 136(a), 136(b) and polarization filters 170(a), 170(b) is relayed to a pair of beam splitters 139(a), 139(b) respectively. The first beam splitter 139(a) can split a portion of incident light of the first optical channel into a reflected component and can split another portion of the incident light of the first optical channel into a transmitted component. The second beam splitter 139(b) can split a portion of incident light of the second optical channel into a reflected component and can split another portion of the incident light of the second optical channel into a transmitted component. The reflected beam at the first optical channel passes through the first lens 140(a), is folded by the first mirror 142(a) and the first right-angle prism mirror 144. The reflected beam at the second optical channel passes through the second lens 140(b), is folded by the second mirror 142(b) and the first right-angle prism mirror 144. The reflected beams of the first and second optical channels form two images that are rotated by 180° with respect to another. The two-dimensional light detector 150 (e.g., CCD) is configured to capture the two images as two time un-sheared views (Views 1-2). In this example, the first lens 140(a), the second lens 140(b), the first mirror 142(a), the second mirror 142(b), and the first right-angle prism mirror 144 have the same configuration as the third lens 146(a), the fourth lens 146(b), the third mirror 148(a), the fourth mirror 148(b), and the second right-angle prism mirror 149. The transmitted component at the first optical channel from the first beam splitter 139(a) and the transmitted component at the second optical channel from the second beam splitter 139(b) pass through the same configuration, forming dynamic images at the intermediate imaging plane. The transmitted components are relayed through the spatial-encoding subsystem 160 and recorded by a compressed-sensing paradigm by the streak camera 182 of the temporal encoding subsystem 180. Light is relayed through the spatial-encoding subsystem 160. The spatial-encoding subsystem 160 includes a 4f imaging system consisting of the first lens 161 and the stereoscope objective 163, which relays the intermediate images to the spatial-encoding device 164 (e.g., a DMD). The spatial-encoding device 164 generates four light beams masked with complementary patterns.

In an implementation with the spatial-encoding device 164 in the form of a DMD, to spatially encode the view, a single pseudo-random binary pattern is generated on the DMD by placing (either holding at or turning to) each of the micromirror elements (also sometimes referred to herein as "pixels") at either +12° ("ON") or −12° ("OFF") from the DMD's surface normal. Each encoding pixel reflects incident light to one of the two directions. Light incident pixels turned to 12° ("ON") is reflected in an optical path at +12° from the DMD's surface normal. Light incident pixels turned to −12° ("OFF") is reflected in an optical path at −12° from the DMD's surface normal. Incident light from the transmitted beam at the first optical channel is reflected from the DMD to a first reflected light beam and second reflected light beam masked with a first set of complementary patterns. Incident light from the transmitted beam at the second optical channel is reflected from the DMD to a third reflected light beam and fourth reflected light beam masked with a second set of complementary patterns. In one aspect, the first set of complementary patterns is different from the second set of complementary patterns. In some cases, the transmitted beam at the first optical channel and the transmitted beam at the second optical channel may be incident different regions of the DMD.

Returning to the exemplary operation of the SP-CUP system 100, light from the four reflected light beams, masked with complementary patterns, is collected by the same stereoscope objective 163 (e.g., 2× stereoscope objective). The stereoscope objective 163 relays light to the second lens 166(a) and the third lens 166(b). As shown in FIG. 1C, the second lens 166(a) and the third lens 166(b) relay light to the third mirror 167(a) and the fourth mirror 167(b). The third mirror 167(a), the fourth mirror 167(b), and the right-angle prism mirror 168 reflect light to the streak camera 182 through the fully-opened entrance slit 184 to form four horizontally aligned views in the streak camera 182. The four views include a first pair of spatially-encoded views and a second pair of spatially-encoded views that are 180° rotated from views of the first pair.

Inside the streak camera 182, the two pairs of spatially-encoded views experience temporal shearing by a sweep voltage applied to a pair of electrodes in the streak camera 182 and spatiotemporal integration by an image sensor (e.g., a complementary metal-oxide semiconductor (CMOS) image sensor or a charge-coupled device (CCD)) in the streak camera 182. An example of a suitable commercially available image sensor is the Flash-4.0 made by Hamamatsu. The two pairs of spatially-encoded views experience temporal shearing in opposite directions relative to the image coordinates due to being rotated by the dove prisms 136(a), 136(b) to provide a lossless encoding. The four views are projected to two separate areas on the photocathode of the streak camera 182. The streak camera 182, therefore, records images at four time-sheared projected views (Views 3-6). Altogether, SP-CUP system 100 records raw images at six projected views (Views 1-6) of the dynamic scene in a single acquisition.

Figure 3:
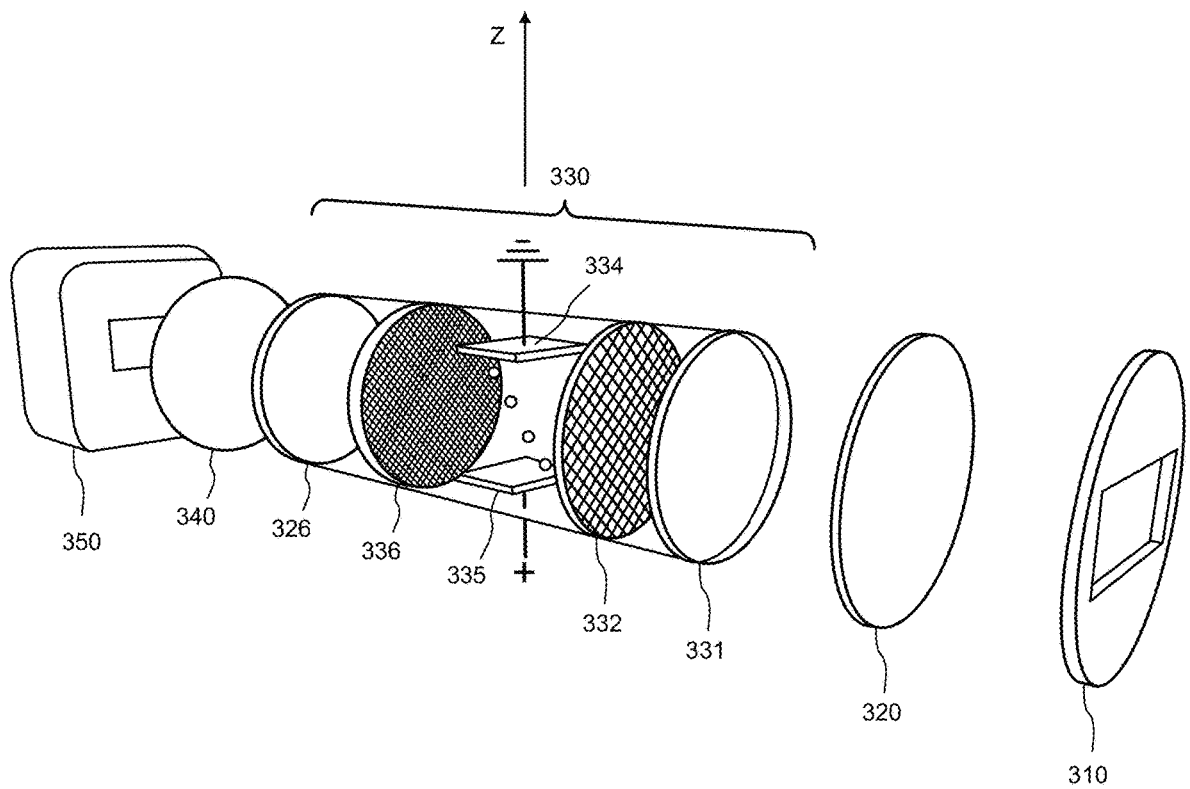
FIG. 3 is an exploded view of components of a streak camera, according to certain implementations.

FIG. 3 is an exploded view of components of a streak camera 300, according to various implementations. The streak camera 300 includes a fully-opened entrance slit 310, input optics 320, a streak tube 330, output optics 340, and a two-dimensional light detector 350 (e.g., a CMOS-based camera). The streak tube 330 includes a photocathode 331, an accelerating mesh 332, a pair of sweep electrodes 334, 335, a microchannel plate 336, and a phosphor screen 326. These components are in communication with each other as shown in the illustrated example. During operation, the input optics 320 first relays the image of the fully-opened entrance slit (e.g., a slit having a width of 17 mm and a height of 5 mm) 310 to the photocathode 331 on a streak tube 330. The photocathode 331 converts the photons into photoelectrons. After gaining sufficient speed through an acceleration mesh 332, these photoelectrons experience a time-varying shearing operation by a sweep voltage on a vertical z-axis, according to their times of arrival. The sweep voltage is applied by the pair of sweep electrodes 334, 335. Then the temporally sheared photoelectrons bombard a microchannel plate 338, where the current is amplified by generating secondary electrons. Next, a phosphor screen 326 converts the electrons back into photons. Finally, an image of the phosphor screen 326 is captured by the two-dimensional light detector 350 in a single 2D image. The two-dimensional light detector 350 may include one or more complementary metal-oxide-semiconductor (CMOS) sensors, charge-coupled devices (CCDs), and/or other two-dimensional arrays of light detecting elements.

Within the streak camera 300, the temporal deflection distance is proportional to the time-of-arrival and the sweep voltage triggered. In one aspect, the two-dimensional light detector 350 is in electronic communication with the pair of sweeping electrodes 334, 335 of the streak tube 330 to perform the shearing operation in the temporal domain while the temporally-encoded scene is measured by the two-dimensional light detector 350. This example or other examples of a streak camera within the contemplation of this disclosure can be included in a temporal encoding subsystem of various implementations of the SIP-CUP system.

Figure 2A:
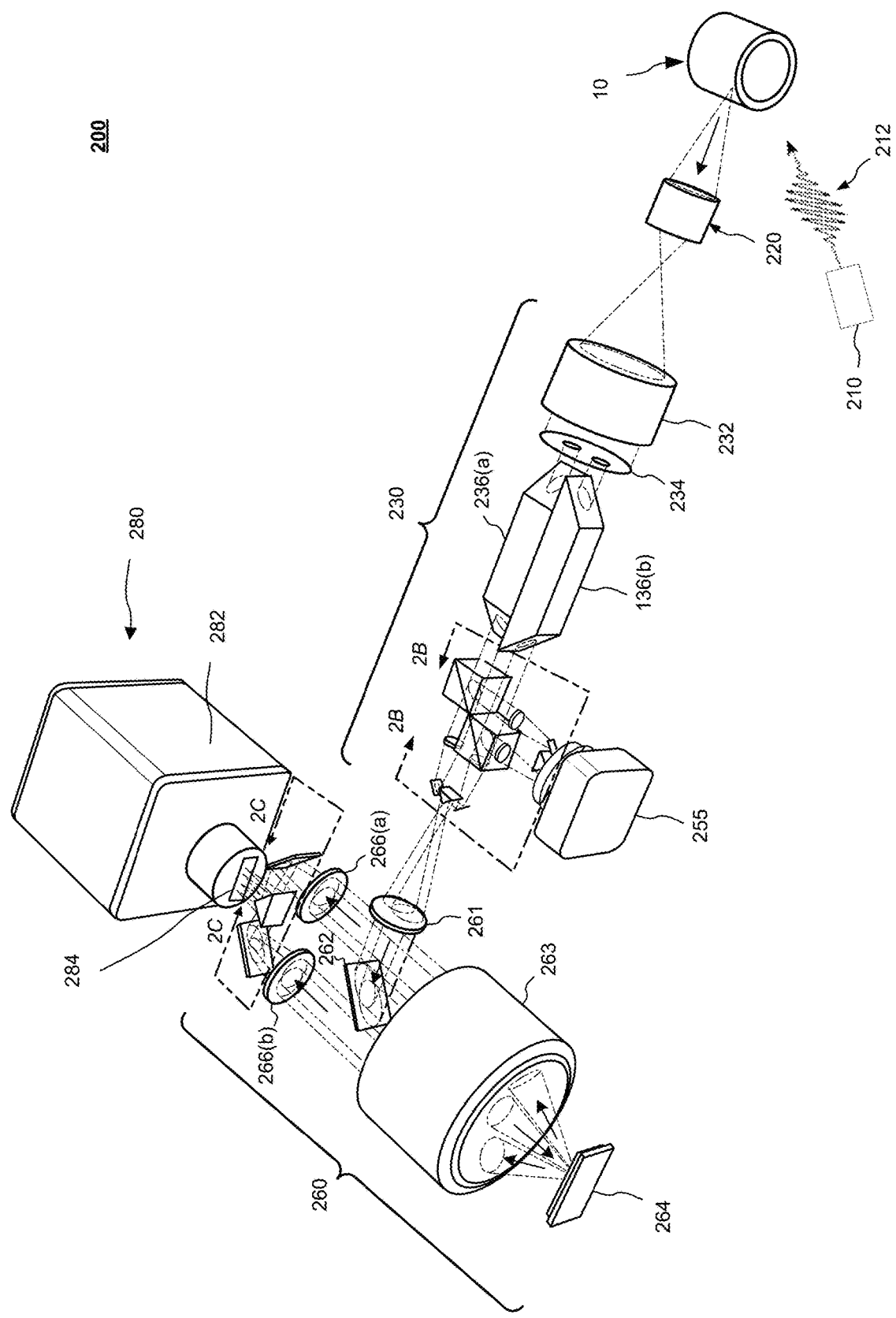
FIG. 2A is a schematic diagram of components of a stereo-polarimetric compressed ultrafast photography (SP-CUP) system, according to an implementation.

FIG. 2A is a schematic diagram of components of a stereo-polarimetric compressed ultrafast photography (SP-CUP) system 200, according to an implementation. The SP-CUP system 200 includes front optics 220, a dual-channel generation subsystem 230, a first camera with a lens and a two-dimensional light detector 250 (e.g., a CCD such as the GS3-U3-32S4M-C made by Point Grey®), a spatial-encoding subsystem 260, a first polarizer filter 270(a), and a second polarizer filter 270(b), a third polarizer filter 271(a), and a fourth polarizer filter 271(b), a fifth polarizer filter 270(c), a sixth polarizer filter 270(d), a temporal-encoding subsystem 280 having a streak camera 282 with a fully-opened entrance slit 284. The SP-CUP system 200 is shown during an exemplary image acquisition operation while an illumination source 210 provides a light beam 212 to a subject 10 being imaged. In this example, the subject 10 is in the form of a dynamic scene. In one aspect, the illumination source 210 is a component of the SP-CUP system 200, and in another aspect, the illumination source 210 is separate from the SP-CUP system 200. Although not shown, the SP-CUP system 200 may also include a computing system such as, e.g., the computing system 490 described with respect to FIG. 4.

The front optics 220 can collect incident light reflected from the subject 10 being imaged and relay light to the dual-channel generation subsystem 230. The front optics 220 may include one or more optical components configurable to vary magnification according to the field-of-view desired. The dual-channel generation subsystem 230 can generate two beams 235(a) and 235(b) (optical channels) and rotate at least one of the beams so that one beam is rotated (e.g., by 180°) with respect to the other beam. The dual-channel generation subsystem 230 is also configured to split each of the two beams into a first component and a second component and relay the first component to the two-dimensional light detector 150. The dimensional light detector 250 is configured to acquire two images (View 1-2) that are rotated (e.g., by 180 degrees) with respect to one another. The dual-channel generation subsystem 230 is also configured to relay the second component of the two beams to the spatial-encoding subsystem 260. The spatial-encoding subsystem 260 can spatially encode views with one or more pseudo-random patterns (e.g., pseudo-random binary patterns). For example, the spatial-encoding subsystem 260 may receive the second component relayed from the dual-channel generation subsystem 230, generate four light beams masked with complementary patterns, and relay the four light beams to the temporal-encoding subsystem 280 having a streak camera 282. The spatial-encoding subsystem 260 can output spatially-encoded images including (i) images of the subject superimposed with a first pseudo-random binary spatial pattern, (ii) images of the subject superimposed with a complementary first pseudo-random binary pattern (i.e. complementary to the first pseudo-random binary spatial pattern), (iii) images of the subject superimposed with a second pseudo-random binary spatial pattern, and (iv) images of the subject superimposed with a complementary second pseudo-random binary pattern (i.e. complementary to the second pseudo-random binary spatial pattern). The temporally-encoding subsystem 280 may temporally shear the spatially-encoded images relayed from the spatial-encoding subsystem 260 and record at least the four time-sheared views (Views 3-6). The four time-sheared views (Views 3-6) include a first set of time-sheared views (Views 3 and 4) with complementary spatial encoding and a second set of time-sheared views (Views 5 and 6) with complementary spatial encoding.

The dual-channel generation subsystem 230 includes a stereoscope objective 232 (e.g., 1× stereoscope objective) and a dual-channel generating device 234 that can generate a first optical channel 235(a) and a second optical channel 235(b). In this example, the dual-channel generating device 234 may be in the form of a pair of diaphragms. The dual-channel generation subsystem 230 also includes a first dove prism 236(a) and a second dove prism 236(b) that are positioned in parallel and rotated (along their axial direction) relative to each other. For example, the pair of dove prisms 236(a), 236(b) (e.g., PS994 dove prisms by Thorlabs®) may be at 90° rotation relative to each other.

Figure 2B:
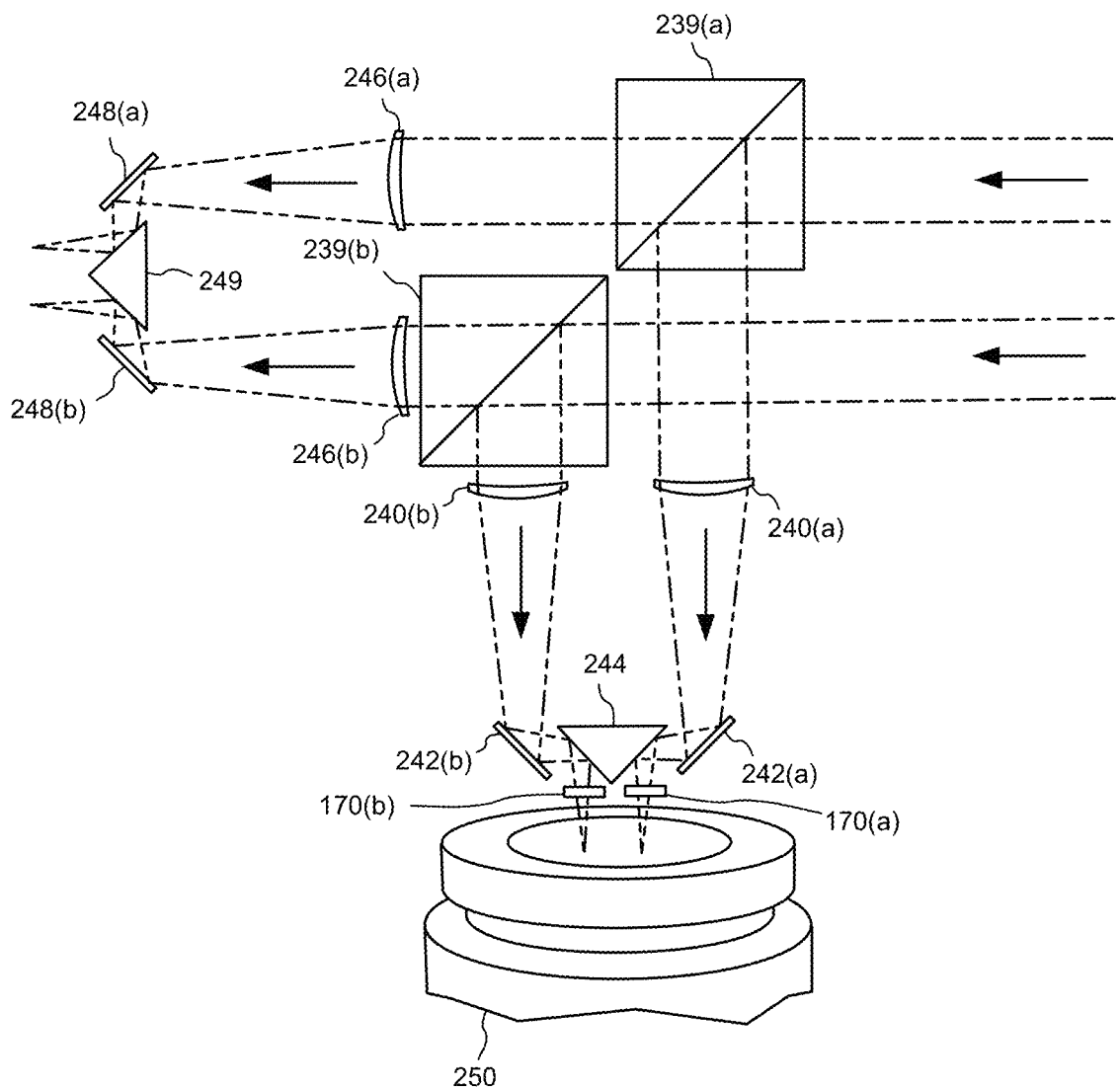
FIG. 2B is an enlarged view of a portion of the schematic diagram shown in FIG. 2A illustrating components of the dual-channel generation subsystem.

FIG. 2B is an enlarged view of a portion of the schematic diagram shown in FIG. 2A illustrating components of the dual-channel generation subsystem 230. As shown in FIG. 2B, the dual-channel generation subsystem 230 further includes a first beam splitter 239(a) and a second beam splitter 239(b) (e.g., BS013 beamsplitter made by Thorlabs®), a first lens 240(a), a second lens 240(b), a first mirror 242(a) (e.g., a planar mirror), a second mirror 242(b) (e.g., a planar mirror), a first right-angle prism mirror (e.g., knife-edge right-angle prism mirror (KRPM)) 244, a third lens 246(a), a fourth lens 246(b), a third mirror 248(a) (e.g., a planar mirror), a fourth mirror 248(b) (e.g., a planar mirror), and a second right-angle prism mirror 249 (e.g., knife-edge right-angle prism mirror (KRPM)). In one aspect, the first lens 240(a), the second lens 240(b), the third lens 246(a), and the fourth lens 246(b) are 50 mm focal length lenses such as, e.g., the commercially available AC254-050-A lens made by Thorlabs®. As shown in FIG. 2B, the first polarization filter 170(a) and the second polarization filter 170(b) are in the optical path between the first right-angle prism mirror 244 and the two-dimensional light detector 250. The first polarization filter 170(a) is configured to pass light in a first polarization state such as linear polarization at 0 degrees. The second polarization filter 170(b) is configured to pass light in a second polarization state such as linear polarization at 45 degrees.

Figure 2C:
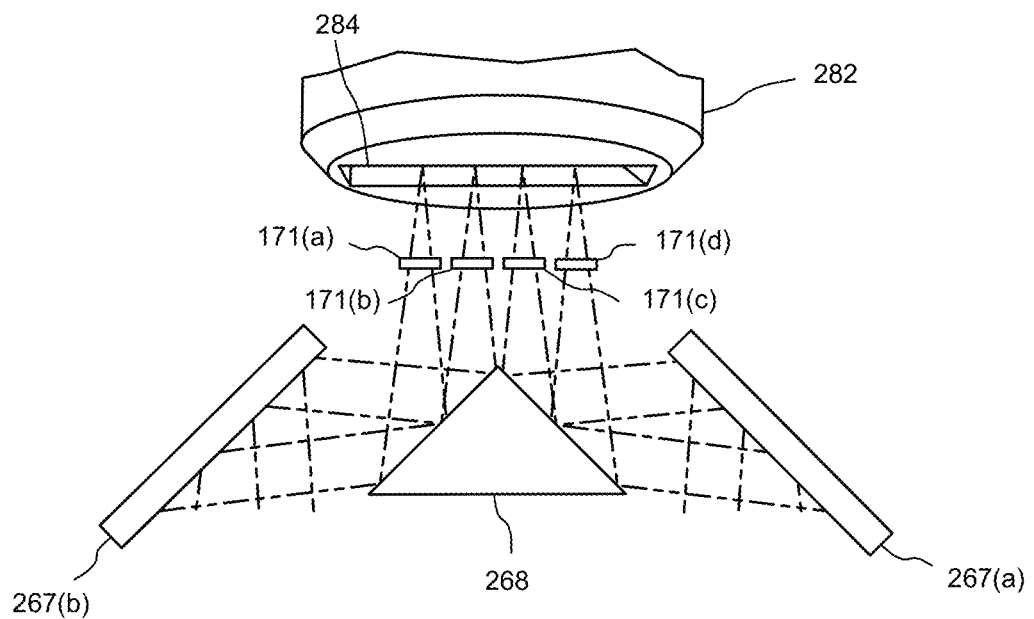
FIG. 2C is an enlarged view of a portion of the schematic diagram shown in FIG. 2A with some components of the spatial-encoding subsystem and a portion of the streak camera.

FIG. 2C is an enlarged view of a portion of the schematic diagram shown in FIG. 2A with some components of the spatial-encoding subsystem 260 and a portion of the streak camera 282. In this example, the spatial-encoding subsystem 260 includes a first lens 261 (e.g., a 100 mm focal length lens), a first mirror 262 (e.g., a planar mirror), a stereoscopic objective 263 (e.g., 2× stereoscope objective), a spatial-encoding device 264 (e.g., a DMD), a second lens 266(a), a third lens 266(b), a second mirror 267(a) (e.g., a planar mirror), a third mirror 267(b) (e.g., a planar mirror), and a right-angle prism mirror 268. The first lens 261 may be a tube lens such as, e.g., a 75-mm focal length lens. An example of a suitable commercially available 75-mm focal length lens is the AC508-100-A lens made by Thorlabs®. The second lens 266(a), third lens 266(b) may be 75 mm focal length lenses. An example of a suitable commercially available 75 mm focal length lens is the AC254-075-A lens made by Thorlabs®. In one aspect, one or more of the right-angle prism mirrors 244, 249, and 268 is a 49-413 right-angle prism mirror made by Edmund Optics. As shown in FIG. 2C, the third polarization filter 271(a) is in the optical path of a first beam relayed from the right-angle prism mirror 268 to the streak camera 282, the fourth polarization filter 271(b) is in the optical path of a second beam relayed from the right-angle prism mirror 268 to the streak camera 282, the fifth polarization filter 271(c) is in the optical path of a third beam relayed from the right-angle prism mirror 268 to the streak camera 282, and the sixth polarization filter 271(d) is in the optical path of a fourth beam relayed from the right-angle prism mirror 268 to the streak camera 282. The third polarization filter 170(a) is configured to pass light in a first polarization state such as linear polarization at 0 degrees. The fourth polarization filter 170(b) is configured to pass light in a first polarization state such as such as linear polarization at 45 degrees. The fifth polarization filter 170(c) is configured to pass light in a first polarization state such as linear polarization at 0 degrees. The sixth polarization filter 170(*d*) is configured to pass light in a first polarization state such as linear polarization at 45 degrees. In other aspects, there are different arrangements or types of filters. For example, in one aspect, there may be a single polarization filter in the optical path of all four beams. As another example, there may be two types of filters.

FIGS. 2A-2C show the SP-CUP system 200 during an exemplary image acquisition operation. The image acquisition of SP-CUP system 200 is similar to the image acquisition of SP-CUP system 100. Altogether, SP-CUP system 200 records six raw views (Views 1-6) of the dynamic scene in a single acquisition.

In one aspect, the frame rate of an SP-CUP system can be adjustable. In one implementation, the frame rate can be adjusted by modifying the speed of the time-dependent shearing within the streak camera. As an example, the SP-CUP system can be configured to capture a 100 frame sequence at 10 Gfps by completing the full sweep of the time-dependent shearing in 10 nanoseconds. As another example, the SP-CUP system can be configured to capture a 100 frame sequence at 1 Tfps by completing the full sweep of the time-dependent shearing in 100 picoseconds. The SP-CUP system can be configured with any desired frame rate include, but not limited to, at least 10 Gfps, at least 100 Gfps, at least 500 Gfps, and at least 1 Tfps.

As used herein, a "dual-channel generation subsystem" refers to one or more components that are collectively configured or configurable to generate two beams (optical channels) from light and generate two views that are rotated with respect to each other, e.g., by 180°. For example, the dual-channel generation subsystem may be configured or configurable to rotate one of the views in the x-direction of the image coordinates and/or rotate the other view in the y-direction of the image coordinates so that the two views are rotated with respect to each other, e.g., by 180°. In one aspect, a pair of diaphragms may be used to generate two beams (optical channels) and/or a pair of dove prisms rotated relative to each along by 90° may be employed to rotate the two views by 180° from each other. In some cases, the dual-channel generation subsystem is also configured to split (e.g., using one or more beam splitters) each of the optical channels into a first component in one direction and second component in another direction. In another aspect, two separate sets of imaging systems (e.g., one or more lenses) can be used to form images for the two optical channels. Although a pair of dove prisms is implemented in certain examples of SP-CUP systems described herein, other image rotation prisms or combination of image rotations can be used according to other implementations. Some examples of image rotation prisms that can be used include a Schmidt prism, a Pechan prism, and an Abbe prism.

As used herein, a "spatial-encoding subsystem" refers to one or more components are collectively configured or configurable to receive two beams and generate four light beams masked with complementary patterns. In some cases, the spatial-encoding subsystem relays light to form four spatially-encoded images with complementary patterns in a streak camera. In various implementations, the spatial-encoding subsystem includes a spatial-encoded device configured or configurable to receive images of the subject, superimpose a pseudo-random binary spatial pattern on the images, and output spatially-encoding images. In some cases, the spatial-encoding device is a digital micromirror device (DMD) configured or configurable to receive images of the subject and output spatially-encoding images. For example, the DMD may be configured or configurable to output spatially-encoded images including a first view of the images of the subject superimposed with a first pseudo-random binary spatial pattern and a second view of the images of the subject superimposed with a pattern complementary to the first pseudo-random binary pattern (a first complementary pseudo-random binary pattern). In certain aspects, the DMD may be further configured or configurable to output spatially-encoded images including a third view of the images of the subject superimposed with a second pseudo-random binary spatial pattern and a fourth view of the images of the subject superimposed with a pattern complementary to the second pseudo-random binary pattern (a second complementary pseudo-random binary pattern). Additionally, the various views may be positioned in spatially separate regions of the field of view of a camera acquiring temporally-sheared images (e.g., streak camera). In some examples, the DMD may split the incoming light into two complementary views (views with complementary patterns), generated by the pseudo-random pattern loaded onto the DMD. As an example, each of the micromirrors in a DMD may be configurable to be 1) at a first angle (e.g., +12°) from the DMD's surface normal in an "ON" position to reflect incoming light towards a first optical path, or 2) at a second angle (e.g., −12°) from the DMD's surface normal where the second angle is opposite the first angle in order to reflect incoming light towards a second optical path in an opposite direction. In some cases, individual micromirrors within a DMD may be binned together. For example, a DMD may be configured with 3×3 binning where the DMD is divided into groups of 3×3 micromirrors, where the micromirrors in each group are set to a common state. An example of a suitable commercially available DMD that can be employed in certain implementations is a LightCrafter 3000 by Texas Instruments®. In another case, the spatial-encoding device is a spatial light modulator (SLM). In yet another case, the spatial-encoding device is a patterned photomask. In examples with the spatial-encoding device in the form of an SLM or patterned photomask, the SP-CUP system further includes pairs of relay lens to project the intermediate image onto the SLM or photomask and then project the encoded image to the streak camera.

As used herein, a "temporal-encoding subsystem" refers to one or more components configured to receive an entire field-of-view of each image of a plurality of images, deflect each image by a temporal deflection distance proportional to the time-of-arrival of each portion of each image (temporally-encoding), and record each deflected temporally-encoded image. In certain aspects, the temporal encoding system includes a streak camera that can transform a temporal profile of a light signal into a spatial profile by shearing photoelectrons perpendicular to their direction of travel with e.g., a time-varying voltage. As used herein a "streak camera" refers to an ultrafast imaging device that uses photoelectron conversion and electron deflection. For example, photoelectrons may be sheared by a sweep voltage applied to a pair of electrodes. The streak camera temporally disperses the light. Conventional streak cameras are only able to image one-dimensional ultrafast phenomena. To enable dynamic two-dimensional imaging with a single exposure (acquisition), a streak camera implemented in certain examples of SP-CUP systems employ a fully-opened entrance slit. An example of such an implementation is shown in FIG. 1A. An example of a commercially available streak camera that may be used in certain implementations is a high dynamic range streak camera such as the C7700 camera made by Hamamatsu®. An illustrated example of a streak camera 300 is provided in FIG. 3. In some cases, one subsystem of the SP-CUP system may share one or more components of another subsystem.

Although a streak camera is employed in certain examples of SP-CUP systems described herein, other temporal shearing mechanisms can be employed according to other aspects. In one aspect, for example, mechanical shearing of a photomask may be employed. An example of a mechanical shearing of photomask can be found in P. Llull, X. Liao, X. Yuan, J. Yang, D. Kittle, L. Carin, G. Sapiro, and D. J. Brady, "Coded aperture compressive temporal imaging," Optics Express 21, 10526-10545 (2013), which is hereby incorporated by reference in its entirety. In another aspect, a galvanometer scanner may be employed. An example of a galvanometer scanner can be found in Liu, X., Liu, J., Jiang, C., Vetrone, F. & Liang, J., "Single-shot compressed optical-streaking ultra-high-speed photography," Optics Letters 44, 1387-1390, (2019), which is hereby incorporated by reference in its entirety.

In various implementations, an illumination source is used to illuminate the subject being imaged. The illumination source may be a component of the SP-CUP system or may be separate and in communication with one or more components of the SP-CUP system. An example of a suitable illumination source is a pulsed laser such as a solid-state pulsed laser (e.g., solid-state pulsed laser with 532 nm wavelength and 7 ps pulse duration). An example of a suitable illumination source is a Femtosecond pulsed laser, with 800 nm center wavelength and pulse duration of 50 fs. Another example of a suitable illumination source is a Nanosecond solid-state laser, with 532 nm wavelength, and pulse duration of 30 ns. In some cases, the illumination source may be in operative communication (e.g., receiving control signals) with the temporal-encoding subsystem to synchronize image acquisition of Views 3-6 with the laser pulse and/or the two-dimensional light detector to synchronize image acquisition of Views 1-2 with the laser pulse. In some cases, the illumination source may be in operative communication (e.g., receiving control signals) with a computing device of the SP-CUP system to receive control signals. In one aspect, the illumination source includes a diffuser that can be implemented, e.g., to depolarize a laser pulse.

In certain implementations, the SP-CUP system includes one or more polarization filters. In some cases, at least one of the one or more polarization filters is a linear polarization filter. In one aspect, two types of polarization filters are implemented to transmit light with different polarization angles. For example, in FIG. 1A, a first polarization filter 170(a) and a second polarization filter 170(b) are used to pass light of a first polarization state (e.g., 0°) and a second polarization state (e.g., 45°) respectively. The one or more polarization filters may be in various locations in the SP-CUP system. For example, in FIG. 1A, the first polarization filter 170(a) and the second polarization filter 170(b) are placed in the optical path of the two beams between the stereoscope objective 132 and the pair of dove prisms 136(a), 136(b). Another example is provided in FIG. 1B. In one aspect, three 0° polarizers are inserted in Views 1, 3 and 4; and three 45° polarizers are inserted in Views 2, 5 and 6 of an SP-CUP system. polarization filters may be placed in different locations according to various implementations to facilitate calculation of the polarization states of light. In certain examples, the two imaging channels image the subject through polarization filters of different polarization angles respectively and the polarization state of the subject can be readily obtained by computation from the images acquired.

Figure 4:
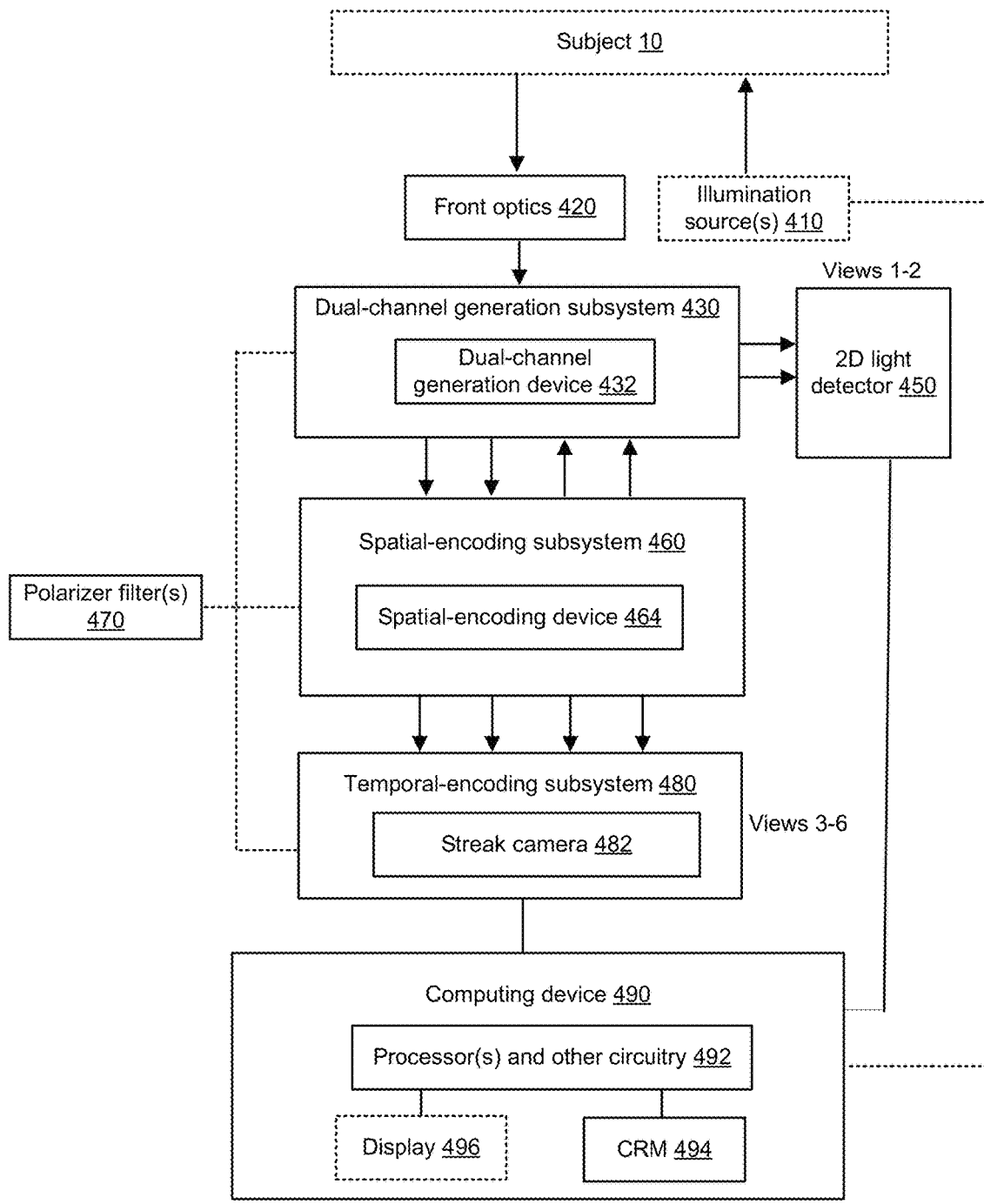
FIG. 4 is a schematic diagram of components of a stereo-polarimetric compressed ultrafast photography (SP-CUP) system, according to various implementations.

FIG. 4 is a schematic diagram of components of a stereo-polarimetric compressed ultrafast photography (SP-CUP) system 400, according to various implementations. The subject 10 need only be present during image acquisition and may not be a component of the SP-CUP system 400 (as denoted by the dashed line). The SP-CUP system 400 includes front optics 420 that can collect light from the illuminated subject 10 being imaged. The front optics 420 may include one or more optical components configurable to vary magnification according to the field-of-view desired. The SP-CUP system 400 also includes a dual-channel generation subsystem 430 in communication with the front optics 420 to be able to receive light relayed therefrom and a two-dimensional light detector 450 in communication with the dual-channel generation subsystem 430. The subject 10 is first imaged by the front optics 430 to an image plane that interfaces the dual-channel generation subsystem 430. The dual-channel generation subsystem 430 includes a dual-channel generation device 432 that can generate a first optical channel and a second optical channel. An example of a dual-channel generation subsystem 430 includes a pair of diaphragms. The dual-channel generation subsystem 430 is also configured or configurable to be able to rotate one of the views in the x-direction of the image coordinates and/or rotate the other view in the y-direction of the image coordinates so that the two views are rotated with respect to each other, e.g., by 180°. The SP-CUP system 400 also includes a spatial-encoding subsystem 460 having a spatial-encoding device 462 (e.g., a DMD) that can spatially encode views of images with one or more pseudo-random patterns (e.g., pseudo-random binary patterns). The spatial-encoding subsystem 460 can implement the spatial-encoding device 462 to spatially encode the two views rotated with respect to each from the two optical channels received from the dual-channel generation subsystem 430. In some cases, the dual-channel generation subsystem 430 can split light received into two components a first component that is propagated to the two-dimensional light detector 450 and a second component that is propagated to the spatial-encoding subsystem 460. The spatial-encoding device 462 (e.g., a DMD) can generate four light beams masked with complementary patterns. For example, the spatial-encoding device 462 can output spatially-encoded images including (i) images of the subject 10 superimposed with a first pseudo-random binary spatial pattern, (ii) images of the subject 10 superimposed with a complementary first pseudo-random binary pattern (i.e. complementary to the first pseudo-random binary spatial pattern), (iii) images of the subject 10 superimposed with a second pseudo-random binary spatial pattern, and (iv) images of the subject 10 superimposed with a complementary second pseudo-random binary pattern (i.e. complementary to the second pseudo-random binary spatial pattern). The SP-CUP system 400 also includes a temporal-encoding subsystem 480 having a streak camera 482. The spatial-encoding subsystem 460 is in communication with the temporal-encoding subsystem 480 to relay the four light beams masked with complementary patterns. The streak camera 482 can temporally shear the spatially-encoded images relayed from the spatial-encoding subsystem 460 and record at least four time-sheared views (Views 3-6) that include (i) a first set of time-sheared views (Views 3 and 4) with complementary spatial encoding and (ii) a second set of time-sheared views (Views 5 and 6) with complementary spatial encoding. The SP-CUP system 400 also includes one or more polarizer filters 470 that may be placed in one or more locations (denoted by dashed lines to various system components) in the optical path of light in the SP-CUP system 400. For example, a first polarization filter configured to pass light of a first polarization state (e.g., 0°) and a second polarization filter configured to pass light of a second polarization state (e.g., 45°) may be used. In one case, the first polarization filter may be placed between one beamsplitter and one dove prism and the second polarization filter may be placed between the other beamsplitter and the other dove prism. As another example, both the first and second polarization filters may be placed between the right angle prism mirror and the first camera for View 1 and View 2.

The SP-CUP system 400 also includes a computing device 490 having one or more processors or other processing circuitry 492, optionally (denoted by dashed line) a display 496 in electrical communication with the processor(s) 492, and computer readable medium (CRM) 494 (e.g., memory) in electronic communication with the processor(s) 492. The computing device 490 may be, for example, a personal computer, an embedded computer, a single board computer (e.g. Raspberry Pi or similar), a portable computation device (e.g. tablet), a controller, or any other computation device or system of devices capable of performing the functions described herein. The computing device 180 may be (denoted by dashed line) in electronic communication with the illumination source 410 to send trigger signals to activate the illumination source 410, e.g., to send laser pulses. The computing device 480 is in electrical communication with the two-dimensional light detector 450 to receive image data transmissions with the two spatially-encoded views (View 1-2). The computing device 480 is also in electrical communication with the temporal-encoding subsystem 480 to r image data transmissions with the four time-sheared views (Views 3-6) including: (i) a first set of time-sheared views (Views 3 and 4) with complementary spatial encoding and (ii) a second set of time-sheared views (Views 5 and 6) with complementary spatial encoding. The electrical communication between the computing device 490 and other components of the SP-CUP system 400 may be in wired and/or wireless form. The processor(s) 492 executes instructions stored on the CRM 494 to perform one or more operations of the SP-CUP system 400. In certain implementations, the processor(s) 492 and/or one or more external processors execute instructions to perform one or more of 1) determining and communicating control signals to one or more system components, 2) performing acquisition process; and 3) performing reconstruction process.

In some implementations, the SP-CUP system includes one or more communication interfaces (e.g., a universal serial bus (USB) interface). Communication interfaces can be used, for example, to connect various peripherals and input/output (I/O) devices such as a wired keyboard or mouse or to connect a dongle for use in wirelessly connecting various wireless-enabled peripherals. Such additional interfaces also can include serial interfaces such as, for example, an interface to connect to a ribbon cable. It should also be appreciated that the various system components can be electrically coupled to communicate with various components over one or more of a variety of suitable interfaces and cables such as, for example, USB interfaces and cables, ribbon cables, Ethernet cables, among other suitable interfaces and cables.

An example of a Picosecond-resolution phase-sensitive compressed ultrafast photography (pCUP) system can be found in U.S. patent application Ser. No. 16/806,691, titled "PICOSECOND-RESOLUTION PHASE-SENSITIVE COMPRESSED ULTRAFAST PHOTOGRAPHY (PCUP) IN A SINGLE-SHOT" and filed on Mar. 2, 2020, which is hereby incorporated by reference in its entirety.

III. Stereo-Polarimetric Compressed-Sensing Ultrafast Photography (SP-CUP) Methods Certain aspects pertain to SP-CUP imaging methods that include a data acquisition process and/or an image reconstruction process. In various examples, the data acquisition process of an SP-CUP method can be described by the expression of:

$$E=OI(x,y,t), \qquad (Eqn. 1)$$

where:
E represents the joint measurement of energy distributions of selected raw views and
O is the joint measurement operator of the selected views A detailed discussion of the data acquisition process is provided in Section III(A). Compressive recording allows for image reconstruction of the scene by solving the minimization problem of:

$$\operatorname{argmin}_I \left\{ \frac{1}{2} \|E - OI\|_2^2 + \beta \Phi_{TV}(I) \right\}, \qquad (Eqn. 2)$$

where: $\|\bullet\|_2$ denotes the $l^2$ norm,
$\Phi_{TV}(I)$ is the total variation regularizer that promotes sparsity in the dynamic scene, and
$\beta$ is the regularization parameter that adjusts the weight ratio between the two terms.

The solution to this minimization problem can be stably and accurately recovered, even with a highly-compressed measurement. An example of a highly-compressed measurement may be discussed in Hunt, J. et al., "Metamaterial Apertures for Computational Imaging," Science 339, 310-313 (2013) and Candes, E. J., "The restricted isometry property and its implications for compressed sensing," C.R. Math. 346, 589-592 (2008); which are hereby incorporated by reference in their entireties.

In certain aspects, an SP-CUP method includes an image reconstruction process developed using one or more operations, which may be based in some cases on a two-step iterative shrinkage/thresholding (TwIST) process, to reconstruct a dynamic scene as discussed in Section III(B). An example of a TwIST process can be found in Bioucas-Dias, J. M. & Figueiredo, M. A., "A new TwIST: two-step iterative shrinkage/thresholding algorithms for image restoration," IEEE Trans. Image Process. 16, 2992-3004 (2007), which is hereby incorporated by reference in its entirety.

Figure 5:
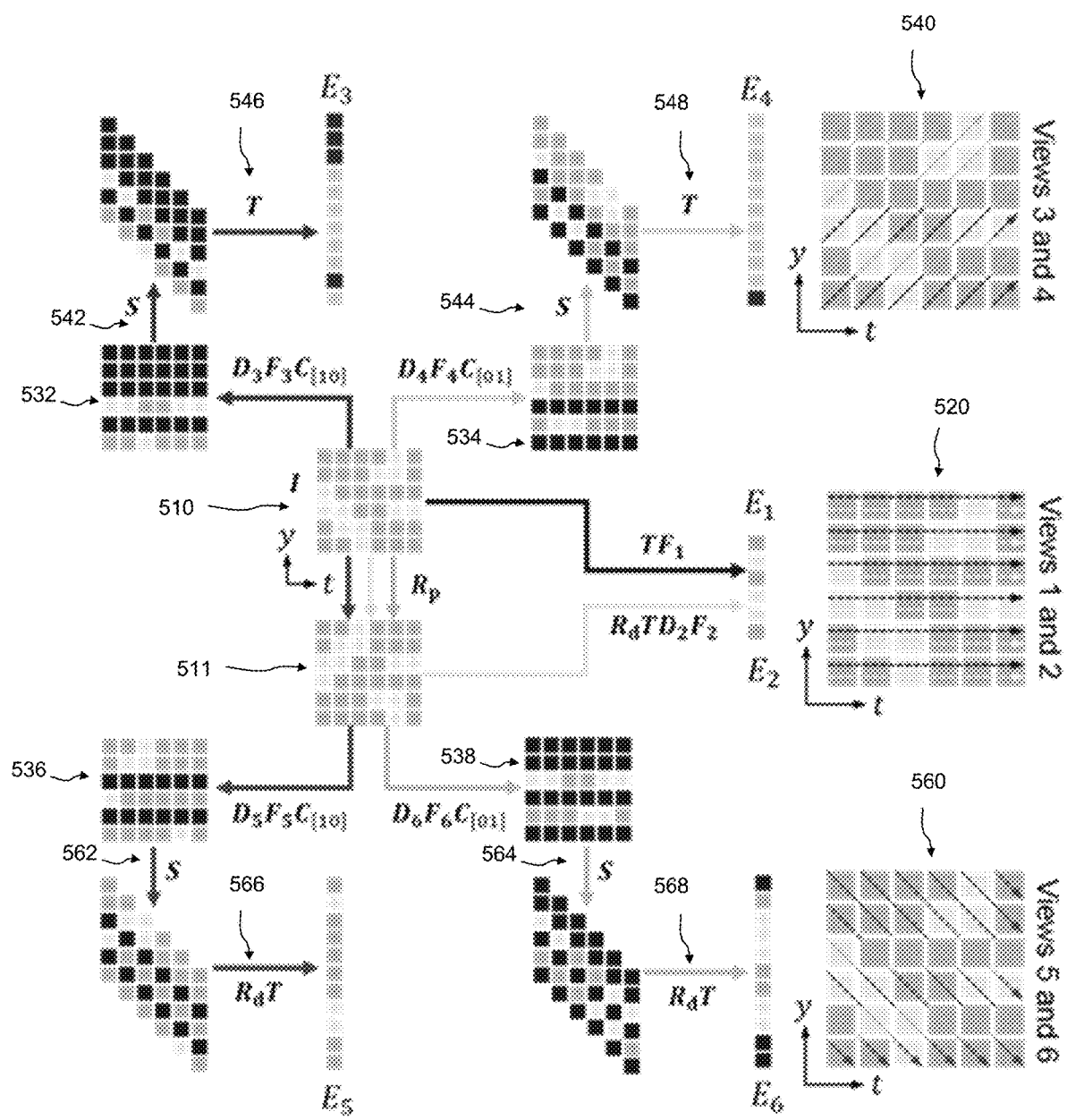
FIG. 5 is a schematic illustration of a data acquisition process of an SP-CUP method, according to various implementations.

Conceptually, certain aspects of the SP-CUP systems and methods can combine compressed sensing with Radon transformation by providing projections of a dynamic scene from three different angles as illustrated in the multi-view projection of the example shown in FIG. 5. The imaging quality of conventional CUP techniques can be limited by spatiotemporal mixing in a single shearing direction. An example of a conventional CUP technique can be found in Gao, L., Liang, J., Li, C. & Wang, L. V., "Single-shot compressed ultrafast photography at one hundred billion frames per second," Nature 516, 74-77 (2014), which is hereby incorporated by reference in its entirety. An example of spatiotemporal mixing can be found in Mochizuki, F. et al., "Single-event transient imaging with an ultra-high-speed temporally compressive multi-aperture CMOS image sensor," Opt. Express 24, 4155-4176 (2016), which is hereby incorporated by reference in its entirety. In certain aspects, SP-CUP techniques may alleviate this limitation by implementing two shearing directions in the time-sheared views (Views 3-6). In the two time-unsheared views (Views 1-2), because the projection is parallel to the time axis, the spatial information is retained while all temporal information is discarded. In the four time-sheared views (Views 3-6), the temporal information is preserved by projecting the scene from two oblique angles. Altogether, three projection views can be exploited to enrich the observation to the transient scene. However, because of the under-determined nature of the inverse problem and the small number of projections, a direct inversion of the Radon transformation may not be possible without employing compressed sensing. The combination of the compressed sensing and the Radon transformation allows for high-quality image reconstruction in SP-CUP techniques.

In certain aspects, SP-CUP systems and/or methods combine stereoscopy and polarimetry into ultrafast imaging. In one aspect, stereoscopy is implemented in the dual-channel generation stage (e.g., in the dual-channel generation subsystem 230 shown in FIG. 2A and the dual-channel generation subsystem 430 shown in FIG. 4) to enable depth sensing. An example of stereoscopy can be found in Gosta, M. & Grgic, M., "Accomplishments and challenges of computer stereo vision," Proceedings-ELMAR 2010 57-64 (2010), which is hereby incorporated by reference in its entirety. One or more polarizers may be inserted in view(s) to implement polarization sensing. For example, polarizers may be attached at the entrance port of the streak camera (e.g., streak camera 282 in FIG. 1A or streak camera 482 in FIG. 4) and before the two-dimensional light detector (e.g., two-dimensional light detector 250 in FIG. 1A or two-dimensional light detector 450 in FIG. 4) to realize polarization sensing. This combination of stereoscopy and polarimetry allows an SP-CUP system of certain examples to record up to five-dimensional information in a single exposure.

In certain aspects, different combinations of the six views (Views 1-6) captured by an SP-CUP system can be flexibly and jointly used in different modes of imaging. In some cases, the SP-CUP system may be configured to switch between one or more modes of imaging, e.g., as controlled by an operator. Some examples of imaging modes that can be employed by a SUP-CUP system of various implementations include: (i) Plano-polarimetric ultrafast (x, y, t, ψ) imaging, (ii) Stereo-polarimetric ultrafast (x, y, z, t, ψ) imaging, and/or (iii) planar ultrafast (x, y, t) imaging. These examples of imaging modes are discussed in Section III(C) and results from implementing these modes may be found in Section IV.

Certain aspects pertain to SP-CUP system and/or methods that employ polarization sensing. System settings for four examples of SP-CUP systems with different arrangements of polarizers are provided in Table 2 and exemplary results from employing the SP-CUP systems and methods may be found in Section IV. Table 3 provides forward models for these four SP-CUP systems and methods with different arrangements of polarizers. These forward models are extensions of Eqn. 3. The spatial resolution and temporal resolution for these four SP-CUP systems under each setting are quantified in Section IV(D).

A. Data Acquisition

In the data acquisition process of various aspects of an SP-CUP imaging method, a transient scene is imaged in two time-unsheared views and four time-sheared views. For example, during data acquisition of the implementations of the SP-CUP system 100 in FIG. 1A, the SP-CUP system 200 in FIG. 2A, and the SP-CUP system 400 in FIG. 4, a dynamic scene is imaged in two time-unsheared views (Views 1-2) and four time-sheared views (Views 3-6). FIG. 5 provides a schematic drawing illustrating details of imaging in two time-unsheared projected views and four time-sheared projected views.

The time-unsheared views (Views 1 and 2) may directly record the dynamic scene similar to conventional photography. The measured optical energy distributions of the two time-unsheared views (Views 1 and 2) are denoted as $E_1$ and $E_2$. Each of the four time-sheared views (Views 3, 4, 5 and 6) uses the compressed-sensing paradigm to record the dynamic scene. Specifically, in each time-sheared view, the dynamic scene is first spatially encoded, then temporally sheared, and finally spatiotemporally integrated. The measured optical energy distributions of the four time-sheared views (Views 3, 4, 5 and 6) are denoted as $E_3$, $E_4$, $E_5$, and $E_6$, respectively. Mathematically, the six raw views (Views 1-6) can be linked to the intensity distribution of a dynamic scene $I(x, y, t)$ as follows:

$$\begin{bmatrix} E_1 \\ E_2 \\ E_3 \\ E_4 \\ E_5 \\ E_6 \end{bmatrix} = \begin{bmatrix} TF_1 \\ R_d T D_2 F_2 R_p \\ TSD_3 F_3 C_{[10]} \\ TSD_4 F_4 C_{[01]} \\ R_d TSD_5 F_5 C_{[10]} R_p \\ R_d TSD_6 F_6 C_{[01]} R_p \end{bmatrix} I(x, y, t) \qquad \text{(Eqn. 3)}$$

where:
T represents spatiotemporal integration, $F_j$ (j=1, . . . , 6) represents spatial low-pass filtering due to the optics of View j,
$R_d$ represents the 180° digital image rotations conducted by the external CCD camera and the streak camera,
$D_i$ (i=2, . . . , 6) represents image distortion with respect to View 1,
$R_p$ represents the 180° physical image rotation induced by the dove prism,
S represents temporal shearing, and
$C_{[10]}$ and $C_{[01]}$ represent spatial encoding of a pair of complementary masks realized by the "ON" and "OFF" DMD pixels, respectively.

In certain aspects, stereoscopic sensing (denoted by operators $Z_L$ and $Z_R$) and/or polarization sensing (denoted by operators $P_0$ and $P_{45}$) is incorporated in the SUP-CUP imaging systems and/or methods. For example, SP-CUP systems may include one or more polarization filters such as, e.g., the SP-CUP systems 100, 200, 400 shown in FIGS. 1A, 1B, and 4. System settings for four examples of SP-CUP systems with different arrangements of polarizers are provided in Table 2 and exemplary results from employing the SP-CUP systems and methods may be found in Section IV. Table 3 provides forward models for these four SP-CUP systems and methods with different arrangements of polarizers. These forward models are extensions of Eqn. 3. The spatial resolution and temporal resolution for these four SP-CUP systems under each setting are quantified in Section IV(D).

Eqn. 3 can be modified to the following concatenated form:

$$E = OI(x,y,t), \qquad \text{(Eqn. 4)}$$

where E represents the joint measurement of energy distributions of selected views required by a specific experiment, and the joint operator O accounts for all operations from each selected view.

FIG. 5 is a schematic illustration of a data acquisition process of an SP-CUP method, according to various implementations. FIG. 5 shows a multi-view projection in SP-CUP's data acquisition illustrated by a y-t slice in a datacube. The illustrated example depicts a matrix 510 of the original datacube and a matrix 511 that is rotated by 180 degrees. In the two time-unsheared views (Views 1 and 2) 520, the projection direction is parallel with the t-axis. In the first two time-sheared views (Views 3 and 4) 540, the datacube is first temporally sheared 542, 544 and then spatiotemporally integrated 546, 548. The illustrated example depicts a matrix 532 and a matrix 534 spatially encoded by complementary patterns that are temporally sheared 542, 544 and then spatiotemporally integrated 546, 548. It is equivalent to directly spatiotemporally integrating the original datacube in a tilted direction that is not parallel with the t-axis. Similarly, the other two time-sheared views (Views 5 and 6) 560 will provide another projection view. In the second two time-sheared views (Views 5 and 6) 560, the datacube is first temporally sheared 562, 564 and then spatiotemporally integrated 566, 568. The illustrated example depicts a matrix 536 and a matrix 538 spatially encoded by complementary patterns that are temporally sheared 562, 564 and then spatiotemporally integrated 566, 568. The complementary spatial encoding (i.e., $C_{[10]} + C_{[01]}=1$) of the two time-sheared views (Views 3 and 4) may ensure that no information is lost in the combined projection view. Similarly, the other two time-sheared views (Views 5 and 6) will provide another combined lossless projection view. For the purpose of illustration, the "black" blocks and the "non-black" blocks in the matrices represent the spatial encoding and the gray variations in the blocks in matrices 510, 511 in Views 1 and 2 represent spatial intensity variations of the imaged subject. Since the dove prisms or other rotating device in the dual-channel generation subsystem have provided image rotation, the projection direction (first oblique angle) of the second pair of time-sheared views (Views 5 and 6) 560 is opposite the projection direction (second oblique angle) of the second pair of time-sheared views (Views 3 and 4) 540. As shown, the SP-CUP method includes two shearing directions in the time-sheared views (Views 3-6) enabled by the image rotation in the dual-channel generation subsystem. The projection direction of the second pair of time-sheared views (Views 5 and 6) 560 is opposite the projection direction of the second pair of time-sheared views (Views 3 and 4) 540. In the two time-unsheared views (Views 1-2), because the projection is parallel to the time axis, the spatial information is retained while temporal information is discarded. In the four time-sheared views (Views 3-6), the temporal information is preserved by projecting the scene from two oblique angles. Altogether, the three projection views can be used to enrich the observation to the transient scene.

Examples of expressions derived for Views 2, 5 and 6

For simplicity, polarization sensing (denoted by operators $P_o$ and $P_{45}$) and stereoscopic sensing (denoted by operators $Z_L$ and $Z_R$) are not considered in the derivation of explicit expressions for the Views 2, 5 and 6. The model of data acquisition in Views 1, 3 and 4 have been presented in Liang, J. et al., "Single-shot real-time video recording of photonic Mach cone induced by a scattered light pulse," Sci. Adv. 3, e1601814 (2017), which is hereby incorporated by reference in its entirety.

In deriving explicit expressions for Views 2, 5 and 6, for simplicity without losing generality, the following two assumptions are made. First, the imaging system has a unit magnification. Second, the two-dimensional light detector capturing Views 1-2 and the image sensor of the streak camera capturing Views 3-6 have the same pixel size, denoted as d. To accommodate the streak camera's setting and simplify the notation, a voxel of (d, d, $\tau_s$) in size is selected, in the x-y-t space, where $$\tau_s = \frac{d}{v},$$

and v denotes the temporal shearing speed. In the following, the expression of SP-CUP's data acquisition process in the continuous model is first derived and then it is discretized for the image reconstruction process.

In the second time-unsheared view (View 2), the input dynamic scene is rotated by a dove prism (or other rotating device), $$I_{R_p}(x,y,t)=R_p\{I(x,y,t)\}=I(-x,-y,t), \quad \text{(Eqn. 5)}$$

where $R_p$ represents the 180° physical image rotation.

Second, the dynamic scene is spatially low-pass filtered by a lens of the first camera with the two-dimensional light detector (e.g., CCD), $$I_{F_2}(x,y,t)=F_2\{I_{R_p}(x,y,t)\}, \quad \text{(Eqn. 6)}$$

where $F_2$ represents the spatial low-pass filtering operator.

Next, an image distortion operator, $D_2$, is applied to $I_{F_2}(x, y, t)$, $$I_{D_2}(x,y,t)=D_2\{I_{F_2}(x,y,t)\}. \quad \text{(Eqn. 7)}$$

Then, $I_{D_2}$(x, y, t) is measured by the first camera by:

$$E_{2T}[m, n] = \quad \text{(Eqn. 8)}$$
$$T\{I_{D_2}(x, y, t)\} = \int dx \int dy \left\{ \left[ \int dt I_{D_2}(x, y, t) \right] \cdot rect\left[ \frac{x}{d} - \left(m + \frac{1}{2}\right)\frac{y}{d} - \left(n + \frac{1}{2}\right) \right] \right\},$$

Finally, $E_{2T}$[m, n] is digitally rotated by 180°.

$$E_2[m,n]=R_d\{E_{2T}[m,n]\}=E_{2T}[-m,-n], \quad \text{(Eqn. 9)}$$

where $R_d$ represents the 180° digital image rotation conducted by the first camera and the (second) streak camera.

Thus, the measured optical energy distribution at the second time-unsheared view is given by:

$$E_2[m, n] = \int dx \int dy \quad \text{(Eqn. 10)}$$
$$\left\{ \left[ \int dt I_{D_2}(x, y, t) \right] \cdot rect\left[ \frac{x}{d} + \left(m - \frac{1}{2}\right)\frac{y}{d} + \left(n - \frac{1}{2}\right) \right] \right\}.$$

Eqn. 10 indicates that the value in image pixel [m, n] in $E_2$ will be equal to that of pixel [−m, −n] in the discretized $I_{D_2}$(x, y, t).

For View 5, the dynamic scene is physically rotated by 180° [(Eqn. 5)]. Then, the intensity distribution of the dynamic scene is spatially encoded by a pseudo-random binary pattern displayed on a digital micromirror device (DMD), $c_{[10]}$ (x, y), yielding the following intensity distribution, $$I_{C_5}(x,y,t)=C_{[10]}(x,y)I_{R_p}(x,y,t). \quad \text{(Eqn. 11)}$$

Next, the spatially-encoded dynamic scene passes through the imaging system to the entrance port of the streak camera.

It is spatially low-pass filtered by the 4f imaging system between the spatially-encoding device (e.g., DMD) and the streak camera:

$$I_{F_5}(x,y,t)=F_5\{I_{C_5}(x,y,t)\}, \quad \text{(Eqn. 12)}$$

where $F_5$ denotes the spatial low-pass filtering operator in this time-sheared view.

Then, an image distortion operator is applied to $I_{F_5}(x, y, t)$, $$I_{D_5}(x,y,t)=D_5\{I_{F_5}(x,y,t)\}, \quad \text{(Eqn. 13)}$$

where $D_5$ is due to image distortion from primarily the encoding arm and secondarily system misalignment. In stereoscopy, $D_5$ also includes distortion of the imaging lens $D_2$.

Next, the dynamic scene is captured by the streak camera. The temporal shearing along the vertical spatial axis can be expressed by:

$$I_{S_5}(x,y,t)=S\{I_{D_5}(x,y,t)\}=I_{D_5}(x,y-vt,t). \quad \text{(Eqn. 14)}$$

As the next step, $I_{S_5}(x, y, t)$ is imaged by an image sensor (e.g., CMOS image sensor) in the streak camera. Akin to the time-unsheared view, the optical energy measured by the [m, n] pixel on the image sensor takes the form:

$$E_{ST}[m,n] = \int dx \int dy \left\{ \left[ \int dt I_{S_5}(x,y,t) \right] \cdot rect\left[\frac{x}{d}-\left(m+\frac{1}{2}\right), \frac{y}{d}-\left(n+\frac{1}{2}\right)\right] \right\}. \quad \text{(Eqn. 15)}$$

Finally, $E_{ST}[m, n]$ is digitally rotated by 180°, $$E_5[m,n]=R_d\{E_{ST}[m,n]\}=E_{ST}[-m,-n]. \quad \text{(Eqn. 16)}$$

The optical energy distribution of the third time-sheared view (View 5) is given by:

$$E_5[m,n] = \int dx \int dy \left\{ \left[\int dt I_{S_5}(x,y,t)\right] \cdot rect\left[\frac{x}{d}+\left(m-\frac{1}{2}\right), \frac{y}{d}+\left(n-\frac{1}{2}\right)\right] \right\}. \quad \text{(Eqn. 17)}$$

Similarly, expression of the fourth time-sheared view (View 6) is given by:

$$E_6[m,n] = \int dx \int dy \left\{ \left[\int dt I_{S_6}(x,y,t)\right] \cdot rect\left[\frac{x}{d}+\left(m-\frac{1}{2}\right), \frac{y}{d}+\left(n-\frac{1}{2}\right)\right] \right\}. \quad \text{(Eqn. 18)}$$

To use this forward model in a compressed sensing-based reconstruction process, the dynamic scene needs to be further discretized to derive a discrete-to-discrete model. The discrete form of Views 1, 3, and 4 have been described in Liang, J. et al., "Single-shot real-time video recording of photonic Mach cone induced by a scattered light pulse," *Sci. Adv.* 3, e1601814 (2017), which is hereby incorporated by reference in its entirety. Here, the discrete form for Views 2, 5, and 6 is derived.

The discrete form of the dynamic scene can be expressed as $$I[m,n,k] = \int dt \int dx \int dy\, I(x,y,t) \cdot rect\left[\frac{x}{d}-\left(m+\frac{1}{2}\right), \frac{y}{d}-\left(n+\frac{1}{2}\right), \frac{t}{\tau_s}-\left(k+\frac{1}{2}\right)\right]. \quad \text{(Eqn. 19)}$$

The measurement of View 2 can now be approximated by the following discrete form:

$$E_2[m,n] = \frac{d^3}{v} \sum_k [f_{D_2}, g_{D_2}, k] \quad \text{(Eqn. 20)}$$

Here, $h_2$ is the discrete convolution kernel of the operator $F_2$, while $f_{D_2}$ and $g_{D_2}$ are the discrete coordinates transformed according to the operator $D_2$. Given the calibrated 2D projection transformation defined by a 3-by-3 matrix, $$\begin{bmatrix} a_{11} & a_{12} & a_{13} \\ a_{21} & a_{22} & a_{23} \\ a_{31} & a_{32} & 1 \end{bmatrix}, \quad \text{(Eqn. 21)}$$

one can express the coordinates $f_{D_2}$ and $g_{D_2}$ explicitly as $$f_{D_2} = \text{round}\left(\frac{a_{11}m+a_{12}n+a_{13}}{a_{31}m+a_{32}n+1}\right), \quad \text{(Eqn. 22)}$$

$$g_{D_2} = \text{round}\left(\frac{a_{21}m+a_{22}n+a_{23}}{a_{31}m+a_{32}n+1}\right). \quad \text{(Eqn. 23)}$$

For View 5, the encoding mask is discretized to be $c_{[10]}[m, n]$, and the encoded dynamic scene can be expressed in discrete form as:

$$I_{C_5}[m,n,k]=c_{[10]}[m,n]\cdot I_{R_p}[m,n,k]. \quad \text{(Eqn. 24)}$$

Therefore, the discretized form of View 5 can be represented by:

$$E_5[m,n] = \frac{d^3}{v} \sum_k (h_5 * I_{C_5})[f_{D_5}, g_{D_5}-k, k]. \quad \text{(Eqn. 25)}$$

Following the same procedure of Eqns. 19-25, the discretized form of View 6 can be derived as:

$$E_6[m,n] = \frac{d^3}{v} \sum_k (h_6 * I_{C_6})[f_{D_6}, g_{D_6}-k, k]. \quad \text{(Eqn. 26)}$$

In summary, the measured optical energy distributions of Views 1-6 are linked to the dynamic scene by the following set of equations:

$$E_1[m,n] = \frac{d^3}{v} \sum_k (h_1 * I)[m,n,k], \quad \text{(Eqn. 27(a) - (f))}$$

$$E_2[m,n] = \frac{d^3}{v} \sum_k (h_2 * I)[f_{D_2}, g_{D_2}, k],$$

-continued $$E_3[m, n] = \frac{d^3}{v} \sum_k (h_3 * I_{C_3})[f_{D_3}, g_{D_3} + k, k],$$

$$E_4[m, n] = \frac{d^3}{v} \sum_k (h_4 * I_{C_4})[f_{D_4}, g_{D_4} + k, k],$$

$$E_5[m, n] = \frac{d^3}{v} \sum_k (h_5 * I_{C_5})[f_{D_5}, g_{D_5} - k, k],$$

$$E_6[m, n] = \frac{d^3}{v} \sum_k (h_6 * I_{C_6})[f_{D_6}, g_{D_6} - k, k].$$

B. Reconstruction process

Given the known operator O of the selected views implemented by the SP-CUP system/method and the spatiotemporal sparsity of the dynamic scene, the I(x, y, t) can be recovered by solving the following inverse problem:

$$\hat{I} = \operatorname{argmin}_I \left\{ \frac{1}{2} \|E - OI\|_2^2 + \beta \Phi_{TV}(I) \right\}. \quad \text{(Eqn. 28)}$$

In certain aspects, the SP-CUP method includes a calibration process that fully aligns the spatial positions of the views being implemented and calibrates the energy ratios between them. After the calibration process is implemented, the E is sent into a set of reconstruction operations, which may be based on the TwIST process in some cases, to reconstruct the dynamic scene. An example of a dynamic scene can be found in Bonse, J., Bachelier, G., Siegel, J. & Solis, J., "Time- and space-resolved dynamics of melting, ablation, and solidification phenomena induced by femtosecond laser pulses in germanium," Phys. Rev. B 74, 134106 (2006), which is hereby incorporated by reference in its entirety. The details of examples of a calibration process are provided in Section III(E).

As discussed in Section III with reference to FIG. 5, an SP-CUP method of certain aspects provides projection views of the dynamic scene from three different angles. First, the two time-unsheared views (i.e., Views 1-2) record only spatial information without temporal information. Therefore, the projection angle, determined by unsheared temporal integration, is parallel to the t axis. Second, the first and second time-sheared views (Views 3-4) record both spatial and temporal information through temporal shearing. The spatiotemporal integration is operated on a spatially-encoded and temporally-sheared datacube. In the original datacube (See, e.g., the matrix 510 labeled with I in the center of FIG. 5), the aforementioned spatiotemporal integration operation is equivalent to integrating along a tilted direction that is oblique to the t axis (See, e.g., the matrix 540 at the top right corner of FIG. 5). Third, following the same scheme, the third and fourth time-sheared views (Views 5-6) form the third projection view. However, because the dove prism (or other rotating device) induces a 180° image rotation, the integration direction is opposite to that in the second projection view (See, e.g., the matrix 560 at the bottom right corner of FIG. 5). Overall, the SP-CUP method of these aspects may enrich the observation by providing three distinct projection views of the dynamic scene.

C. Exemplary SP-CUP Imaging Methods

In certain aspects, an SP-CUP imaging method includes two parts. The first part includes a reconstruction of the spatiotemporal datacubes. The second part includes determining the depth (z) and/or the polarization states, based on the reconstructed spatiotemporal frames.

Figure 6A:
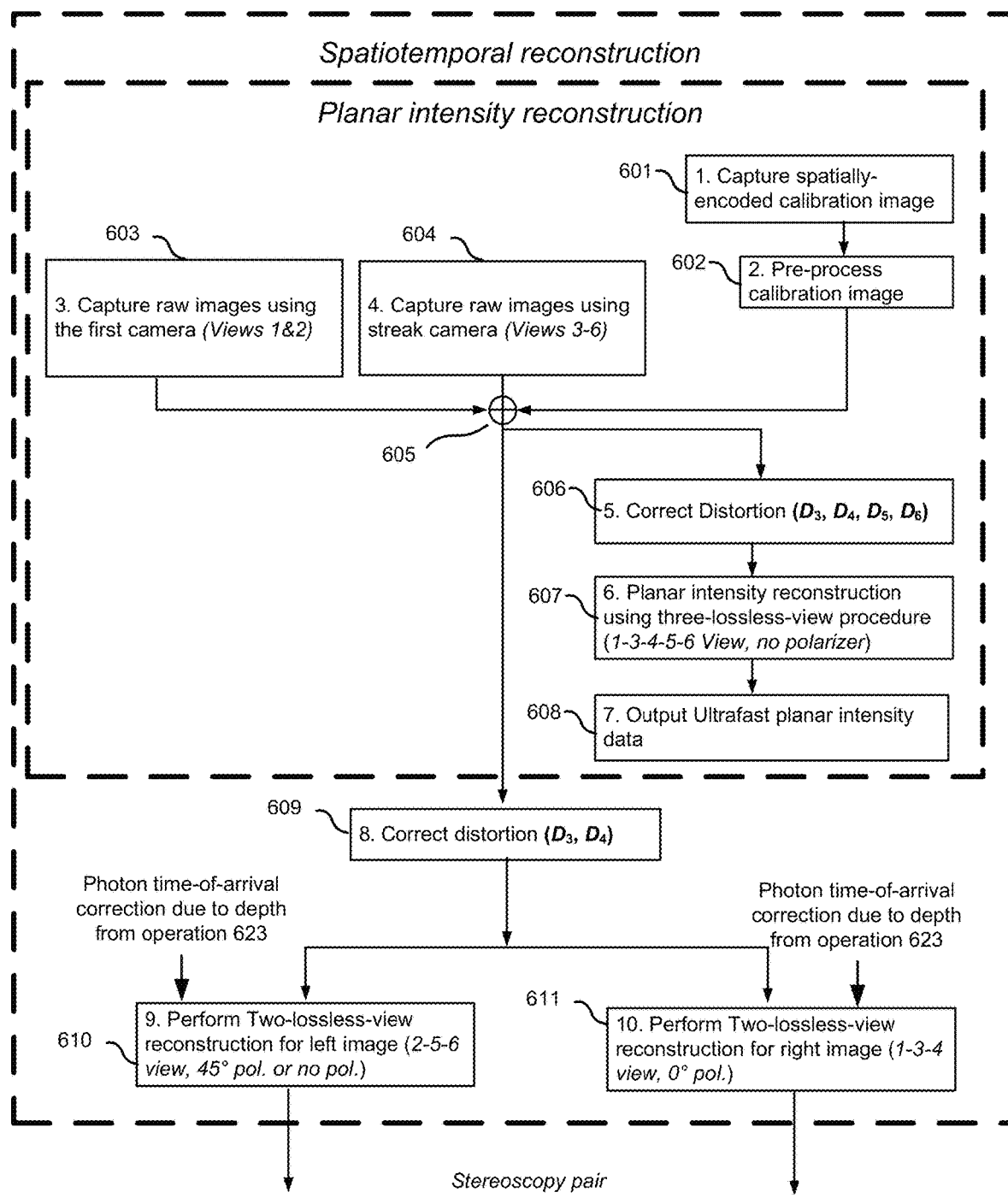
FIGS. 6A and 6B depict a flowchart of operations of an exemplary SP-CUP imaging method, according to various implementations.
Figure 6B:
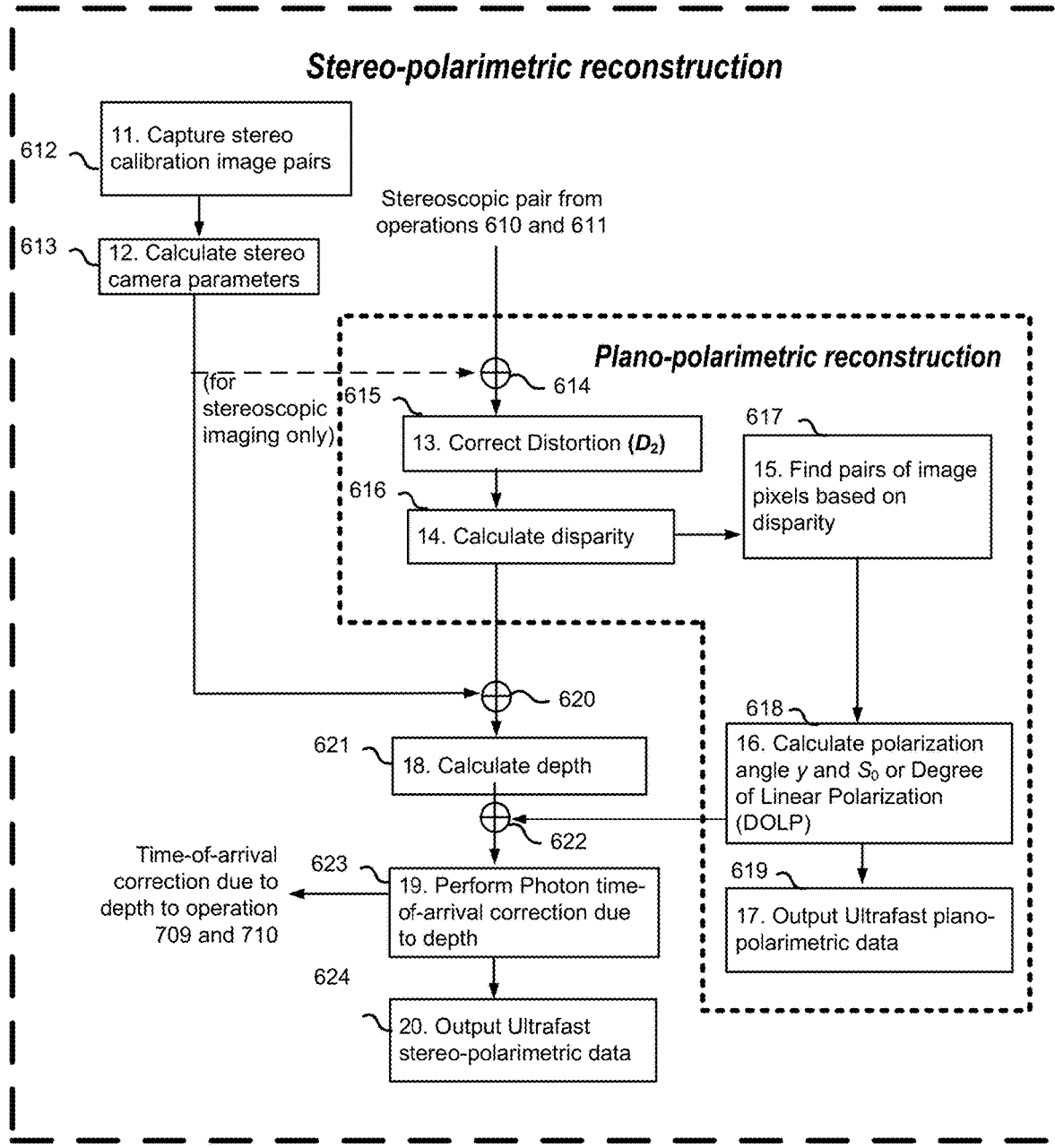

FIGS. 6A and 6B depict a flowchart of operations of an exemplary SP-CUP imaging method, according to various implementations. In this example, one or more of the following imaging modes can be implemented: (i) Plano-polarimetric ultrafast (x, y, t, ψ) imaging, (ii) Stereo-polarimetric ultrafast (x, y, z, t, ψ) imaging, and (iii) planar ultrafast (x, y, t) imaging. Examples of implementations of SP-CUP systems that employ one or more imaging modes are described in Section III. In an example of an implementation that employs the planar ultrafast (x, y, t) imaging mode, no polarizer was introduced in a view of the SP-CUP system. In an example of an implementation that employs both plano-polarimetric and stereo-polarimetric ultrafast imaging, two polarizers were introduced in two views of the SP-CUP system. In an example of an implementation that was used for imaging pulse propagation, a single polarizer was introduced in a view of the SP-CUP system. An example of an SP-CUP system that is configured or configurable to perform a plano-polarimetric ultrafast (x, y, t, ψ) imaging mode is described in Section IV(A). An example of an SP-CUP system that is configured or configurable to perform stereo-polarimetric ultrafast (x, y, z, t, ψ) imaging is described in Section IV(B). An example of an SP-CUP system that is configured or configurable to perform planar ultrafast (x, y, t) imaging is described in Section IV(C).

The flowchart in FIGS. 6A and 6B depicts an exemplary SP-CUP imaging method with (i) a spatiotemporal reconstruction part, and (ii) a stereo-polarimetric reconstruction part. The spatiotemporal reconstruction part includes a planar intensity reconstruction portion. The stereo-polarimetric reconstruction part includes a plano-polarimetric reconstruction portion. In an example where a planar ultrafast (x, y, t) imaging mode is implemented, a polarizer may not be included in a view of an SP-CUP system. In an example where both plano-polarimetric and stereo-polarimetric ultrafast imaging are implemented, two polarizers may be introduced in two views of the SP-CUP system.

In the spatiotemporal reconstruction part of the illustrated image reconstruction process, the spatiotemporal datacubes are reconstructed. In the planar intensity reconstruction subpart, a three-lossless-view procedure was used. A two-lossless-view procedure was used for each image in the stereoscopic image pair for the reconstructions of the depth and the polarization angle in the stereo-polarimetric reconstruction part.

At operation 601 of the planar intensity reconstruction portion, a spatial-encoding calibration image is captured, e.g., by the streak camera with the two-dimensional light detector. At operation 602, the spatial-encoding calibration image is pre-processed with a calibration process such as the calibration process described in Section III(E). At operation 603, raw images are captured using the first camera with the two-dimensional light detector (e.g., the light detector 150 in FIG. 1A, the light detector 250 in FIG. 2B, or the light detector 450 in FIG. 4) (Views 1-2). At operation 604, raw images are captured using the streak camera (e.g., the streak camera 182 in FIG. 1A, the streak camera in FIG. 2A, or the streak camera 482 in FIG. 4) (Views 3-6). At operation 605, all the images from operations 602-604 are brought together for following operations. At operation 606, the distortion in images is corrected using distortion operators ($D_3$, $D_4$, $D_5$, $D_6$). A discussion of calibration of the distortion operators for all views as discussed in Section III(E)(2). At operation 607, planar intensity reconstruction is performed using three-lossless-view procedure with Views 1-6 and no polarizer implemented. The planar intensity reconstruction generates planar intensity data. At operation 608, the planar intensity data is output. If only the planar ultrafast (x, y, t) imaging mode were being implemented, the SP-CUP method would end at this operation.

At operation 609, the distortion in images is corrected using distortion operators ($D_3$, $D_4$). At operation 610, reconstruction is performed using two-lossless-view procedure for a left image (2-5-6 views with 45° pol. or no pol.). At operation 611, reconstruction is performed using two-lossless-view procedure for a right image (1-3-4 views with 0° pol.). The photon time-of-arrival correction due to depth from operation 623 on FIG. 6B is used to perform the reconstructions at operations 610 and 611. The stereoscopy pair of the right image and the left image are output from operations 610 and 611 to the stereo-polarimetric reconstruction part.

At operation 612 of FIG. 6B in the stereo-polarimetric reconstruction part, the stereo calibration image pairs are captured, e.g., by the first camera. At operation 613, the stereo camera parameters are calculated. An example of calculations that be used can be found in Mathworks, "*Stereo Camera Calibration*,"<<https://www.mathworks.com/help/vision/stereo-camera-calibration.html>> and <<https://www.mathworks.com/help/vision/ref/stereocameracalibrator-app.html>>.

In the plano-polarimetric reconstruction portion, at operation 614, the images for the stereoscopic pair from operations 610 and 611 are brought together for following operations. If there is stereoscope imaging only, the parameters from operation 613 are used at operation 614. At operation 615, the distortion in images is corrected using distortion operators ($D_2$). At operation 616, the disparity in the pixels between the left and right images is calculated. At operation 617, pairs of image pixels are found based on the disparity calculated. At this operation, for example, a pair of image pixels in the two channels that both correspond to the same point in the subject is located based on the calculated disparity map. At operation 618, the polarization angle y and $S_0$ or Degree of linear polarization (DOLP) is calculated. At operation 619, the plano-polarimetric data is output. If the plano-polarimetric ultrafast (x, y, t, ψ) mode only were being implemented, the SP-CUP method would end at this operation. If not, the polarization angle y and $S_0$ or degree of linear polarization (DOLP) calculated at operation 618 is output to operation 622. At operation 621, the output from operation 620 is used to calculate depth (z). At operation 622, the output from operation 621 and the polarization angle y and $S_0$ or degree of linear polarization (DOLP) calculated at operation 618 are used to perform photon time-of-arrival correction due to depth. At operation 624, the stereo-polarimetric data is output.

In the stereo-polarimetric reconstruction part (second part) of the reconstruction, the other photon tags are retrieved such as the depth and the polarization angle, using the reconstructed spatiotemporal frames from operations 610 and 611. At operation 616, the disparity is taken into account when pairing pixels in the left and right images to calculate ψ and $S_0$. For plano-polarimetric ultrafast imaging, a constant parallax (or disparity) over the entire field of view is considered since all of the objects were in a same plane perpendicular to the optical axis. Time of arrival of photons due to the different depths of the shapes is corrected for in stereo-polarimetric ultrafast imaging operation at operation 623.

The distortion operators of all six raw views are $D_i$ (i=1, ..., 6), in which $D_5=D_3 D_2$ and $D_6=D_4 D_2$. In distortion correction of the 3D intensity imaging portion at operation 606, operators $D_3$, $D_4$, $D_5$ and $D_6$ were directly determined by an image-intensity-based co-registration process with the mean squared error as the metric. An example of an image-intensity-based co-registration process that can be found in Liang, J. et al., "Single-shot real-time video recording of photonic Mach cone induced by a scattered light pulse," *Sci. Adv.* 3, e1601814 (2017), which is hereby incorporated by reference in its entirety. However, in spatiotemporal reconstructions of plano- and stereo-polarimetric ultrafast imaging mode, only $D_3$ and $D_4$ are calibrated at operation 609. $D_3$ was applied to Views 3 and 5, while $D_4$ was applied to Views 4 and 6 at operations 610 and 611. The correction of $D_2$ was carried out for Views 5 and 6 at operation 615. Here, $D_2$ represents distortion in the left image in stereoscopy with respect to the right image (i.e., $D_1=1$). More details on $D_2$ calibration may be found in Section III(E).

D. Stereoscopy

Stereoscopy is widely used in machine vision for 3D profiling. Examples of using stereoscopy can be found in Gosta, M. & Grgic, M., "Accomplishments and challenges of computer stereo vision," 57-64 and Lazaros, N., Sirakoulis, G. C. & Gasteratos, A., "Review of stereo vision algorithms: from software to hardware," Int. J. Optomechatronics 2, 435-462 (2008), which are hereby incorporated by reference in their entireties.

1. Operating Principle of Stereoscopy

In various implementations, the left and right images from the dual-channel generation subsystems can be captured and reconstructed by Views 2, 5, and 6 and Views 1, 3, and 4, respectively. In certain cases, the SP-CUP system is first calibrated for the geometric parameters, primarily the distortions [$D_2$], focal length (f), and baseline separation between the left and right images (l) as discussed in detail in Section III(E)(2). The baseline, which connects the centers of the stereoscopic (left and right) images, is in the horizontal direction. Semi-global block matching may be employed to find a map of δ, which is the disparity between the left and right images, in the unit of pixels. A larger δ means that the object is closer and vice versa. Subsequently, depth was computed via:

$$z=(f \times l)/(\delta \times d) \quad \text{(Eqn. 29)}$$

where d is the sensor's pixel size. Together with the polarimetric sensing ability, an SP-CUP system can record five-dimensional data containing (x, y, z, t, ψ) information in a single shot.

2. Calibration and Distortion Corrections of Stereoscopic Measurements

Figure 7:
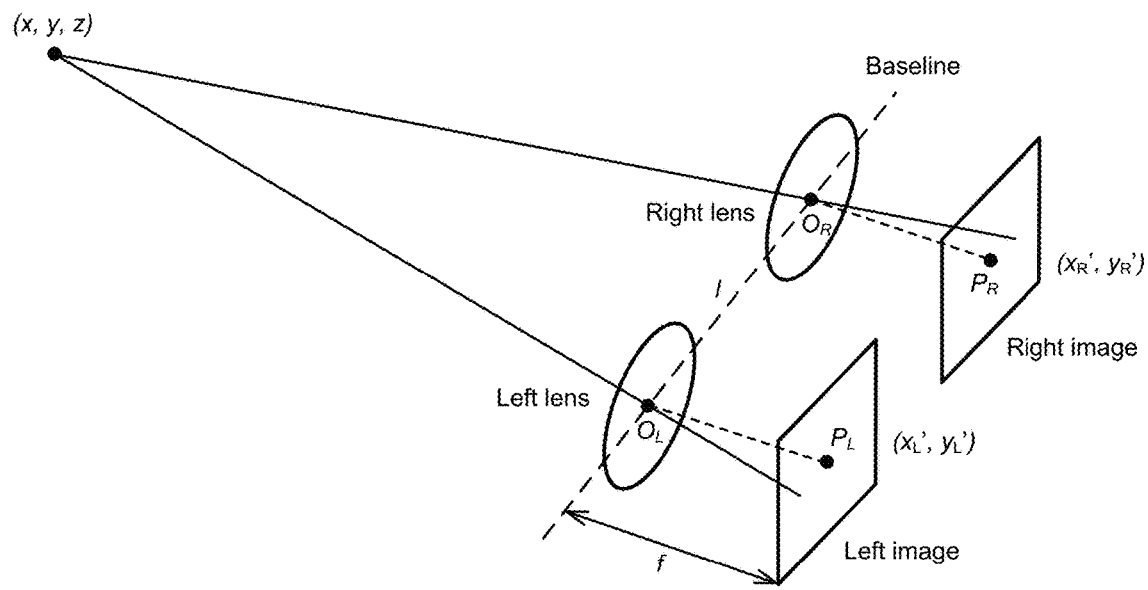
FIG. 7 is a schematic diagram illustrating the working principle of common-main-objective stereoscopy, according to various implementations.

FIG. 7 is a schematic diagram illustrating the working principle of common-main-objective stereoscopy, according to various implementations. In this illustrated example, two identical imaging lenses of focal length f are separated by a distance of l on the baseline ($O_L O_R$). $O_L$ and $O_R$ are the optical centers of the lenses. $P_L$ and $P_R$ are the centers of the left and right images. Any point in 3D space (x, y, z) is projected to ($x_L'$, $y_L'$) and ($x_R'$, $y_R'$) in the left and right images, respectively. Due to parallax, the two acquired images (named left image and right image) are displaced from one another. The disparity between the two image points in the baseline direction (here, in the x-direction) is $\delta=x_R'-x_L'$.

Figure 8:
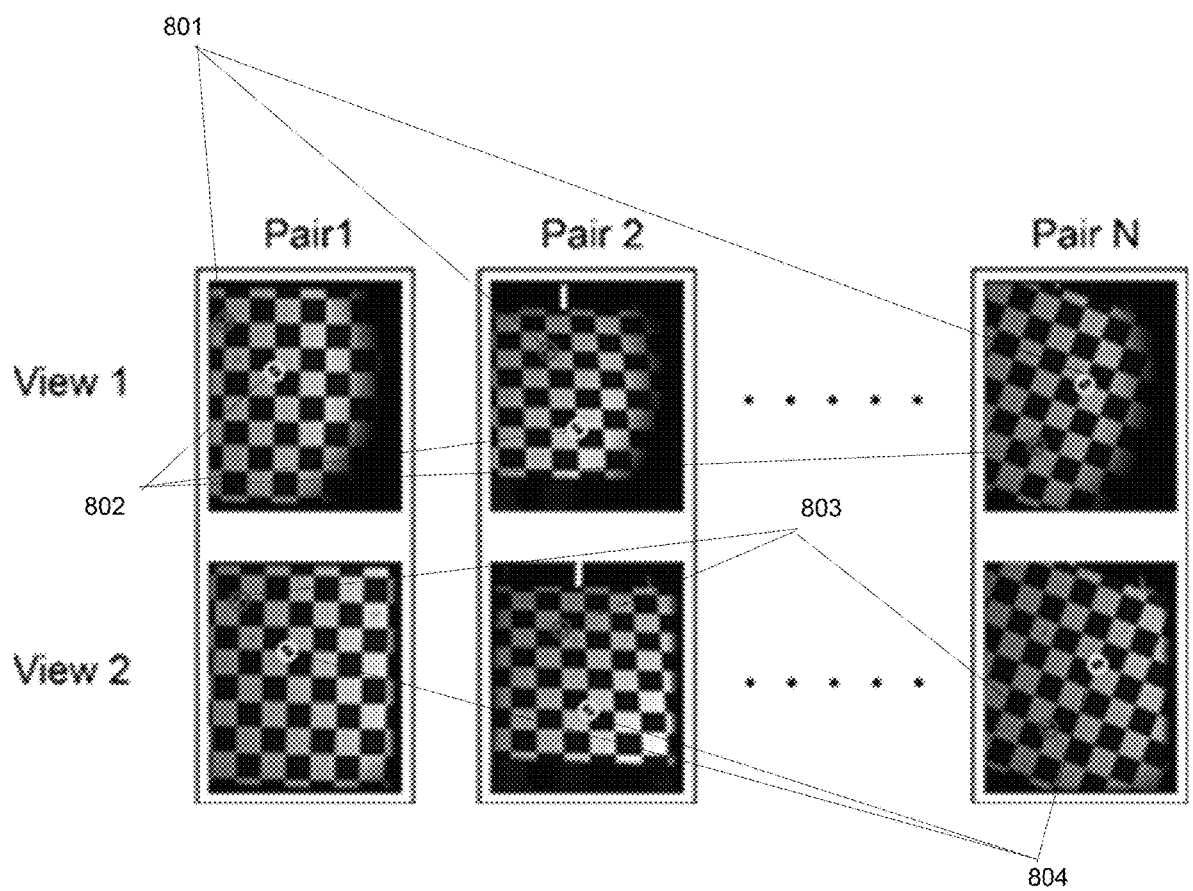
FIG. 8 is an illustration of a set of N imaging pairs (Views 1 and 2), according to an implementation.

The purpose of calibration is to obtain the intrinsic, extrinsic, and distortion parameters of the stereoscopic camera, based on the spatial coordinates of a group of detected corners in N image pairs (N>3). FIG. 8 illustrates an example of a set of N imaging pairs that can be captured by a first camera of an SP-CUP system (Views 1 and 2), according to an implementation. A checkerboard of 10 mm squares was the subject being imaged. In different image pairs, the checkerboard was placed at different positions and angles. The circles represent paired corners between the image pairs. The circles 801 represent a first set of paired corners in View 1. The circles 802 represent a second set of paired corners in View 2. The circles 803 represent a first set of paired corners in View 2. The circles 804 represent a second set of paired corners in View 2. Any point in the object space (x, y, z) is projected to image point (x', y') by:

$$\text{Constant} \times \begin{bmatrix} x' \\ y' \\ 1 \end{bmatrix} = \begin{bmatrix} f_x & s & c_x \\ 0 & f_y & c_y \\ 0 & 0 & 1 \end{bmatrix} \times [R \ T] \times \begin{bmatrix} x \\ y \\ z \\ 1 \end{bmatrix}. \quad \text{(Eqn. 30)}$$

Here, $f_x$ and $f_y$ are the lens' focal lengths in the horizontal and vertical directions, s is the image skew, and $c_x$ and $c_y$ are the coordinates of the optical center. Matrices R and T are the rotation and translation transformations of the camera. As distortions are nonlinear, they are not included in this expression. MATLAB Image Processing Toolbox was employed for fast and accurate calibration. An example of camera calibration can be found in "Mathworks. What Is Camera Calibration?, <https://www.mathworks.com.help/vision/ug/camera-calibration.html#buyr2qb-2>, which is hereby incorporated by reference in its entirety. An example of stereo camera calibration can be found in "Mathworks. *Stereo Camera Calibration*," <https://www.mathworks.com/help/vision/stereo-camera-calibration.html> Accessed on Jul. 7, 2018, which is hereby incorporated by reference in its entirety.

Figure 9:
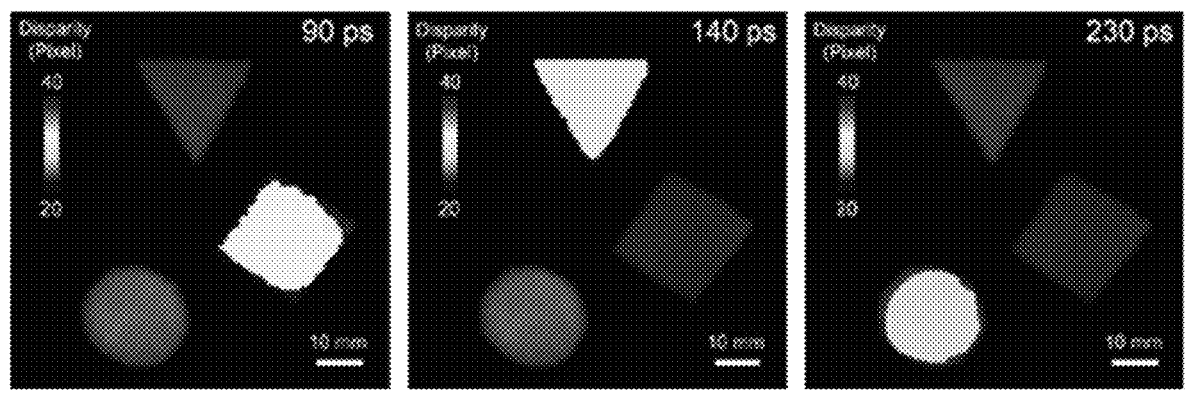
FIG. 9 depicts disparity maps calculated at three time frames, according to one aspect.

In certain examples, the calibrated values of the key stereoscopic parameters were focal length f=9.18 mm and lateral translation between the two cameras (i.e., the baseline separation) l=8.56 mm. The pixel size is d=3.69 μm. Then the depth z of any point can be calculated by Eqn. 29. When applying the semi-global block matching (SGBM) method in disparity (δ) calculation, an optimal block size of 17 pixels and a disparity range of (22, 38) was selected. An example of a SGBM method can be found in Hirschmuller, H., "Accurate and efficient stereo processing by semi-global matching and mutual information," 2005 *IEEE Computer Society Conference on Computer Vision and Pattern Recognition* (*CVPR'05*) 807-814 (2005), which is hereby incorporated by reference in its entirety. SGBM works by calculating cross-correlations between the blocks with different spacings. In some cases, SGBM may end up with a small number of mirror patches of pixels that are missing. In these cases, a filling process may be used to detect any empty patches, and use 2D linear interpolation to fill them in on the basis of the prior knowledge of continuously flat objects. An example of stereo processing can be found in Hirschmuller, H., "Stereo processing by semiglobal matching and mutual information," *IEEE Trans. Pattern Anal. Mach. Intell.* 30, 328-341 (2008), which is hereby incorporated by reference in its entirety. FIG. 9 depicts an example of disparity maps calculated at three time frames, according to one aspect.

Figure 10:
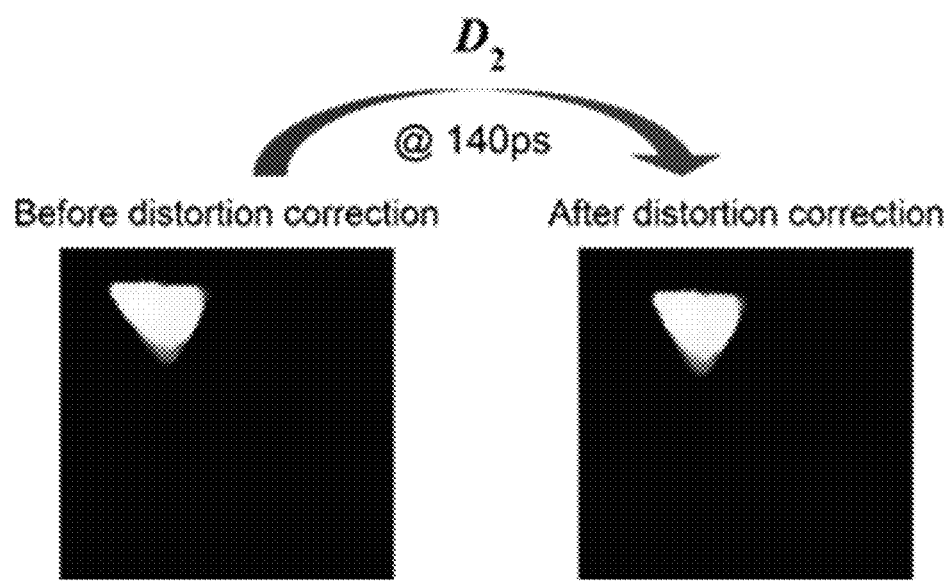
FIG. 10 depicts an example of two images, one before distortion correction and the other after distortion correction, according to an aspect.

Correction of distortion $D_2$ may be important since quantitative stereo imaging relies on the accuracy of pairing pixels in the left and right images that are from the same point in the object. Sub-pixel accuracy may be desired in certain cases. In one aspect, both radial and tangential distortions are considered. FIG. 10 depicts an example of two images, one before distortion correction and the other after distortion correction. In this example, the distortion correction was based on the calibrated stereo camera parameters. An example of a calibration procedure with image correction can be found in Heikkila, J. & Silven, O., "A four-step camera calibration procedure with implicit image correction," *Proceedings of IEEE Computer Society Conference on Computer Vision and Pattern Recognition* 1106-1112 (1997), which is hereby incorporated by reference in its entirety.

For plano-polarimetric ultrafast imaging that does not need stereo calibration, distortion can be simply compensated for by computing the affine transformation matrix between the two time-unsheared views (Views 1 and 2). In examples where planar objects are placed at the same depth, two imaging channels may experience a fixed parallax. This constant parallax can be easily included in $D_2$.

E. Examples of Calibration Process

In certain aspects, the SP-CUP method includes a calibration process that aligns the spatial positions of all views and calibrates the energy ratios between them. For an SP-CUP method that includes stereo-polarimetric imaging, the calibration process includes the stereo calibration operations discussed in Section III(E). In some cases, the calibration process may also include calibration of spatial encoding operation C and calibration of distortion operations $D_1$.

1) Calibration of Spatial-Encoding Operation C

In certain aspects, the SP-CUP method includes a calibration of spatial-encoding operation C. In this calibration process, first background subtraction and white-field correction are performed. A reference image of the DMD code of all '1's is then used to perform white-field correction. Next, a binarization method based on a combination of threshold selection and edge detection is used to generate the binary encoding mask for reconstruction. Examples of white-field correction may be found in Liang, J., Kohn, R. N., Becker, M. F. & Heinzen, D. J., "Homogeneous one-dimensional optical lattice generation using a digital micromirror device-based high-precision beam shaper," J Micro. Nanolithogr. MEMS MOEMS 11, 023002 (2012) and Liang, J., Wu, S.-Y., Kohn, R. N., Becker, M. F. & Heinzen, D. J., "Grayscale laser image formation using a programmable binary mask," Opt. Eng. 51, 108201 (2012), which are hereby incorporated by reference in their entireties.

Figure 11:
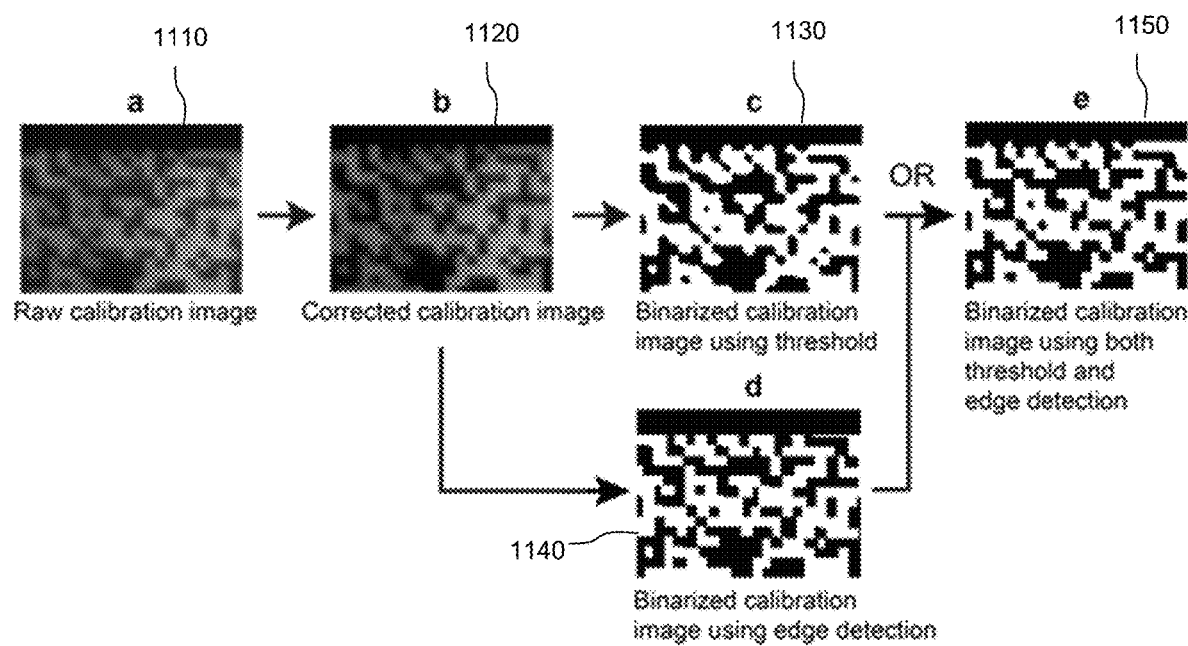
FIG. 11 is a schematic diagram showing the flow of operations for processing the calibration image of an encoded mask, according to an aspect.

FIG. 11 is a schematic diagram showing the flow of operations for processing the calibration image of an encoded mask, according to an aspect. Image 1110 is a section cropped from the raw calibration image. Image 1120 is the corrected calibration image after background subtraction and white-field correction. Image 1130 is the binarized calibration image using thresholding. Image 1140 is the binarized calibration image using edge detection. Image 1150 is the binarized calibration image using both threshold and edge detection. In the process, after background subtraction and white-field correction generates the corrected calibration image 1120, image binarization is performed by applying a threshold to image 1120 to generate binarized calibration image 1130. Image binarization is also performed on the corrected calibration image 1120 by detecting edges to determine the binarized calibration image using edge detection 1140. The binarized calibration image using both threshold and edge detection 1150 is determined by combining (c) and (d) using OR operation.

2) Calibration of Distortion Operators $D_i$

In certain aspects, an SP-CUP method includes a calibration of distortion operators $D_i$. The distortion operators of all six raw views are $D_i$ (i=1, ..., 6), in which $D_5=D_3D_2$ and $D_6=D_4D_2$. $D_3$ and $D_4$ were calibrated first. $D_3$ was applied to Views 3 and 5, while $D_4$ was applied to Views 4 and 6. Later on, the correction of $D_2$ was carried out for Views 5 and 6. Here, $D_2$ represents distortion in the left image in stereoscopy with respect to the right image (i.e., $D_1=1$). Section III(E) includes details regarding the $D_2$ calibration.

F. Examples of TwIST Settings

In certain aspects, an SP-CUP method includes an image reconstruction process developed using a two-step iterative shrinkage/thresholding (TwIST) process to reconstruct the dynamic scene. An example of TwIST parameters that provided optimal or near optimal results in an SP-CUP image reconstruction process of certain implementations is provided in Table 1. In certain examples, the listed parameters in Table 1 provided 94.58% in point cloud completeness, which describes the number of reconstructed points over the total number of object points. Examples of reconstructed points can be found in Zhu, L. et al., "Space- and intensity-constrained reconstruction for compressed ultrafast photography," Optica 3, 694-697 (2016) and Heist, S., Dietrich, P., Landmann, M., Kühmstedt, P. & Notni, G., "High-speed 3D shape measurement by GOBO projection of aperiodic sinusoidal fringes: a performance analysis," Proc. SPIE 10667 106670A (2018), which are hereby incorporated by reference in their entireties.

TABLE 1

| Regularization parameter | Initial solution | Regularizer | Maximum number of iterations |
| --- | --- | --- | --- |
| $10^{-4}$ | Pseudo-inverse | Total variation (TV) in (x, y, t) space | 200 |

G. Calculation of Polarization State of Light

In certain aspects, an SP-CUP method includes calculating the polarization state of light. Some examples of SP-CUP systems with different polarizer configurations are described in Table 2. Other polarization configurations are within the contemplation of this disclosure.

For any linearly polarized light, its electric field, E, can be written as $$E = |\sqrt{I}| \times \begin{bmatrix} \cos\psi \\ \sin\psi \end{bmatrix}, \quad \text{(Eqn. 30)}$$

where I denotes intensity, and $\psi$ represents the polarization angle.

In certain examples of SP-CUP systems, linearly polarized light passes through two polarizers whose polarization axes are positioned at 0° and 45°, and the transmitted intensities are:

$$I_0 = I \times (\cos\psi)^2, \quad \text{(Eqn. 31)}$$

and $$I_{45} = \gamma \times (I/2) \times (\cos\psi + \sin\psi)^2. \quad \text{(Eqn. 32)}$$

Here, $\gamma$ is an experimentally measured weighting factor to balance the transmission difference between two stereoscopic views. Therefore, the angle of linear polarization is calculated by:

$$\psi = \tan^{-1}\left(\pm\sqrt{\frac{2 \times I_{45}}{\gamma \times I_0} - 1}\right). \quad \text{(Eqn. 33)}$$

Here, the negative sign is used when both $I_0$ and $I_{45}$ are smaller than a threshold, otherwise, the positive sign is used. The threshold is defined as half of the maximum imaged intensity in the time-unsheared view. Additionally, the first parameter in the Stokes vector—the light intensity from the object—is calculated by:

$$S_0 = I = \frac{I_0}{(\cos\psi)^2} = \frac{2 \times I_{45}}{\gamma \times (\cos\psi + \sin\psi)^2}. \quad \text{(Eqn. 34)}$$

An example of this relationship may be found in Gruev, V., Van der Spiegel, J. & Engheta, N., "Dual-tier thin film polymer polarization imaging sensor," Opt. Express 18, 19292-19303 (2010), which is hereby incorporated by reference in its entirety.

In one aspect, Eqns. 33 and 34 may be used to calculate $\psi$ and $S_0$ in both plano-polarimetric imaging and stereo-polarimetric imaging. In one example, Eqns. 33 and 34 was used to calculate $\psi$ and $S_0$ in: (i) plano-polarimetric imaging of a laser pulse sweeping across five letters and (ii) stereo-polarimetric imaging of a laser pulse sweeping across three shapes. In this example of imaging pulse propagation in a 3D scattering medium, a degree of linear polarization (DoLP) can be calculated. Linearly polarized light is sent into the scattering medium and a linear polarizer with its transmission angle aligned with the incident light was applied in one of the stereoscopic views. In this example, it was assumed that light scattered into the SP-CUP system is a mixture of both randomly polarized light and linearly polarized light with polarization in the direction aligned with that of the incident pulse. Therefore, DoLP was calculated by the intensity ratio between the view with a linear polarizer $I_0$ and the view with no polarizer $I_{NoP}$:

$$DoLP = \gamma \times \frac{2 \times \Sigma_x \Sigma_y I_0}{\eta \times \Sigma_x \Sigma_y I_{NoP}} - 1. \quad \text{(Eqn. 35)}$$

Here, $\eta$ is the measured transmission efficiency of the linear polarizer.

In an example of plano-polarimetric imaging of laser-induced plasma, the plasma emission is assumed to consist of both randomly polarized light and linearly polarized light of unknown angle of polarization ($\psi$). Utilizing the configuration in Table 2, the emitted photons can be characterized in all three parameters: $S_0$, $\psi$, and DoLP:

$$S_0 = I_{NoP} \quad \text{(Eqn. 35)}$$

$$\psi = \frac{1}{2}\tan^{-1}\left(\frac{S_2}{S_1}\right), \text{ and} \quad \text{(Eqn. 36)}$$

$$DoLP = \frac{\sqrt{S_1^2 + S_2^2}}{I_{NoP}}, \quad \text{(Eqn. 37)}$$

where $S_1 = 2\gamma_0 \eta I_0 - I_{NoP}$ and $S_2 = 2\gamma_{45} \eta I_{45} - I_{NoP}$. Here, $\gamma_0$ is measured weighting factor that balances the transmission difference between the 0°-filtered view and the unfiltered view. $\gamma_{45}$ is another one that balances the 45°-filtered view and the unfiltered view.

Although the above equations are discussed with reference to an example of an SP-CUP system with a polarization configuration having two polarizers whose polarization axes are positioned at 0° in Views 1, 3, and 4, and 45° in Views 2, 5, and 6, these equations can be extended to other examples of SP-CUP systems having different polarization configurations.

IV. Examples

The non-limiting examples provided in Section IV are provided to further illustrate certain implementations of SP-CUP systems and/or methods. It would be appreciated that certain techniques implemented in these examples represent approaches for SP-CUP systems and methods that have been found to function well, and thus can be considered to constitute examples of modes for their practice. However, those of skill in the art should, in light of the present disclosure, appreciate that many changes can be made in the specific examples that are disclosed and still obtain a like or similar result without departing from the spirit and scope of the present disclosure.

A. Plano-Polarimetric (x, y, t, $\psi$) Imaging

In certain implementations, an SP-CUP system is configured or configurable to detect four photon tags (i.e., x, y, t, $\psi$) for plano-polarimetric imaging of a dynamic scene that is the subject being imaged during operation. In these examples, one or more polarizers are inserted into at least one view of the SP-CUP system. For example, three polarizers (e.g., linear polarizers) of a first polarization state may be inserted in Views 1, 3 and 4, and three polarizers (e.g., linear polarizers) of a second polarization state may be inserted in Views 2, 5 and 6. The results from implementing an example of an SP-CUP system with one or more polarizers are inserted into at least one view of the SP-CUP system is provided below.

To detect four photon tags (i.e., x, y, t, $\psi$), an example of an SP-CUP system (e.g., an SP-CUP system similar to the SP-CUP system 200 shown in FIG. 2A) was used to image a dynamic scene including: five linear polarizers with different transmission angles cut into the shapes of printed letters—"L", "S", "T", "U", and "W"—and overlaid on top of the corresponding prints. A 7-ps, 532-nm laser pulse was used to illuminate the letters obliquely. The laser pulse was depolarized by a diffuser. Three 0° polarizers were inserted in Views 1, 3 and 4, and three 45° polarizers were inserted in Views 2, 5 and 6 of the SP-CUP system. Combining Views 3 and 4 with View 1, two projection angles were used to sense the transient scene filtered by the 0° polarizers. Similarly, the combination of Views 5 and 6 with View 2 allowed for reconstructing the same dynamics through the 45° polarizers. If light from a subject is linearly polarized, the angle of polarization (AOP) or $\psi$, can be derived based on the intensity ratio between the recovered as discussed in Tyo, J. S., "Hybrid division of aperture/division of a focal-plane polarimeter for real-time polarization imagery without an instantaneous field-of-view error," *Opt. Lett.* 31, 2984-2986 (2006), which is hereby incorporated by reference in its entirety and for all purposes. Meanwhile, the first parameter in the Stokes vector ($S_0$), which represents the light intensity reflected by the object, can be readily obtained. Section III(G) provides details regarding the calculation of the Stokes vector. An example of obtaining a Stokes vector may be found in Gruev, V., Van der Spiegel, J. & Engheta, N., "Dual-tier thin film polymer polarization imaging sensor," *Opt. Express* 18, 19292-19303 (2010), which is hereby incorporated by reference in its entirety.

Figures 12A, 12B, 12C:
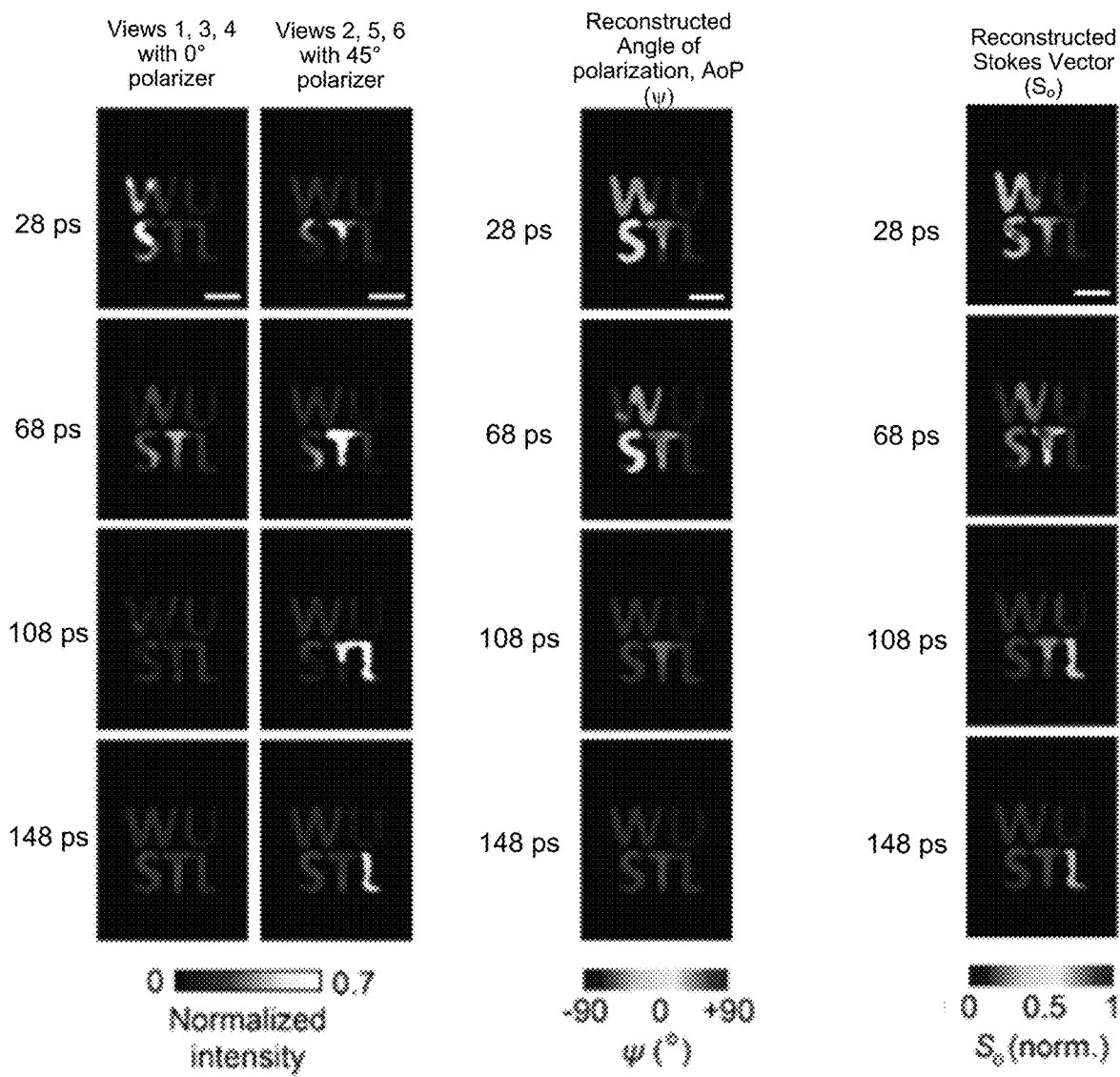
FIG. 12A depicts image frames of the reconstructed ultrafast dynamics of a SP-CUP system, according to an implementation.
FIG. 12B depicts representative frames of the reconstructed angle of polarization ($\psi$), according to an implementation.
FIG. 12C depicts representative frames of the reconstructed first parameter in the Stokes vector ($S_0$), according to an implementation.
Figure 13:
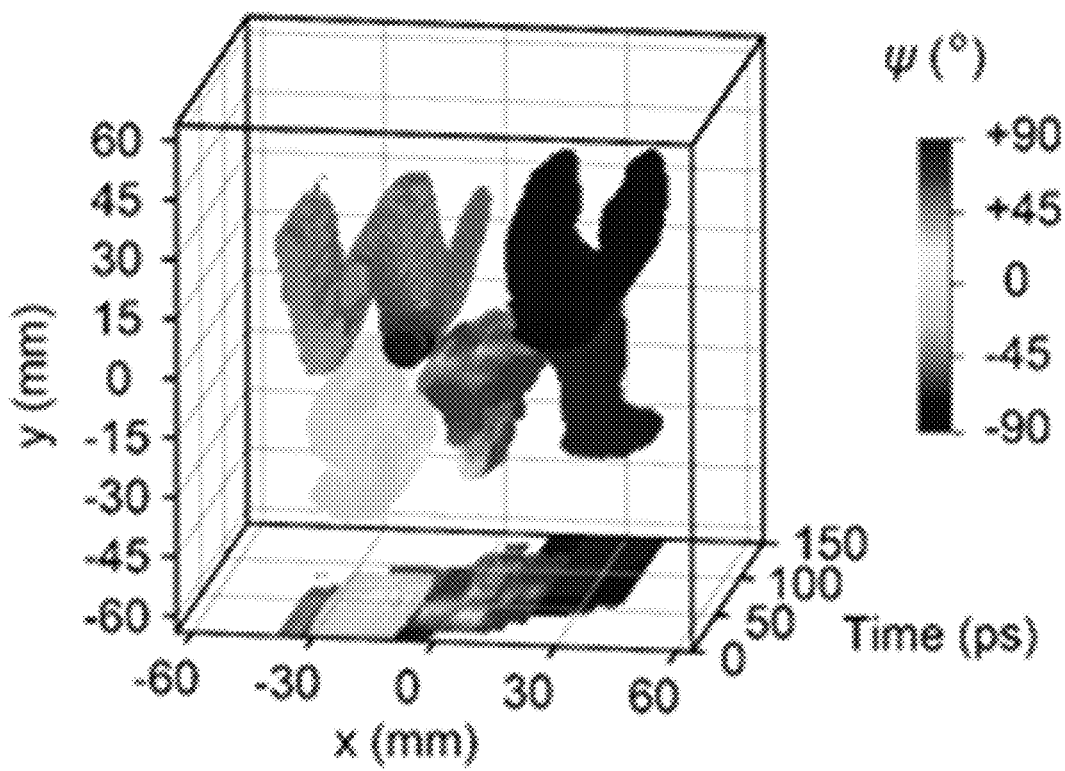
FIG. 13 depicts a three-dimensional graph of the evolutions of the angle of polarization ($\psi$) in the x-y plane, according to an implementation.
Figure 14:
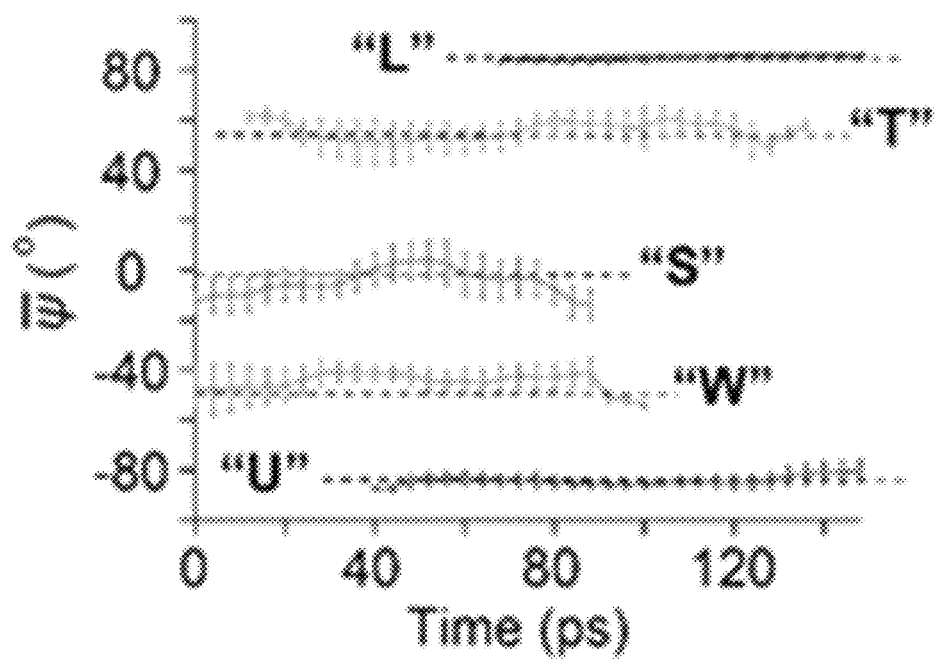
FIG. 14 depicts a plot of the averaged values of the reconstructed angle of polarization ($\psi$) for the five letters over time, according to an implementation.

FIG. 12A depicts image frames of the reconstructed ultrafast dynamics of the SP-CUP system taken at 250 Gfps from Views 1, 3, and 4 with the 0° polarizers (left column) and Views 2, 5, and 6 with the 45° polarizers (right column). The frames are overlaid on top of the time-unsheared image (grayscale) captured by the external CCD camera (Views 1 and 2). FIG. 12B depicts representative frames of the reconstructed angle of polarization ($\psi$). FIG. 12C depicts representative frames of the reconstructed first parameter in the Stokes vector ($S_0$). The projection on the x-t plane is plotted at the bottom. The illustrated scale bars in FIGS. 12A-12C are 30 mm. FIG. 13 depicts a three-dimensional graph of the evolutions of the angle of polarization ($\psi$) in the x-y plane. The projection on the x-t plane is plotted at the bottom. FIG. 14 depicts a plot of the averaged values of the reconstructed angle of polarization ($\psi$) for the five letters over time. The black dashed lines are the ground truths measured using the time-unsheared images (Views 1 and 2). The finite lengths of these dashed lines are for illustration purposes only and do not indicate durations of events. Error bars in FIG. 14 are standard deviations.

FIG. 12A illustrates the reconstructed ultrafast left-to-right sweeping dynamics at an imaging speed of 250 Gfps. Four frames of the of the reconstructed $\psi$ and $S_0$ are plotted in FIGS. 12A and 12B. The laser pulse swept through the sample at a measured apparent speed of $7\times10^8$ m/s as determined by the SP-CUP system, closely matching the theoretically expected value calculated based on the pre-set experimental condition. The complete reconstructed data [i.e., (x, y, t, $\psi$) information] is also visualized using the point cloud in FIG. 13, showing that the five letters have distinct angles of polarization, AoPs, ranging across the $\pi$ angular space. FIG. 14 plots mean AoPs ($\overline{\psi}$) over each letter versus time. The values of $\overline{\psi}$, averaged over time, for "L", "S", "T", "U", and "W" are 86.9°, −4.6°, 55.7°, −84.2°, and −44.9°, respectively. These values are close to the measured ground truths: 84.8°, −1.8°, 53.9°, −83.7°, and −49.5° shown as horizontal dashed lines in FIG. 14. The standard deviation, averaged over time, ranges between 1.0° ("L") and 7.3° ("S"). Additional data is discussed in Section III(G).

Figure 56:
FIG. 56 is a reconstructed frame of the "L", "S", "T", "U", and "W" reconstructed by the SP-SUP system, according to an implementation.
Figure 57:
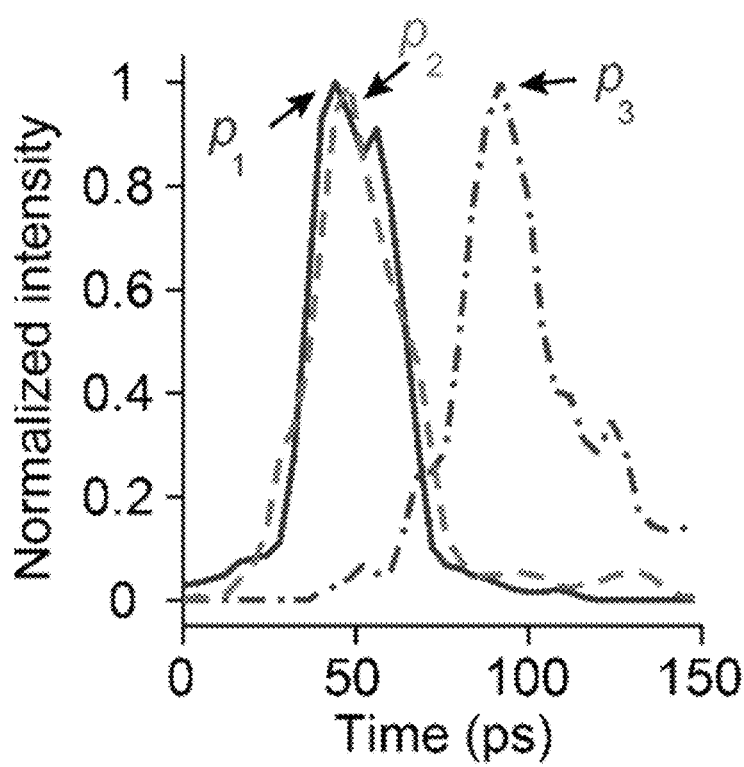
FIG. 57 is a plot of the reconstructed intensity evolutions at three selected pixels $p_1$, $p_2$, and $p_3$ in FIG. 56, according to an implementation.
Figure 58:
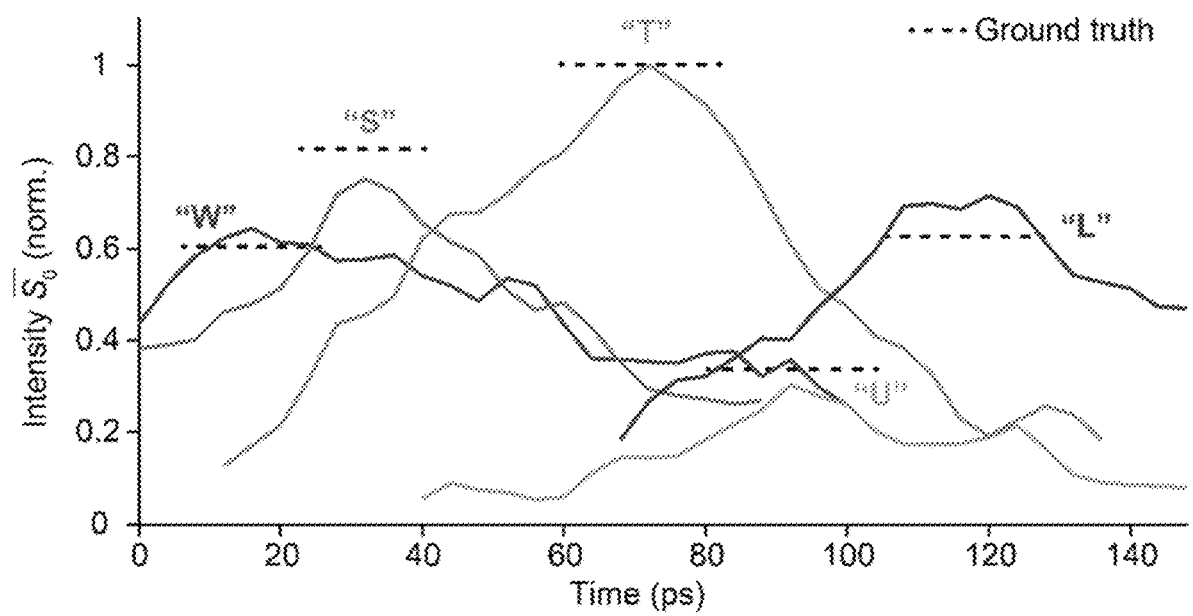
FIG. 58 is a graph of the plotted average $S_0$ in the five letters 'L', 'S', 'T', 'U', and 'W' versus time, according to an implementation.

FIG. 56 is a reconstructed frame of the "L", "S", "T", "U", and "W" reconstructed by the SP-SUP system, according to an implementation. FIG. 57 is a plot of the reconstructed intensity evolutions at three selected pixels $p_1$, $p_2$, and $p_3$ in FIG. 56, according to an implementation. FIG. 58 is a graph of the plotted average $S_0$ in the five letters 'L', 'S', 'T', 'U', and 'W' versus time, according to an implementation. The black dashed lines are the ground truths measured using the static time-unsheared images. The finite lengths of these dashed lines are for illustration only and do not indicate durations of events.

1. Spatiotemporally Resolved Polarization Imaging of Plasma Emission in Laser-Induced Breakdown on a Silicon Wafer.

Figure 15:
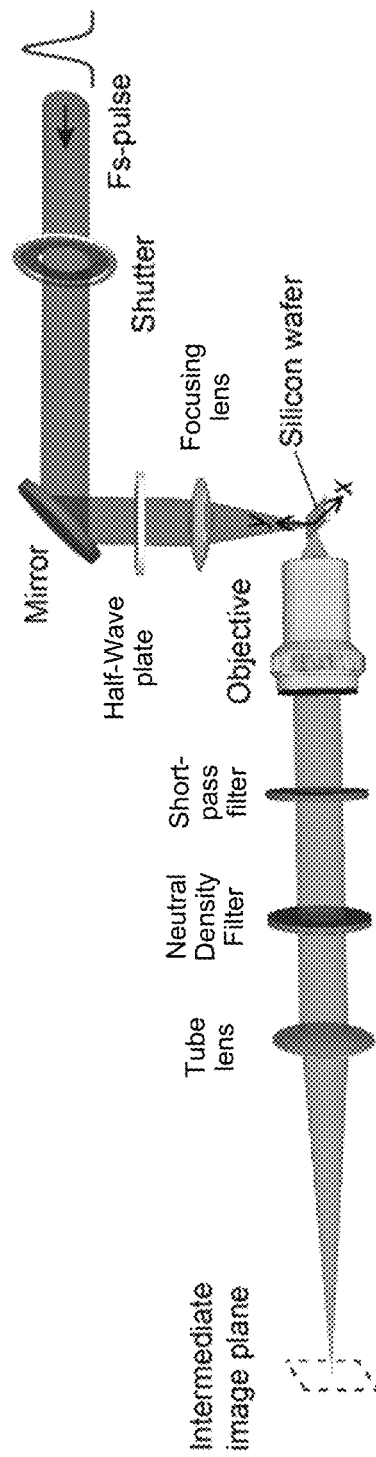
FIG. 15 is a schematic diagram of the setup used to generate plasma on the silicon wafer, according to an implementation.

To demonstrate application of SP-CUP systems in ultrafast physics, an example of an SP-CUP system (e.g., an SP-CUP system similar to the SP-CUP system 200 shown in FIG. 2A) was used to monitor the early-stage polarization dynamics of plasma in laser-induced breakdown (LIB). The SP-CUP system included front optics with a 10× objective lens. 0° polarizers were used for Views 1 and 3, and 45° polarizers were used for Views 2 and 5. FIG. 15 is a schematic diagram of the setup used to generate plasma on the silicon wafer, according to an implementation. The setup includes a mechanical shutter (e.g., Uniblitz LS3Z2 made by Vincent Associate), a half-wave-plate (e.g., the WPH05M-780 lens made by Thorlabs), a focusing lens (e.g., LA1074 lens made by Thorlabs), an objective (e.g., RMS10X objective made by Thorlabs), a tube lens (e.g., the LBF254-200 tube lens made by Thorlabs), a short-pass-filter (e.g., the FGB37M short-pass-filter made by Thorlabs), and a neutral density filter (e.g., the NE20A neutral density filter made by Thorlabs). In the setup, a single 800-nm femtosecond pulse (60-µJ pulse energy, 80-fs pulse width, 0° AoP) was focused by a 20-mm-focal-length lens onto a silicon wafer [p-type (111)] in normal incidence. The silicon wafer was placed slightly before the lens focus to avoid generation of plasma in air. The beam spot had a diameter of 20 µm at the surface of the silicon wafer, corresponding to a peak power density of 239 TW/cm$^2$.

The plasma emission was collected by the 10× objective lens of the front optics, and the magnified image was formed on the intermediate image plane. 0° polarizers were used for Views 1 and 3, and 45° polarizers were used for Views 2 and 5. Two-view reconstructions were carried out to recover the transient scene that is unfiltered, filtered by the 0° polarizers, and filtered by the 45° polarizers. Then, both the angle of polarization AoP ($\psi$) and the degree of linear polarization (DoLP) can be derived from the recovered datacubes. Examples of determining degree of linear polarization can be found in Tyo, J. S., "Hybrid division of aperture/division of a focal-plane polarimeter for real-time polarization imagery without an instantaneous field-of-view error," Opt. Lett. 31, 2984-2986 (2006) and Gruev, V., Van der Spiegel, J. & Engheta, N., "Dual-tier thin film polymer polarization imaging sensor," Opt. Express 18, 19292-19303 (2010), which are hereby incorporated by reference in their entireties.

Figure 16:
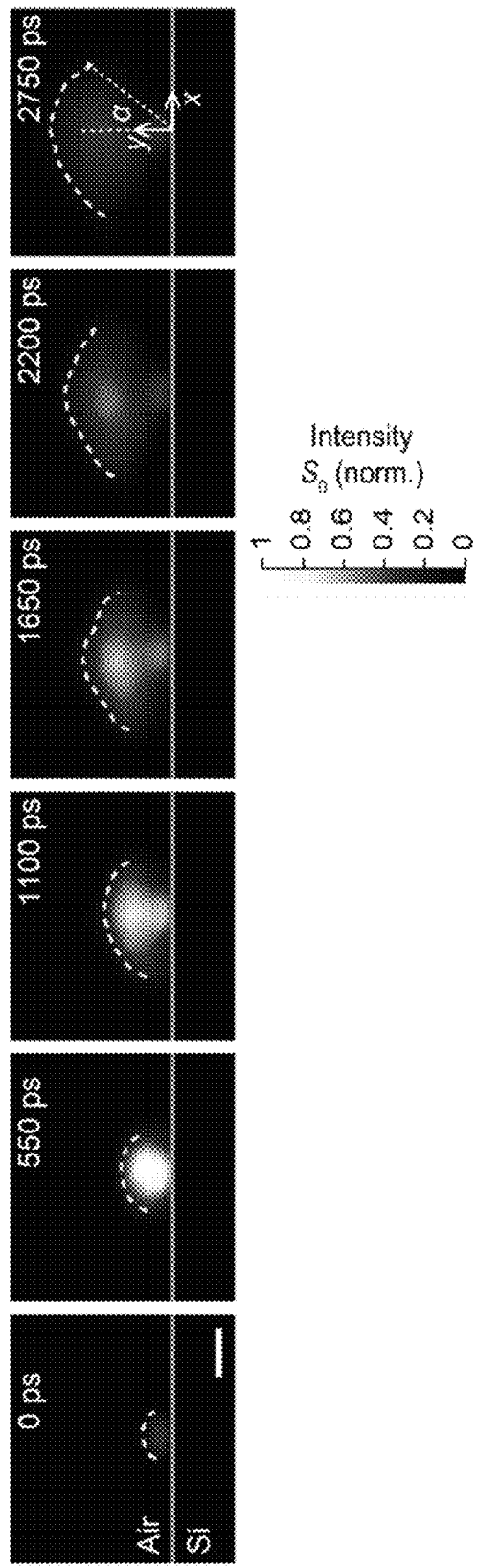
FIG. 16 depicts illustrations of the normalized intensity ($S_0$) dynamics of the plasma plume at 0 ps, 550 ps, 1100 ps, 1650 ps, 2200 ps, and 2750 ps as determined by the SP-CUP system, according to an implementation.
Figure 17:
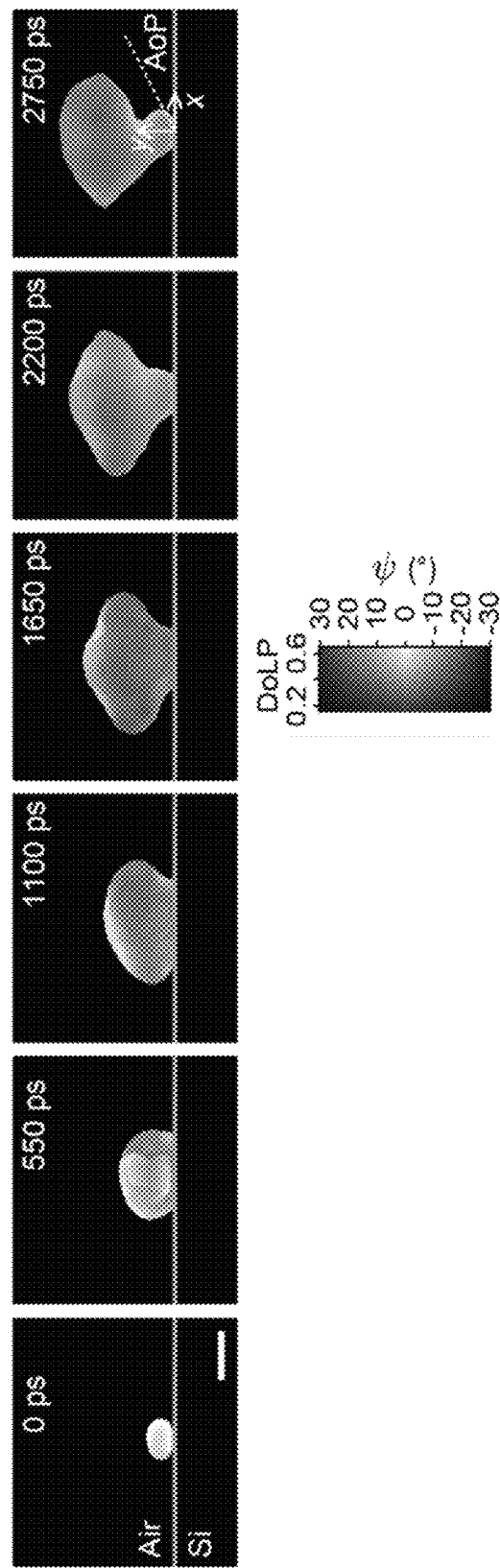
FIG. 17 depicts illustrations of the spatiotemporally resolved degree of linear polarization (DoLP) and angle of polarization (ψ) at 0 ps, 550 ps, 1100 ps, 1650 ps, 2200 ps, and 2750 ps as determined by a SP-CUP system, according to an implementation.
Figure 18:
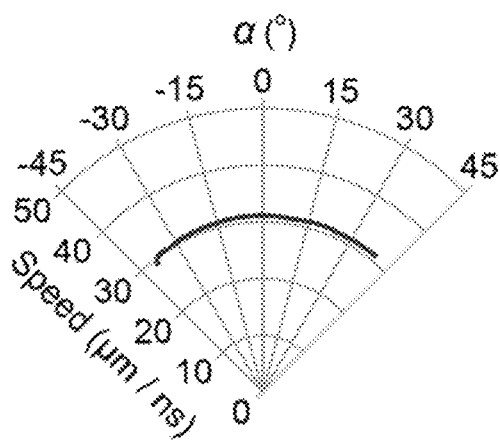
FIG. 18 a plot of the plasma plume expansion speed over angle α, which is defined in FIG. 16, according to an implementation.
Figure 19:
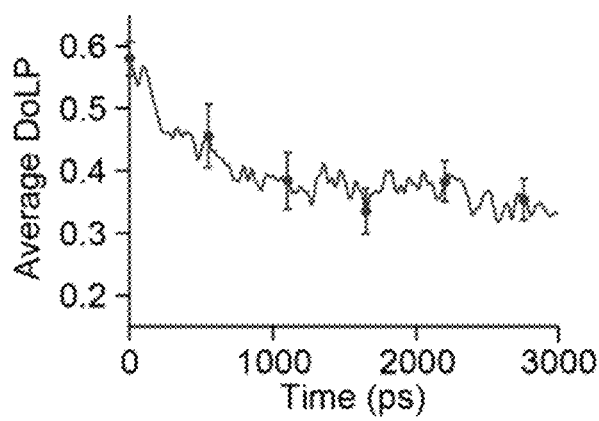
FIG. 19 a plot of the spatially averaged calculated DoLP over time, according to an implementation.
Figure 20:
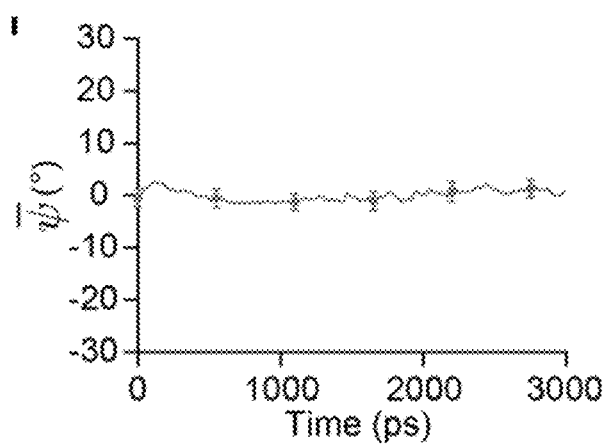
FIG. 20 is a plot of the spatially averaged calculated ψ over time, according to an implementation.

FIG. 16 depicts illustrations of the normalized intensity ($S_0$) dynamics of the plasma plume at 0 ps, 550 ps, 1100 ps, 1650 ps, 2200 ps, and 2750 ps as determined by the SP-CUP system, according to an implementation. The solid line at the bottom of each panel represents the air-silicon interface. The dashed line represents the plasma plume front. FIG. 17 depicts illustrations of the spatiotemporally resolved DoLP and AoP ($\psi$) at 0 ps, 550 ps, 1100 ps, 1650 ps, 2200 ps, and 2750 ps as determined by a SP-CUP system, according to an implementation. Scale bars in FIG. 16 and FIG. 17 are 50 µm. FIG. 18 a plot of the plasma plume expansion speed over angle α, which is defined in FIG. 16. FIG. 19 a plot of the spatially averaged calculated DoLP over time, according to an implementation. FIG. 20 is a plot of the spatially averaged calculated $\psi$ over time, according to an implementation. Error bars in FIGS. 19 and 20 represent standard deviations of DoLP and $\psi$ in the spatial domain at the six snapshots shown in FIG. 17.

Shown in FIGS. 16 and 17 is the plasma's polarization dynamics captured by SP-CUP system in a single acquisition at an imaging speed of 100 Gfps and a sequence depth of 300 frames. The 4D imaging capability allowed for analysis of the angle-dependent expansion speed of the plume and the evolution of the polarization states of the plasma emission. The SP-CUP system captured the outward propagation of the plume front (dashed lines) over time. The plume's expansion speed is nearly isotropic and the measured angle-averaged speed is 30 µm/ns as shown in FIG. 18. Spatial evolutions of both $\psi$ and DoLP over six time frames are also summarized in FIG. 17. The spatially averaged DoLP is plotted in FIG. 19. Both FIGS. 16 and 17 suggest that DoLP of the plasma emission decreased from 0.58 at time zero to about 0.33 at 3 ns. In addition, $\psi$ remains constant in both spatial and temporal domains and is in accord with the AoP of incident laser beam, as shown in FIGS. 17 and 20.

Figure 21:
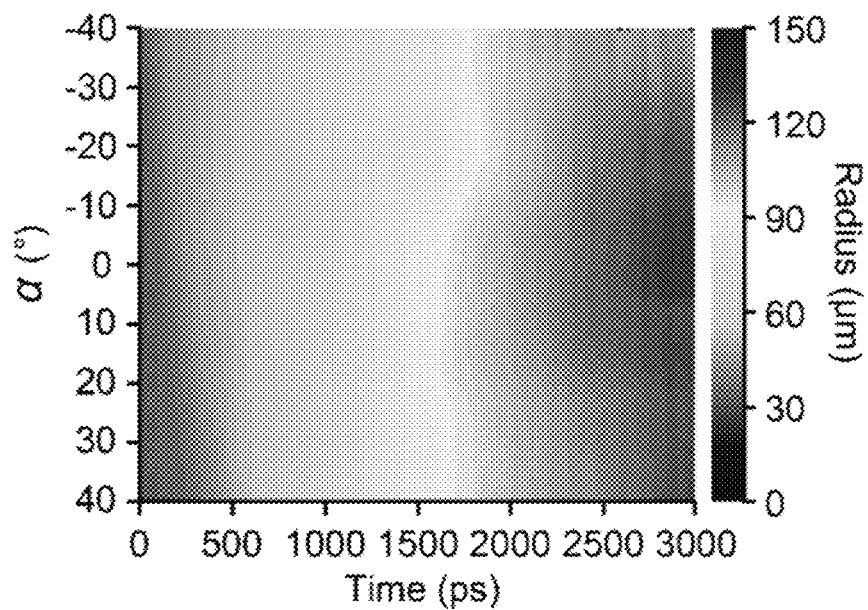
FIG. 21 is an illustration of the evolution of radii of a plasma plume front at different angles, according to an implementation.
Figure 22:
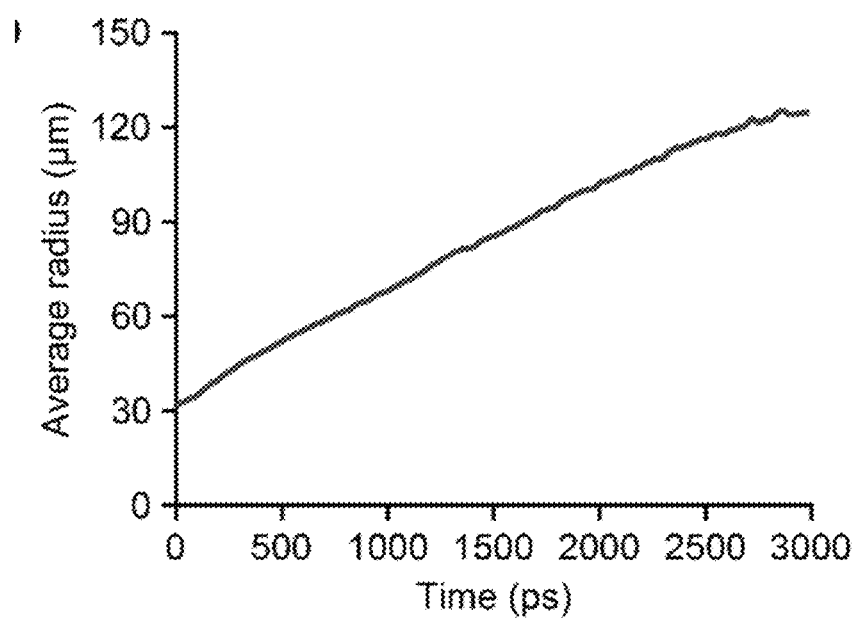
FIG. 22 is a graph of the evolution of the angularly averaged radius of the plasma plume, according to an implementation.
Figure 23:
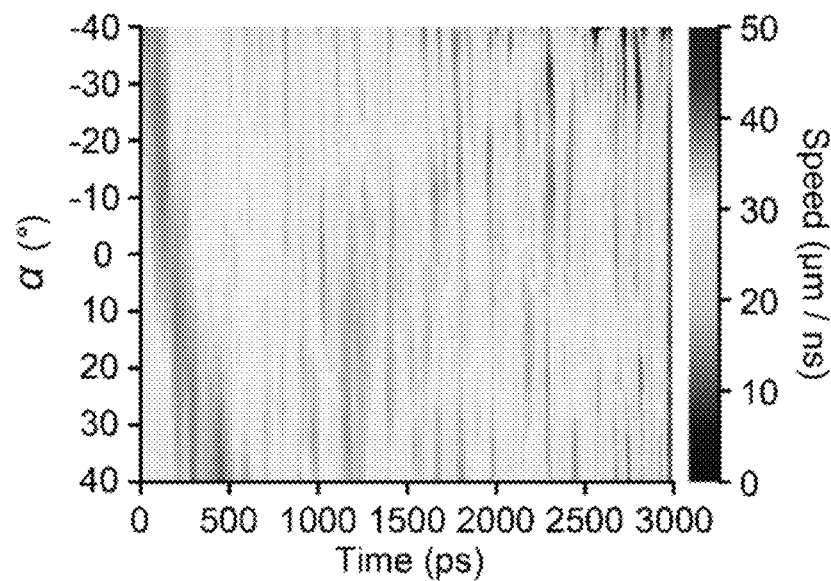
FIG. 23 is an illustration of the instantaneous speed versus expansion angle and time of the plasma plume, according to an implementation.
Figure 24:
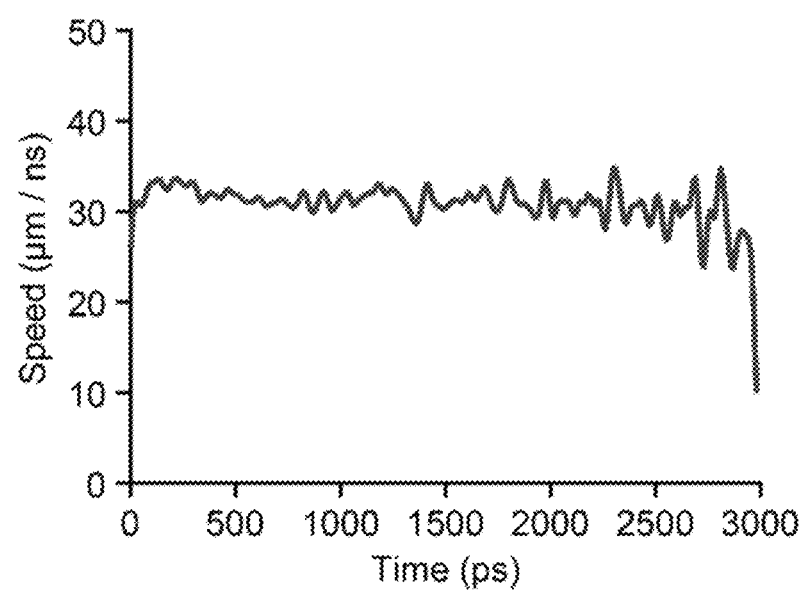
FIG. 24 is a graph of the angularly averaged speed versus time, according to an implementation.

FIG. 21 is an illustration of the evolution of radii of a plasma plume front at different angles, according to an implementation. FIG. 22 is a graph of the evolution of the angularly averaged radius of the plasma plume, according to an implementation. FIGS. 21 and 22 illustrate the expansion of the plasma plume. FIG. 23 is an illustration of the instantaneous speed versus expansion angle and time of the plasma plume, according to an implementation. FIG. 24 is a graph of the angularly averaged speed versus time, according to an implementation. FIGS. 23 and 24 illustrate the expansion speed of the plasma plume.

Comparison of Results of Synthesized Pump-Probe and SP-CUP

The plasma emission from LIB can be difficult to reproduce quantitatively because the nonlinear phenomenon is highly sensitive to the initial conditions such as the laser beam parameters and the wafer homogeneity as discussed in Yeola, S., Kuk, D. & Kim, K.-Y., "Single-shot ultrafast imaging via spatiotemporal division of femtosecond laser pulses," J. Opt. Soc. Am. B 35, 2822-2827 (2018), which is hereby incorporated by reference in its entirety. This difficult-to-reproduce nature of LIB prevents the pump-probe method from accurately quantifying the critical parameters of interest in this process. To illustrate this point, a 10-frame pump-probe measurement of plasma emission was synthesized. The measurement was repeated 10 times using the same setup.

Figure 25:
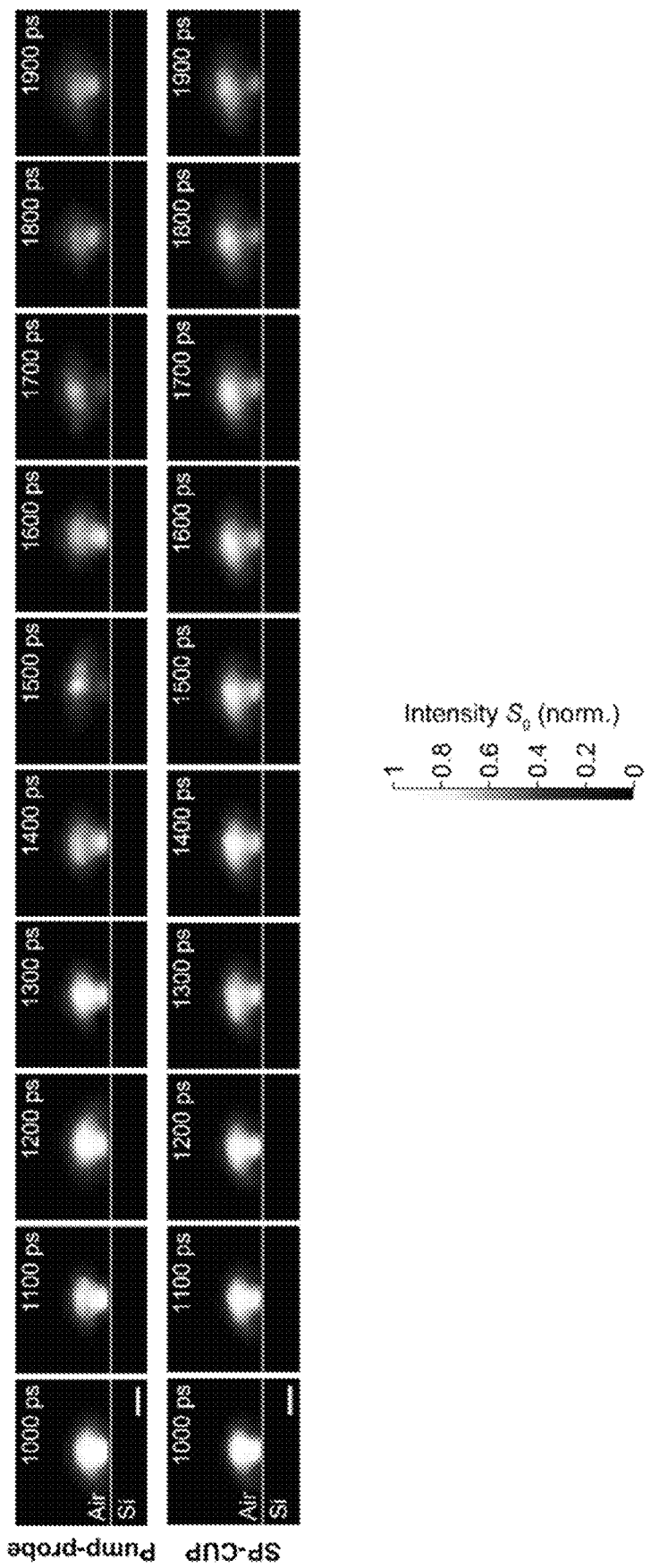
FIG. 25 depicts snapshots of the normalized intensity dynamics of plasma emission, according to an implementation.

FIGS. 25-28 illustrate comparisons between the 10-frame pump-probe method and SP-CUP method in observing the plasma emission from LIB. FIG. 25 depicts snapshots of the normalized intensity dynamics of plasma emission, according to an aspect. The top row includes pump-probe sequence synthesized by selecting frames from ten independent SP-CUP acquisitions. The bottom row includes SP-CUP reconstruction from one single acquisition. Shown in the top row of FIG. 25, a pump-probe sequence was stitched by selecting one snapshot at a different time from each reconstruction (e.g., the snapshot at 1000 ps from the first reconstructed movie, the snapshot at 1100 ps from the second reconstructed movie, and so on). As a comparison, the result of SP-CUP is shown from a single acquisition in the bottom row of FIG. 25. In stark contrast with the single-shot SP-CUP reconstruction, the pump-probe sequence displays severe random variations in the spatial profile of plasma emission.

Figure 26:
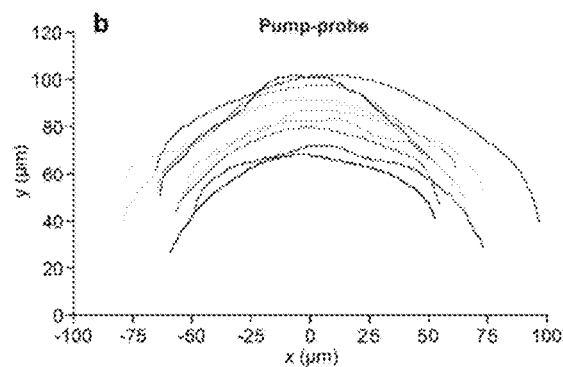
FIG. 26 depicts a graph of positions of the expanding plasma plume fronts at 10 different time points from 1000 ps to 1900 ps as measured by the synthesized pump-probe, according to an implementation.
Figure 27:
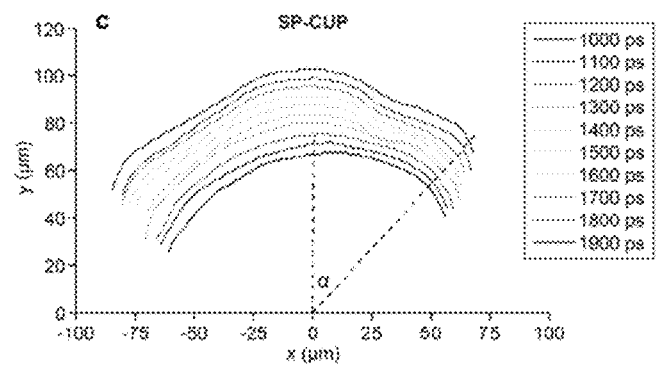
FIG. 27 depicts a graph of positions of the expanding plasma plume fronts at 10 different time points from 1000 ps to 1900 ps as determined by the SP-CUP system, according to an implementation.
Figure 28:
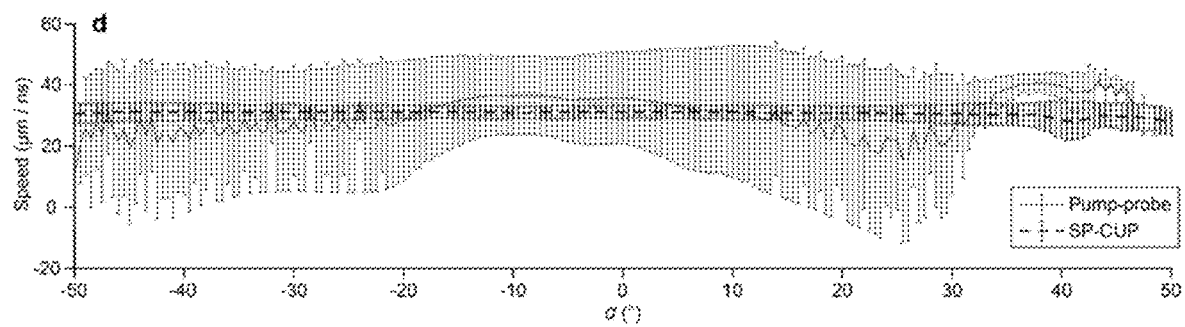
FIG. 28 depicts a graph of the average expansion speeds of the plume's front at different angles quantified using the synthesized pump-probe and the SP-CUP system, according to an implementation.

FIG. 26 depicts a graph of positions of the expanding plasma plume fronts at 10 different time points from 1000 ps to 1900 ps as measured by the synthesized pump-probe, according to an implementation. FIG. 27 depicts a graph of positions of the expanding plasma plume fronts at 10 different time points from 1000 ps to 1900 ps as determined by the SP-CUP system, according to an implementation. FIG. 28 depicts a graph of the average expansion speeds of the plume's front at different angles quantified using the synthesized pump-probe (solid line) and the SP-CUP system (dashed line), according to an implementation. The error bars are standard deviations.

The plume fronts calculated based on the synthesized pump-probe and SP-CUP results are plotted in FIGS. 26-27, respectively. The SP-CUP's plots show uniform outward expansions, while those of the synthesized pump-probe method exhibit obvious irregularities. In linear regression of the plume front positions versus time, the SP-CUP system/ method offers a goodness of fit, defined as the sum of the squared errors, as small as 6.7 µm$^2$, at all angles α, while the synthesized pump-probe method yields one greater than 100 µm², about 15× worse. Finally, the plume's instantaneous expansion speeds were computed at different angles α between −50° and 50° with a step of 0.5°. The time-averaged speeds and their standard deviations (SDs) are plotted in Supplementary FIG. 28. The synthesized pump-probe method and the SP-CUP system/method give SDs of 18 µm/ns and 2.2 µm/ns, respectively. This 8.2× degradation in SD suggests that averaging about 67 images at each time delay may be needed for a pump-probe method to attain the same quantitative accuracy as SP-CUP in a single shot.

As mentioned above, the plasma emission from LIB can be difficult to reproduce quantitatively. As the event is non-repeatable, single-shot SP-CUP becomes especially advantageous in comparison to multi-shot pump-probe imaging methods. To illustrate this point, the results of using these two approaches was compared (See, e.g., FIGS. 25-28). In linearly fitting the plume's front position versus time, the pump-probe method shows a ~15× worse goodness of fit than SP-CUP. The substantial shot-to-shot variations of the plasma plume profile degrade the accuracy in plume's expansion speed calculation by about 8.2×.

B. Stereo-Polarimetric Ultrafast (x, y, z, t, ψ) Imaging

In certain implementations, an SP-CUP system is configured or configurable to detect five photon tags (i.e., x, y, z, t, ψ) for stereo-polarimetric imaging of a dynamic scene that is the subject being imaged during operation. In these examples, one or more polarizers are inserted into at least one view of the SP-CUP system. For example, three polarizers (e.g., linear polarizers) of a first polarization state may be inserted in Views 1, 3 and 4, and three polarizers (e.g., linear polarizers) of a second polarization state may be inserted in Views 2, 5 and 6 in one implementation. The results from employing the SP-CUP system of this implementation are provided below.

To detect five photon tags (i.e., x, y, z, t, ψ), the SP-CUP system was used to image the following dynamic scene at 100 Gfps: Three shapes—a square, a triangle and a circle—were placed at three different depths. Similar to the plano-polarimetry ultrafast imaging example in Section IV(A), each shape was covered by a linear polarizer of a distinct transmission angle, and the same laser pulse swept across these shapes at an oblique angle. 0° polarizers were inserted in Views 1, 3 and 4 and 45° polarizers were inserted in Views 2, 5 and 6.

Figure 29:
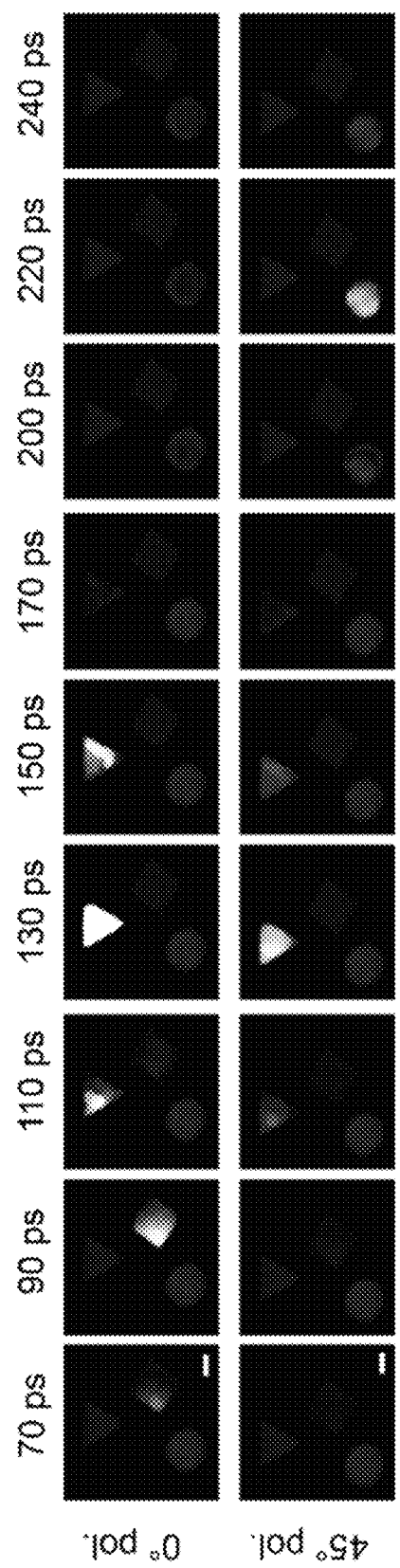
FIG. 29 depicts nine frames of the ultrafast dynamics imaged by the SP-CUP system at 100 Gfps using Views 1, 3, and 4 through the 0° polarizers and Views 2, 5, and 6 through the 45° polarizers, according to an implementation.

FIG. 29 depicts nine frames of the ultrafast dynamics imaged by the SP-CUP system at 100 Gfps using Views 1, 3, and 4 (top row) through the 0° polarizers and Views 2, 5, and 6 (bottom row) through the 45° polarizers, according to an implementation. The apparent speed of laser pulse sweeping through the circle shape is measured 6×10⁸ m/s, which is close to the prediction based on the experimental conditions. The result shows that the three shapes were irradiated by the laser pulse one after another. Note that the circle in the 0° filtered image has a low intensity because its polarization angle is nearly orthogonal to that of the 0° polarizer. The image pairs in FIG. 29 enable stereo vision to sense depth as discussed in Section III(D). The scale bar is 10 mm in FIG. 29.

Figure 30:
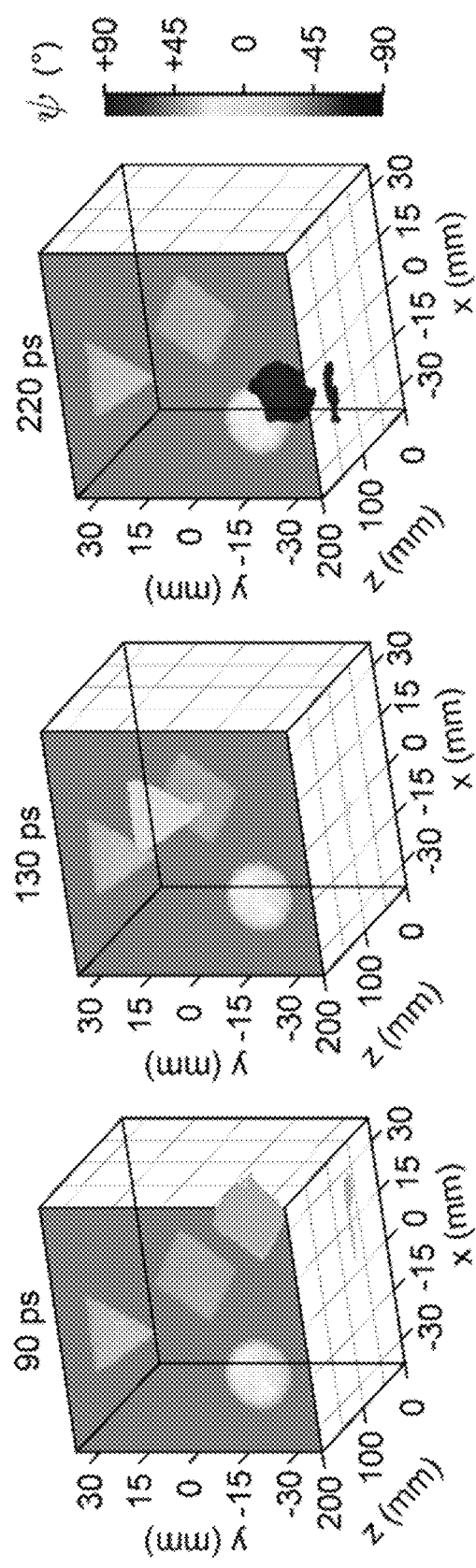
FIG. 30 is a three-dimensional plot of angle of polarization (ψ) in 3D space at three time frames: 90 ps, 130 ps, and 220 ps, according to an implementation.
Figure 31:
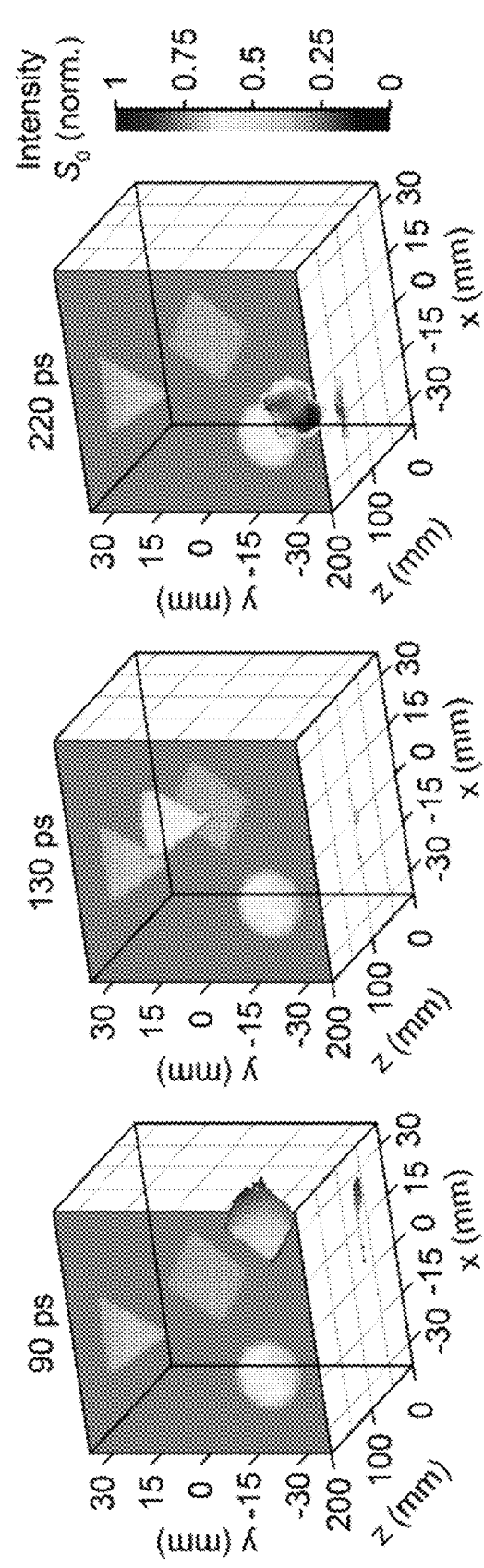
FIG. 31 is a three-dimensional plot of the first parameter in the Stokes vector ($S_0$) in 3D space at three time frames: 90 ps, 130 ps, and 220 ps, according to an implementation.
Figure 32:
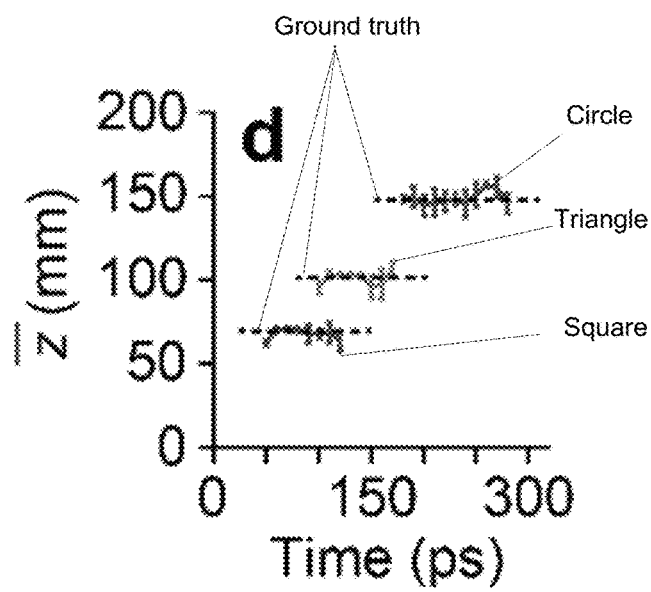
FIG. 32 is a plot of the averaged values of z of the three shapes versus time, according to an implementation.
Figure 33:
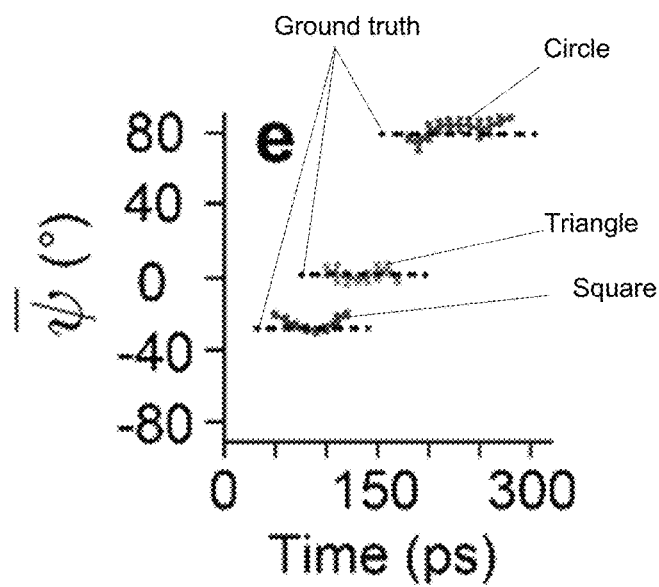
FIG. 33 is a plot of the averaged values of angle of polarization ψ of the three shapes versus time, according to an implementation.
Figure 34:
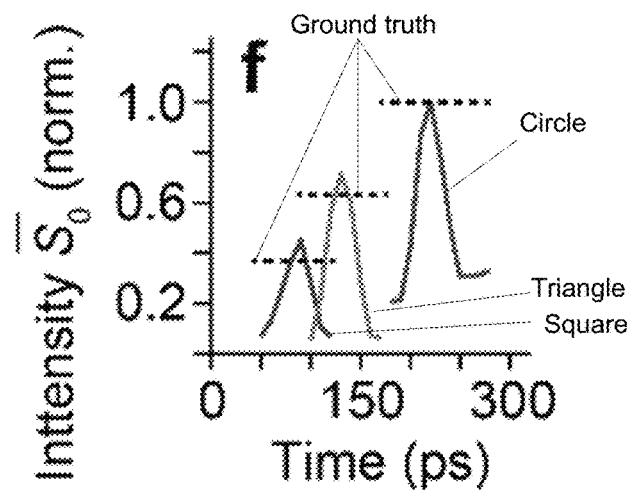
FIG. 34 is a plot of the averaged values of $S_0$ of the three shapes versus time, according to an implementation.

The reconstructed ψ and $S_0$ distributions in 3D space at three time frames (i.e., 90 ps, 130 ps, and 220 ps) are shown in FIGS. 30-31, respectively. FIG. 30 is a three-dimensional plot of AoP (ψ) in 3D space at three time frames: 90 ps, 130 ps, and 220 ps, according to an aspect. FIG. 31 is a three-dimensional plot of the first parameter in the Stokes vector ($S_0$) in 3D space at three time frames: 90 ps, 130 ps, and 220 ps, according to an aspect. A relative depth is used by setting the 600-mm depth as the origin. The back side of the plot is the time-unsheared image. The images on the x-z plane are the projections of the 3D plots along the y axis. FIG. 32 is a plot of the averaged values of z of the three shapes versus time, according to an aspect. FIG. 33 is a plot of the averaged values of ψ of the three shapes versus time, according to an aspect. FIG. 34 is a plot of the averaged values of $S_0$ of the three shapes versus time, according to an aspect. The black dashed lines in FIGS. 32-34 are the ground truths measured using the time-unsheared stereo images from the external CCD cameras (Views 1 and 2). Note that the finite lengths of these dashed lines are for illustration only and do not indicate durations of events. Error bars in FIGS. 32-33 are standard deviations.

FIGS. 32-33 provide the z and ψ values averaged over each shape. Both are nearly constant, which is consistent with the fact that these shapes were flat and covered with single polarizers. The reconstructed relative depths are 67 mm for the square at 90 ps, 103 mm for the triangle at 130 ps, and 151 mm for the circle at 220 ps. These results are close to the ground truths of 70 mm, 102 mm, and 148 mm. The standard deviation of the depth, averaged over all shapes, is less than 5.5 mm, which is equivalent to ±0.2 pixel disparity accuracy. The circle shape has a larger standard deviation since the greater difference in intensity between the image pairs compromised the accuracy in disparity calculation. Similar analysis is applied to ψ in FIG. 33. The reconstructed ψ values are −29.1° for the square at 90 ps, −0.9° for the triangle at 130 ps, and 83.0° for the circle at 220 ps. These measurements are also close to the ground truths of −27.7°, 1.9°, and 79.4°. The average standard deviation is approximately 4.5°. In FIG. 34, $\overline{S_0}$ is the $S_0$ averaged over each shape. Following the ultrafast sweeping behavior of the laser pulse, $\overline{S_0}$ firstly rose and then fell in each shape.

Figure 35A:
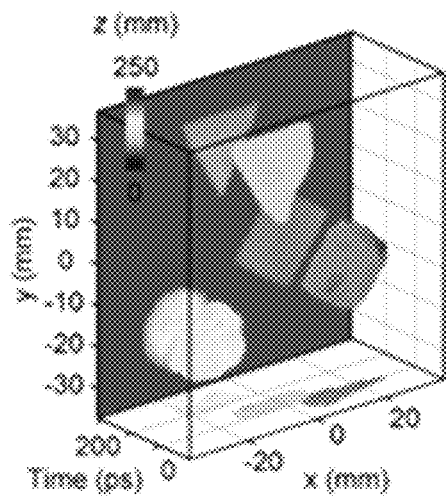
FIG. 35A is a three-dimensional plot of the subsets of the complete data, namely (x, y, z, t), according to an implementation.
Figure 35B:
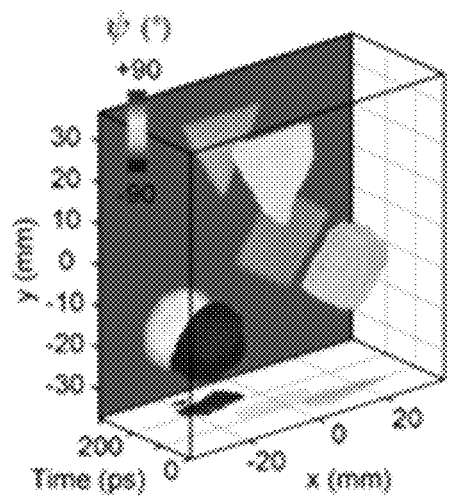
FIG. 35B is a three-dimensional plot of the subsets of the complete data, namely (x, y, z, ψ), according to an implementation.
Figure 35C:
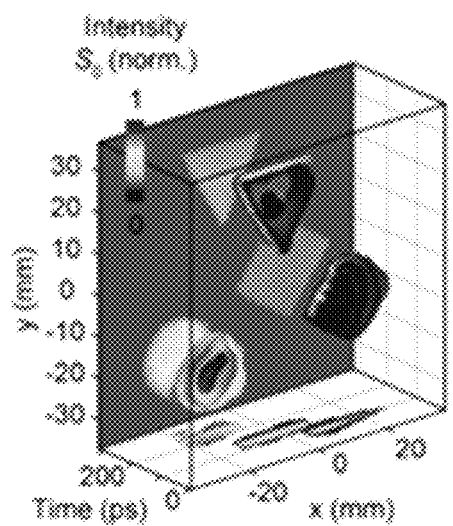
FIG. 35C is a three-dimensional plot of the subsets of the complete data, namely (x, y, t, $S_0$), according to an implementation.

Additionally, the 4D subsets of the complete data, namely (x, y, z, t), (x, y, t, ψ), and (x, y, t, $S_0$) matrices, are displayed in FIGS. 35A-35C respectively. FIG. 35A is a three-dimensional plot of the subsets of the complete data, namely (x, y, z, t), according to an aspect. FIG. 35B is a three-dimensional plot of the subsets of the complete data, namely (x, y, z, ψ), according to an aspect. FIG. 35C is a three-dimensional plot of the subsets of the complete data, namely (x, y, t, $S_0$), according to an aspect. The back side of the plots is the time-unsheared image captured by the first camera. The projections on the x-t plane are also shown.

Figure 36:
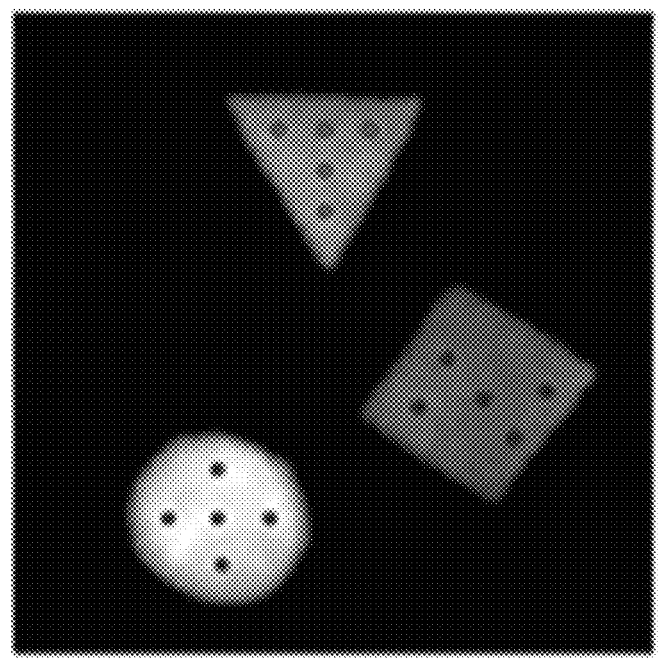
FIG. 36 is a static image of the objects using View 1, according to an aspect.
Figure 37:
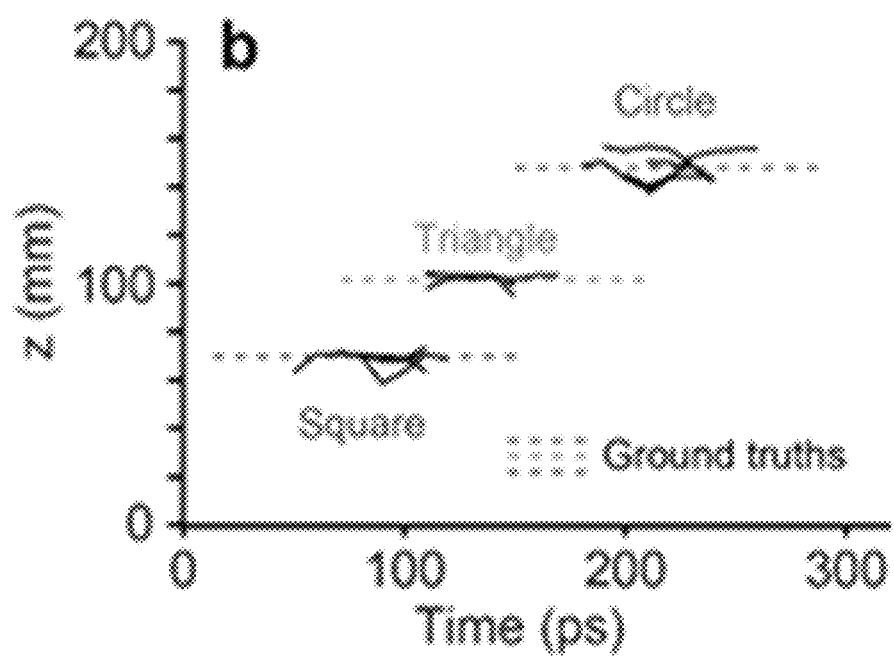
FIG. 37 is a plot of the reconstructed depth z, according to an aspect.
Figure 38:
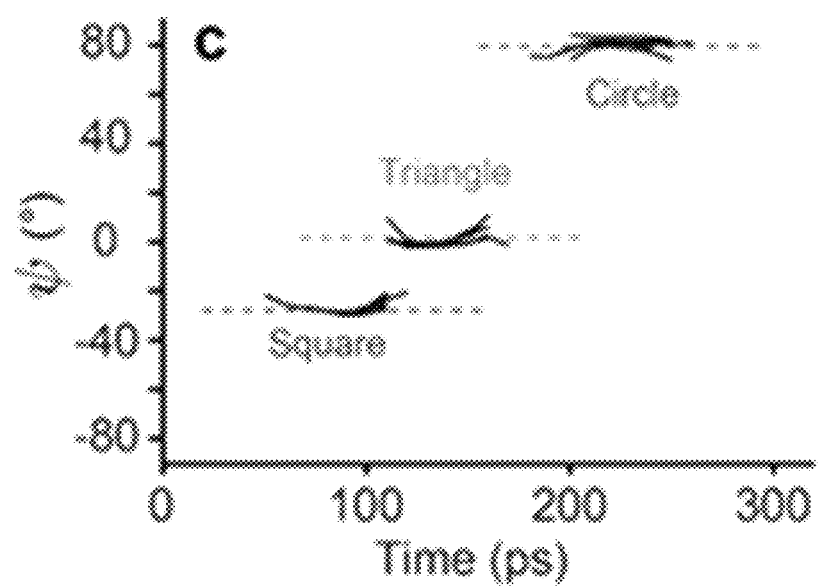
FIG. 38 is a plot of the reconstructed angle of polarization ψ, according to an aspect.
Figure 39:
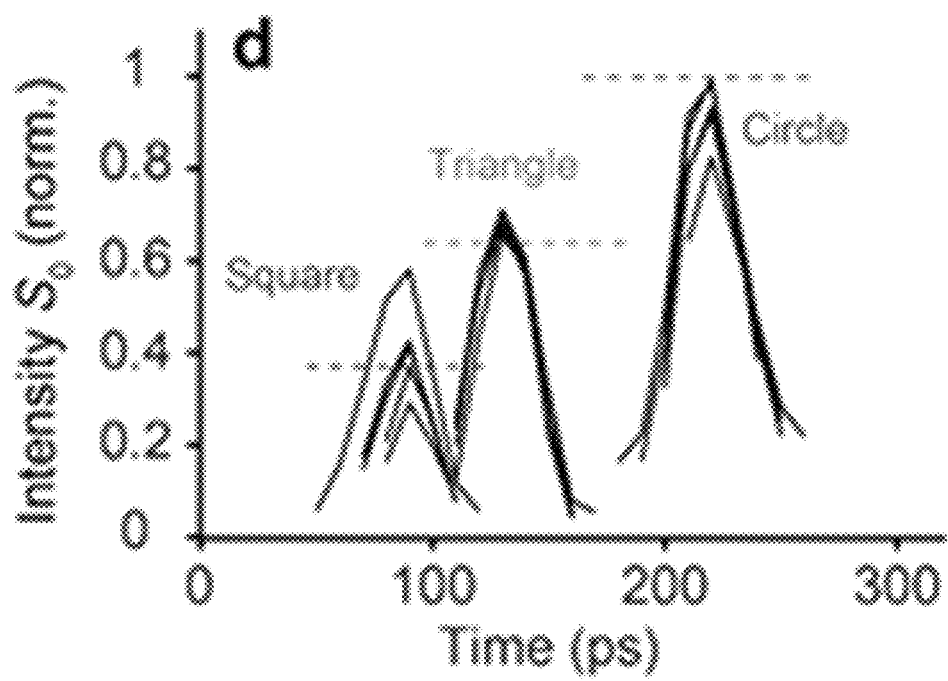
FIG. 39 is a plot of the reconstructed normalized $S_0$, according to an aspect.

FIG. 36 is a static image of the objects using View 1, according to an aspect. Five pixels in each shape are selected. FIG. 37 is a plot of the reconstructed depth z, according to an aspect. FIG. 38 is a plot of the reconstructed angle of polarization ψ, according to an aspect. FIG. 39 is a plot of the reconstructed normalized $S_0$, according to an aspect. Black solid lines are the reconstructed data, and dashed lines are the ground truths measured by the static time-unsheared images. The finite lengths of these dashed lines are for illustration only and do not indicate durations of events.

1. Real-Time 3D Characterization of Spatiotemporal Profiles and Polarization Properties of a Single Laser Pulse Propagating in a Scattering Medium To demonstrate the SP-CUP's single-shot five-dimensional imaging capability in scattering media, an SP-CUP system (e.g., an SP-CUP system similar to the SP-CUP system 200 shown in FIG. 2A) was used to image the propagation of a single ultrashort laser pulse in water vapor at 100 Gfps. The dynamic nature of this scattering medium makes the experiment quantitatively non-repeatable. In this experiment, a light pulse of 400-nm wavelength and 55-fs width was guided into scattering water vapor. The incident beam was linearly polarized. Two metallic planar mirrors, arbitrarily placed inside the scattering medium, reflected the beam.

Figure 40:
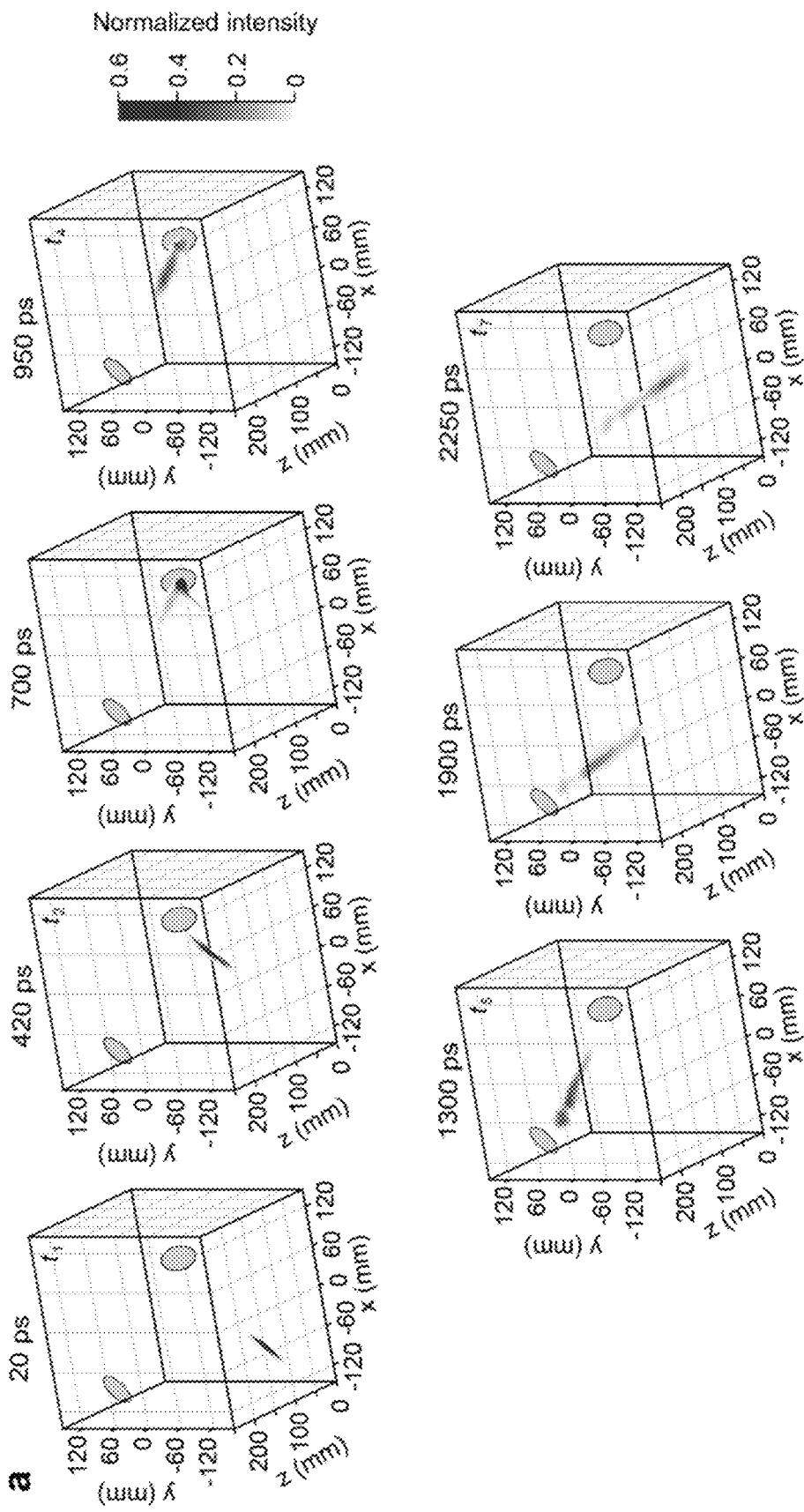
FIG. 40 depicts seven (7) representative frames of the ultra-short pulse in 3D space, imaged at 100 Gfps using the SP-CUP system, according to an implementation.

In the SP-CUP system, linear polarizers with its transmission angle aligned with that of the incident light were attached to Views 1, 3 and 4. No polarizers were attached to the other Views. FIG. 40 depicts seven (7) representative frames of the ultra-short pulse in 3D space, imaged at 100 Gfps using the SP-CUP system, according to an implementation. FIG. 40 shows the reconstructed light intensity in 3D space at seven representative frames (at 20 ps, 420 ps, 700 ps, 950 ps, 1300 ps, 1900 ps, and 2250 ps). The incident pulse was initially polarized along the y direction. A relative depth is used by setting the 600-mm depth as the origin. As shown, started by being short in time and narrow in space, the pulse becomes stretched gradually both temporally and spatially due to scattering from water vapor.

Figure 41:
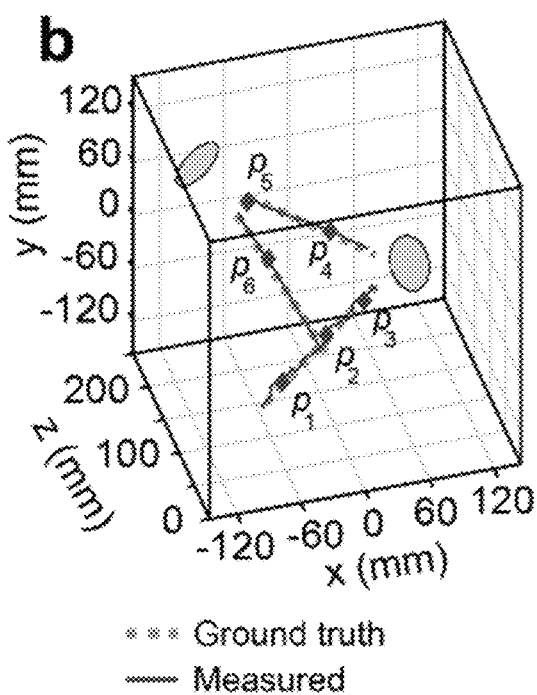
FIG. 41 depicts the traces of both reconstructed (solid line) and ground truth (dashed line) centroids of the pulse in 3D space, according to an implementation.
Figure 42:
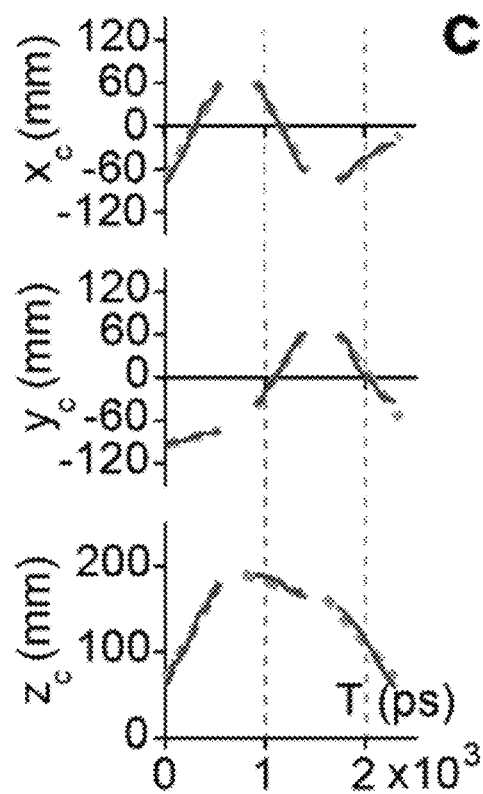
FIG. 42 depicts the traces of both reconstructed (solid line) and ground truth (dashed line) centroids of the pulse in three orthogonal spatial dimensions, according to an implementation.
Figure 43:
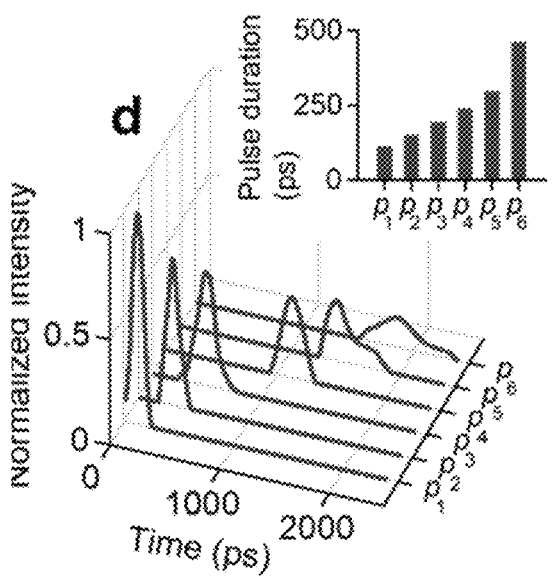
FIG. 43 depicts a plot of the evolutions of light intensity at six spatial locations ($p_1$-$p_6$) labeled as diamonds in FIG. 41, according to an implementation.
Figure 44:
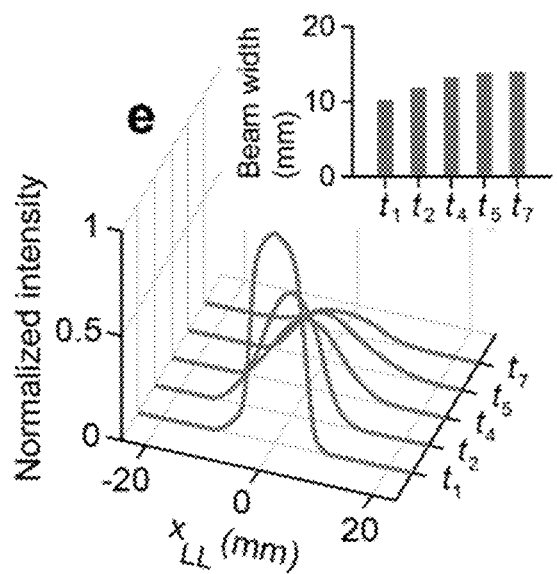
FIG. 44 depicts a plot of the cross sections of reconstructed beam intensity in local lateral dimension at five time points ($t_1$, $t_2$, $t_4$, $t_5$, and $t_7$) labeled in FIG. 41, according to an implementation.
Figure 45:
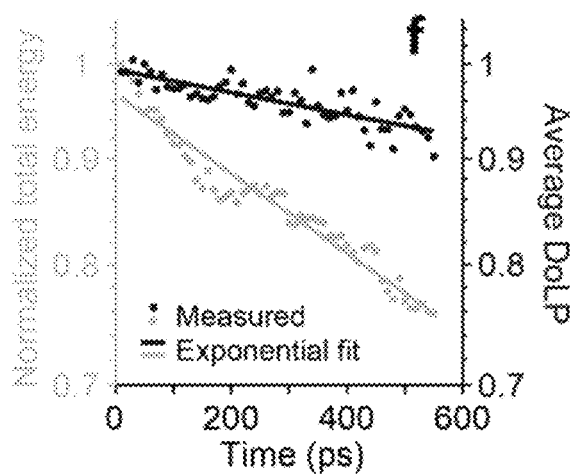
FIG. 45 depicts a plot of the reconstructed total intensity integrated over 3D space and reconstructed degree of linear polarization before the pulse was incident to the first mirror according to an implementation.

FIG. 41 depicts the traces of both reconstructed (solid line) and ground truth (dashed line) centroids of the pulse in 3D space, according to an implementation. FIG. 42 depicts the traces of both reconstructed (solid line) and ground truth (dashed line) centroids of the pulse in three orthogonal spatial dimensions, according to an implementation. FIG. 43 depicts a plot of the evolutions of light intensity at six spatial locations ($p_1$-$p_6$) labeled as diamonds in FIG. 41, according to an implementation. FIG. 44 depicts a plot of the cross sections of reconstructed beam intensity in local lateral dimension ($x_{LL}$) at five time points ($t_1$, $t_2$, $t_4$, $t_5$, and $t_7$) labeled in FIG. 41. The inset is the measured beam widths at these five time points. FIG. 45 depicts a plot of the reconstructed total intensity integrated over 3D space (left vertical axis) and reconstructed DoLP (right vertical axis) before the pulse was incident to the first mirror. Single-component exponential fits were applied to both data sets (solid lines). They are plotted in the log scale.

As shown in FIGS. 41 and 42, the 3D trace of the centroids of the reconstructed pulse is in good agreement with the ground truth. The root-mean-square error of the centroid's position is close to 1% of the FOV on the x and y axes and 1% of the maximum depth on the z axis (see, e.g., Section IV(B)(1)(a)). Only those frames in which light propagated in straight paths were plotted in FIGS. 41 and 42.

For quantitative analysis, in FIG. 43, the temporal profiles of light intensity at six selected spatial locations (labeled as $p_1$-$p_6$ in FIG. 41) are given. The corresponding pulse durations are quantified in the inset. The temporal profile at $p_1$ had a full-width-at-half-maximum of 110 ps since the pulse had already propagated some distance in the scattering medium before entering the FOV. The reconstructed pulse duration was gradually increased to 460 ps right before it exited the scattering medium, and it matched well with the direct streak camera measurement shown in FIGS. 49-51. The beam cross-sections and the corresponding beam widths at five frames (labeled as $t_1$, $t_2$, $t_4$, $t_5$, and $t_7$ in FIG. 40) are plotted in FIG. 44. The beam width was widened from 10 mm to 14 mm. The intensity of the pulse also decreased as expected. In addition, it was found that scattering destroyed linear polarization (See, e.g., FIG. 45). Due to mirror surface scattering and the fact that mirror reflection alters the polarization state of light, the first 550 ps of light propagation was only studied. Both total intensity and DoLP decreased over time (dots), and single-component exponential fits (solid lines) yielded decay constants of 2.5 ns and 9.1 ns, respectively.

Figure 46:
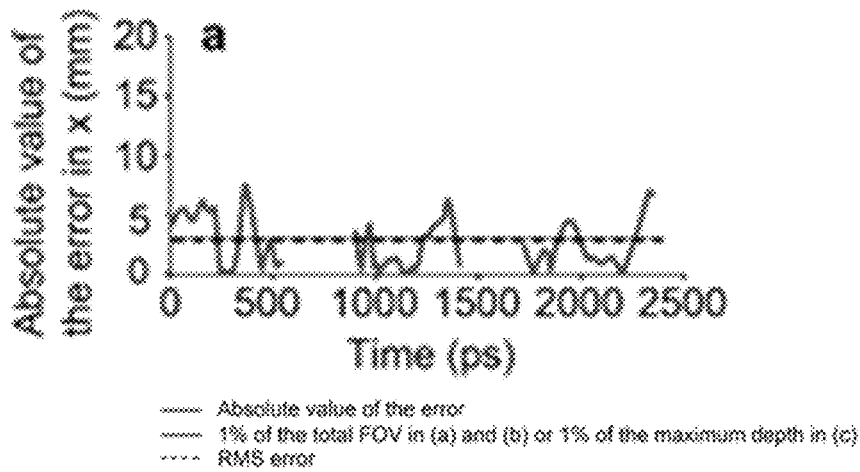
FIG. 46 is a plot of the absolute values of the errors of the pulse centroids x direction, according to an implementation.
Figure 47:
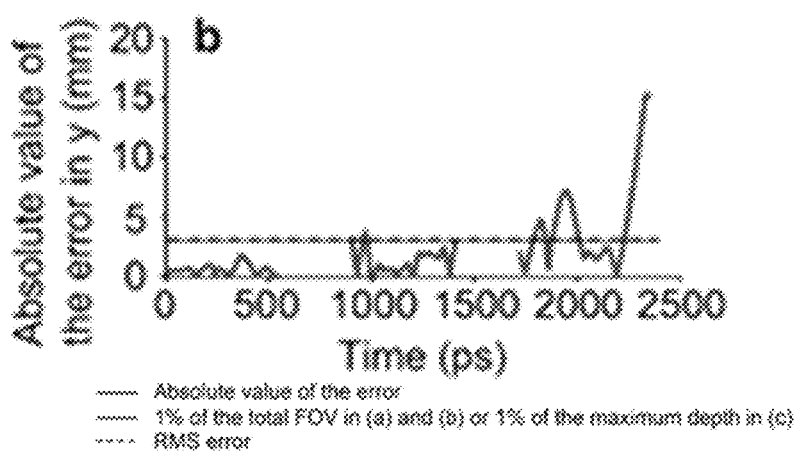
FIG. 47 is a plot of the absolute values of the errors of the pulse centroids y direction, according to an implementation.
Figure 48:
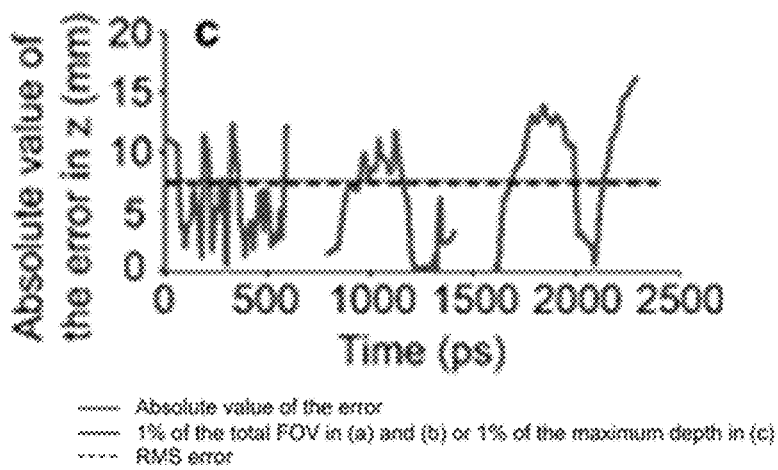
FIG. 48 is a plot of the absolute values of the errors of the pulse centroids z direction, according to an implementation.

FIG. 46 is a plot of the absolute values of the errors of the pulse centroids x direction, according to an implementation. FIG. 47 is a plot of the absolute values of the errors of the pulse centroids y direction, according to an implementation. FIG. 48 is a plot of the absolute values of the errors of the pulse centroids z direction, according to an implementation. The black dashed lines represent the root-mean-square (RMS) errors, which are 2.82 mm, 3.10 mm and 7.29 mm in x, y and z directions, respectively. The black solid straight horizontal lines lines represent 1% of the field of view (FOV) in FIGS. 46 and 47 and 1% of the maximum depth in FIG. 48.

Figure 49:
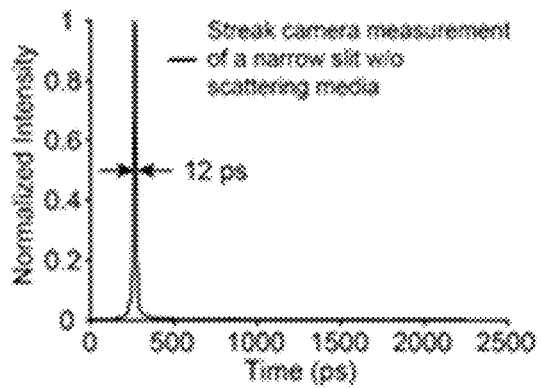
FIG. 49 is a plot of the intensity profile of the narrow slit when the pulse propagated without the scattering medium, according to an implementation.
Figure 50:
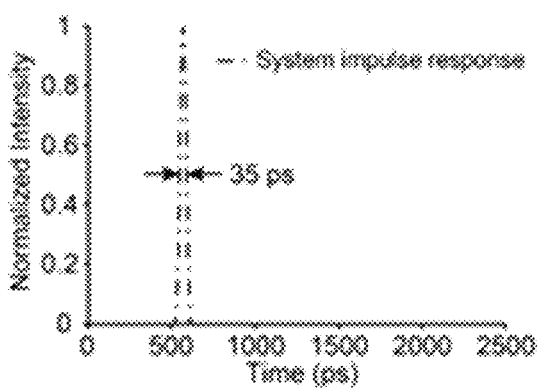
FIG. 50 is a plot of the reconstructed system impulse response of the SP-CUP system, according to an implementation.
Figure 51:
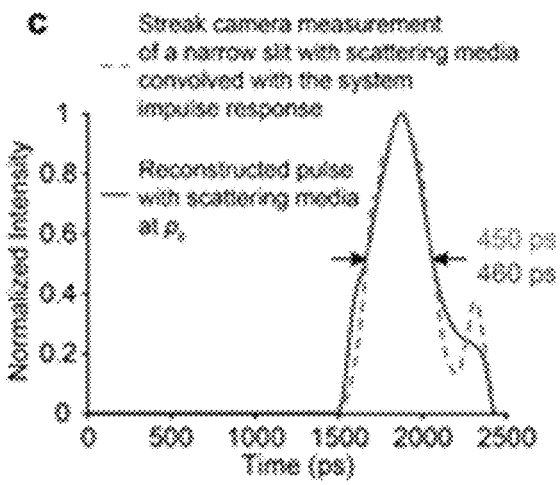
FIG. 51 is a graph of line plots of the imaged intensity evolution of the narrow slit illuminated by the pulse that propagated through the scattering medium, convolved with the system impulse response, according to an implementation.

To measure the pulse duration, the streak camera was used to directly image an incident 55-fs pulse with a 40-μm-wide entrance slit at 100 GHz sweeping speed. FIGS. 49-51 illustrate a comparison between the reconstructed and the directly measured pulse intensity profile in the time domain. FIG. 49 is a plot of the intensity profile of the narrow slit when the pulse propagated without the scattering medium. FIG. 50 is a plot of the reconstructed system impulse response of the SP-CUP system, according to an implementation. FIG. 51 is a graph of line plots of the imaged intensity evolution of the narrow slit illuminated by the pulse that propagated through the scattering medium, convolved with the system impulse response. The solid line is the reconstructed pulse intensity profile right before the pulse exited the scattering medium. SP-CUP and direct streak camera imaging were carried out at different times, but the density of the scattering medium remained the same.

Figure 52:
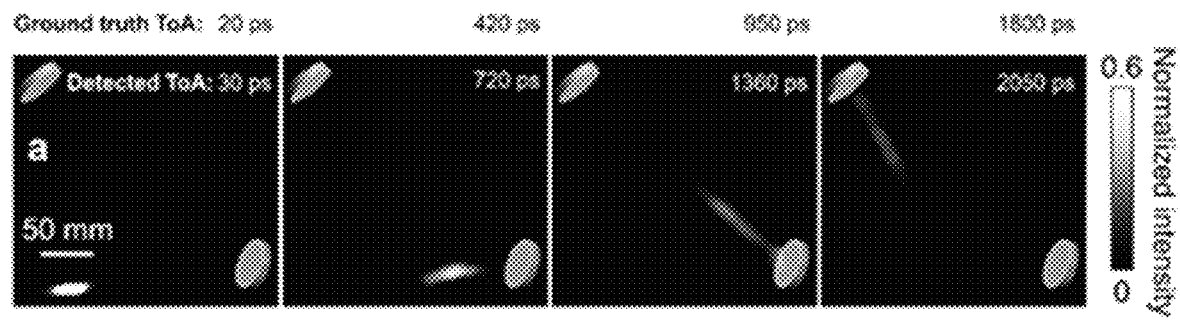
FIG. 52 depicts representative frames of a video (movie) acquired by the 2D CUP system for ultrafast imaging of a laser pulse propagating in a 3D scattering medium.
Figure 53:
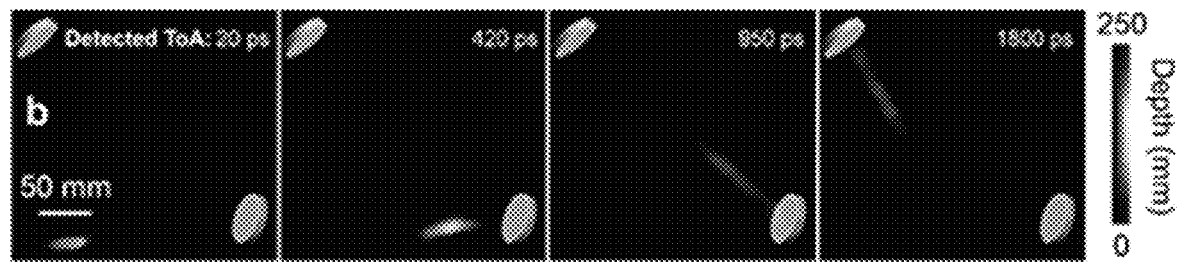
FIG. 53 depicts representative frames of a video (movie) acquired by the SP-CUP system of the laser pulse propagating in a 3D scattering medium, according to an implementation.
Figure 54:
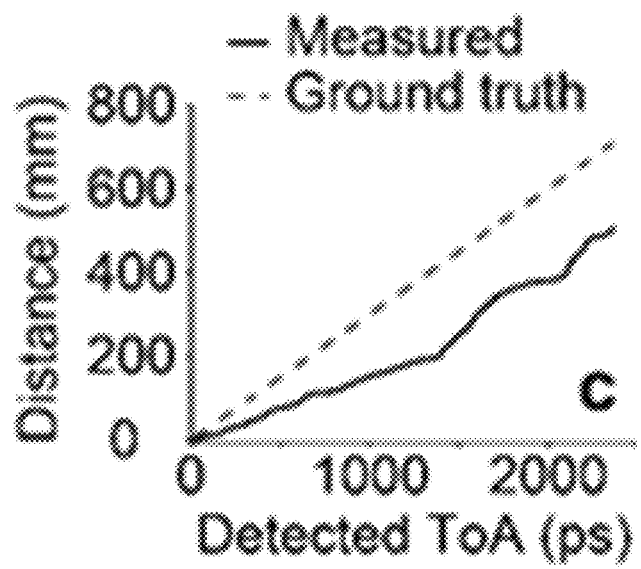
FIG. 54 is a plot of the measured speeds of light (solid lines) by tracing the centroids from the time-lapse laser pulse images captured by the 2D CUP system.
Figure 55:
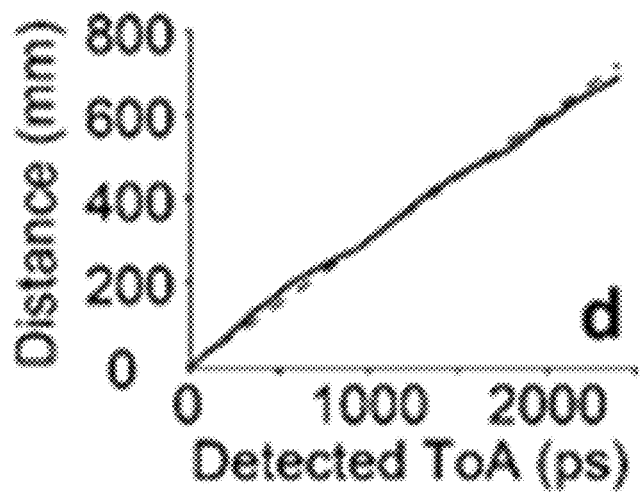
FIG. 55 is a plot of the measured speeds of light (solid lines) by tracing the centroids from the time-lapse laser pulse images captured by the SP-CUP system, according to an implementation.

FIGS. 52-55 illustrate a comparison between the convention CUP system and the SP-CUP system. FIG. 52 depicts representative frames of a video (movie) acquired by the 2D CUP system for ultrafast imaging of a laser pulse propagating in a 3D scattering medium. An example of the 2D CUP system can be found in Liang, J. et al., "Single-shot real-time video recording of photonic Mach cone induced by a scattered light pulse," Sci. Adv. 3, e1601814 (2017), which is hereby incorporated by reference in its entirety. FIG. 53 depicts representative frames of a video (movie) acquired by the SP-CUP system of the laser pulse propagating in a 3D scattering medium. FIG. 54 is a plot of the measured speeds of light (solid lines) by tracing the centroids from the time-lapse laser pulse images captured by the 2D CUP system. FIG. 55 is a plot of the measured speeds of light (solid lines) by tracing the centroids from the time-lapse laser pulse images captured by the SP-CUP system, according to an implementation. The ground truth (dashed lines) in FIGS. 54 and 55 show the distance-ToA relation using the known speed of light (i.e., $3\times10^8$ m/s). As shown, the SP-CUP system recorded the full evolution of pulse propagation with clearly resolved 3D spatial positions and correctly detected times of arrival.

C. Planar Ultrafast (x, y, t) Imaging

Figure 59:
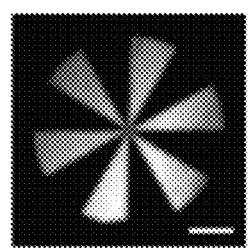
FIG. 59 is a frame of a static image of the spoke target, according to an implementation.
Figure 60:
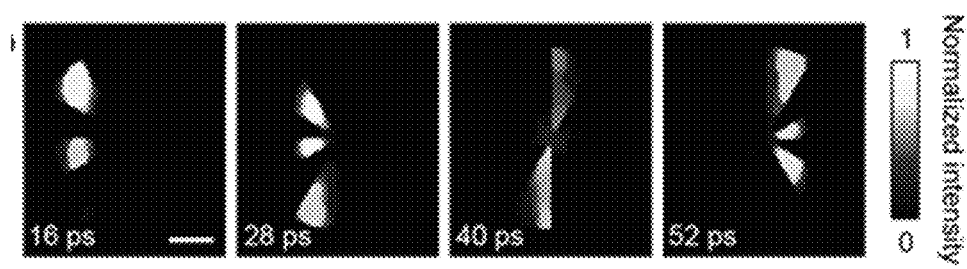
FIG. 60 are four representative frames from the reconstructed video from the SP-CUP system of the ultrashort laser pulse sweeping through the spoke target, imaged at 500 Gfps, according to an implementation.

To demonstrate the imaging versatility and capability of the SP-CUP systems, an SP-CUP system (e.g., an SP-CUP system similar to the SP-CUP system 200 shown in FIG. 2A but without polarization filters in views) was used to record frames (x, y, t) of a video of a dynamic scene using a picosecond laser pulse, with an incident angle of approximately 30°, sweeping through a spoke pattern. FIG. 59 is a frame of a static image of the spoke target, according to an implementation. The SP-CUP system captured a video of this dynamic scene with an imaging speed of 500 Gfps in a single shot (laser pulse). FIG. 60 are four representative frames from the reconstructed video from the SP-CUP system of the ultrashort laser pulse sweeping through the spoke target, imaged at 500 Gfps, according to an implementation. Three lossless views were used in the reconstruction (Views 1, 3, 4, 5 and 6). The result clearly shows the wavefront sweeping of the laser pulse across the spoke pattern. The scale bar is 10 mm in FIGS. 59 and 60.

Figure 61:
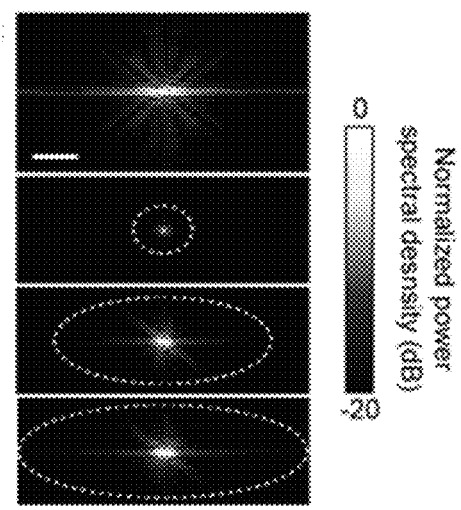
FIG. 61 is an illustration of the spatial bandwidths of the static spoke target in FIG. 59, the CUP reconstruction method, the LLE-CUP reconstruction method, and the SP-CUP reconstruction method, according to an aspect.
Figure 62:
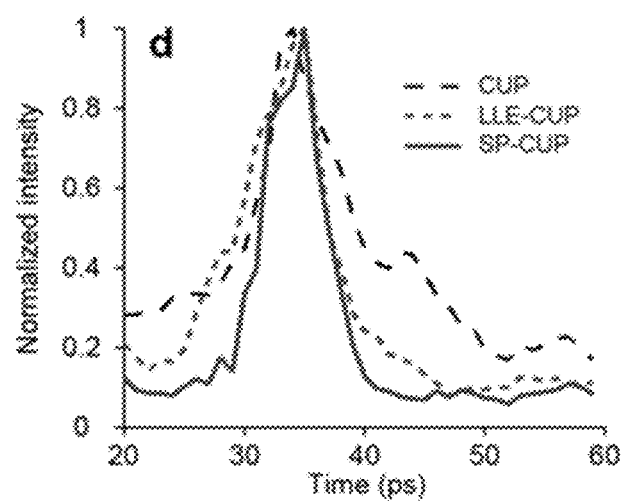
FIG. 62 is a plot of the temporal profiles from CUP, LLE-CUP, and SP-CUP systems, according to an aspect.

For comparison, three methods were used recover the dynamic scene: (I) a conventional CUP system (single-lossy-view, i.e. View 3), (II) a LLE-CUP system (two-lossless-view, i.e. View 1; View 3 merged with View 4), and (III) the SP-CUP system (three-lossless-view, i.e. View 1; View 3 merged with View 4; View 5 merged with View 6). For comparison, FIG. 61 is an illustration of the spatial bandwidths of the static spoke target in FIG. 59 ($1^{st}$ row), from the CUP (single lossy view, $2^{nd}$ row) reconstruction method, the LLE-CUP (two lossless views, $3^{rd}$ row) reconstruction method, and the SP-CUP (three lossless views, $4^{th}$ row) reconstruction method, according to an aspect. To quantitatively compare spatial resolutions in these reconstructed results, the (x, y, t) datacubes were projected onto the x-y plane by summing over the voxels along the temporal axis. The scale bar is 1 $mm^{-1}$ in FIG. 61. Then, these temporally integrated images were Fourier transformed for bandwidth analysis as shown in FIG. 61. FIG. 62 is a plot of the temporal profiles from CUP, LLE-CUP, and SP-CUP systems.

The results show that the LLE-CUP reconstruction widens the reconstructed spatial bandwidth by 3.6×, compared with the CUP reconstruction. In this example, the SP-CUP reconstruction further enhanced the bandwidth by 34%. In addition, to analyze the temporal resolution, the time course of a specific (x, y) location was examined (see, e.g., FIG. 62). In this example, the full-width-at-half-maximum (FWHM) of the temporal profile is improved to 6.1 ps by using SP-CUP system, compared with 7.5 ps in LLE-CUP and 8.8 ps in conventional CUP. Thus, this example of a SP-CUP system provides greater spatial and temporal resolutions than conventional CUP systems under a certain imaging speed.

D. SP-CUP Systems with Various Arrangements of Polarizers

Certain aspects pertain to SP-CUP system and/or methods that employ polarization sensing. System settings for four examples of SP-CUP systems with different arrangements of polarizers, according to various aspects, are provided in Table 2. Table 3 provides forward models for the four SP-CUP systems/methods with different arrangements of polarizers. These forward models are extensions of Eqn. 3. The spatial resolution and temporal resolution for these four SP-CUP systems under each setting are quantified in Table 5.

TABLE 2

| | View | | | | | |
|---|---|---|---|---|---|---|
| Experiment | 1 | 2 | 3 | 4 | 5 | 6 |
| Laser pulse sweeping across five letters | 0° | 45° | 0° | 0° | 45° | 45° |
| Plasma emission in LIB | 0° | 45° | 0° | NoP | 45° | NoP |
| Laser pulse sweeping across three shapes | 0° | 45° | 0° | 0° | 45° | 45° |
| Laser pulse propagating in a 3D scattering medium | 0° | NoP | 0° | 0° | NoP | NoP |

(3D: three-dimensional; LIB: laser-induced breakdown; NoP: No polarizer.)

TABLE 3

Laser pulse sweeping across five letters $$\begin{bmatrix} E_1 \\ E_3 \\ E_4 \end{bmatrix} = \begin{bmatrix} TF_1 \\ TSD_3F_3C_{[10]} \\ TSD_4F_4C_{[01]} \end{bmatrix} P_0 I(x, y, t, \psi) \text{ and}$$

$$\begin{bmatrix} E_2 \\ E_5 \\ E_6 \end{bmatrix} = \begin{bmatrix} R_dTF_2R_p \\ R_dTSD_3F_5C_{[10]}R_p \\ R_dTSD_4F_6C_{[01]}R_p \end{bmatrix} D_2 P_{45} I(x, y, t, \psi)$$

Plasma emission in LIB $$\begin{bmatrix} E_1 \\ E_3 \end{bmatrix} = \begin{bmatrix} TF_1 \\ TSD_3F_3C_{[10]} \end{bmatrix} P_0 I(x, y, t, \psi)$$

$$\begin{bmatrix} E_2 \\ E_5 \end{bmatrix} = \begin{bmatrix} R_dTF_2R_p \\ R_dTSD_3F_5C_{[10]}R_p \end{bmatrix} D_2 P_{45} I(x, y, t, \psi)$$

$$\begin{bmatrix} E_4 \\ E_6 \end{bmatrix} = \begin{bmatrix} TSD_4F_4C_{[01]} \\ R_dTSD_2D_4F_6C_{[01]}R_p \end{bmatrix} I(x, y, t, \psi)$$

Laser pulse sweeping across three shapes $$\begin{bmatrix} E_1 \\ E_3 \\ E_4 \end{bmatrix} = \begin{bmatrix} TF_1 \\ TSD_3F_3C_{[10]} \\ TSD_4F_4C_{[01]} \end{bmatrix} P_0 Z_R I(x, y, z, t, \psi)$$

$$\begin{bmatrix} E_2 \\ E_5 \\ E_6 \end{bmatrix} = \begin{bmatrix} R_dTF_2R_p \\ R_dTSD_3F_5C_{[10]}R_p \\ R_dTSD_4F_6C_{[01]}R_p \end{bmatrix} D_2 P_{45} Z_L I(x, y, z, t, \psi)$$

Laser pulse propagating in a 3D scattering medium $$\begin{bmatrix} E_1 \\ E_3 \\ E_4 \end{bmatrix} = \begin{bmatrix} TF_1 \\ TSD_3F_3C_{[10]} \\ TSD_4F_4C_{[01]} \end{bmatrix} P_0 Z_R I(x, y, z, t, \psi)$$

$$\begin{bmatrix} E_2 \\ E_5 \\ E_6 \end{bmatrix} = \begin{bmatrix} R_dTF_2R_p \\ R_dTSD_3F_5C_{[10]}R_p \\ R_dTSD_4F_6C_{[01]}R_p \end{bmatrix} D_2 Z_L I(x, y, z, t, \psi)$$

In general, SP-CUP's image reconstruction includes two parts. The first part of the reconstruction was to reconstruct the spatiotemporal datacubes. The second part was to retrieve the depth (z) and the polarization states, based on the reconstructed spatiotemporal frames (See, e.g., Table 4) and Section III.

TABLE 4

| Laser pulse sweeping across five letters | Plasma emission in LIB |
|---|---|
| $I_0(x, y, t) = P_0 I(x, y, t, \psi)$<br>$I_{45}(x, y, t) = P_{45} I(x, y, t, \psi)$ | $I_0(x, y, t) = P_0 I(x, y, t, \psi)$<br>$I_{45}(x, y, t) = P_{45} I(x, y, t, \psi)$ and<br>$I_{NoP}(x, y, t)$ |
| Laser pulse sweeping across three shapes medium | Laser pulse propagating in a 3D scattering |
| $I_0^R(x, y, t) = P_0 Z_R I(x, y, z, t, \psi)$, and<br>$I_{45}^L(x, y, t) = P_{45} Z_L I(x, y, z, t, \psi)$ | $I_0^R(x, y, t) = P_0 Z_R I(x, y, z, t, \psi)$,<br>and $I^L(x, y, t) = Z_L I(x, y, z, t, \psi)$ |

1. Quantification of the Spatial Resolution and Temporal Resolution and Signal-to-Noise Ratio for the Four SP-CUP Systems with Different Arrangements of Polarizers The spatial and temporal resolutions of the SP-CUP systems have been quantified for each configuration. A (x, y, t) dynamic scene: Two laser pulses, each with a full-width-at-half-maximum pulse width of 0.5 ps, sequentially illuminated through a transmissive spoke pattern was recorded. The time delay between the two pulses was tuned to quantify the temporal resolution, which is defined by applying the Rayleigh criterion 5 in the time domain. To calculate the spatial resolution, the (x, y, t) datacubes were projected onto the x-y plane by summing over the voxels along the temporal axis. Then, these temporally integrated images were Fourier transformed for bandwidth analysis. The cutoff bandwidth was defined as when the power spectral density drops to two times the standard deviation of the background. The signal-to-noise ratio of the captured raw data was calculated by dividing the peak intensity by the standard deviation of the background and then converting to dB. The results are summarized in

TABLE 5

| | Parameter | | | | | |
|---|---|---|---|---|---|---|
| Experiment | Imaging speed (Gfps) | Spatial resolution | | | Temporal resolution (ps) | Signal-to-noise ratio (dB) |
| | | x | y | z | | |
| Laser pulse sweeping across five letters | 250 | 2.67 mm | 4.44 mm | — | 19 | 29 |
| Plasma emission in LIB | 100 | 5.80 μm | 10.39 μm | — | 41 | 28 |
| Laser pulse sweeping across three shapes | 100 | 0.82 mm | 1.42 mm | 5.5 mm | 35 | 31 |
| Laser pulse propagating in a 3D scattering medium | 100 | 3.15 mm | 5.46 mm | 4.0 mm | 35 | 26 |

D. Example Applications for SP-CUP Systems and/or Methods of Certain Aspects

1. Laser-Induced Breakdown (LIB) Dynamics

In certain implementations, an SP-CUP system and/or method may have advantageous capabilities in imaging laser-induced breakdown (LIB) dynamics. Conventional techniques (e.g., LIB spectroscopy) measure LIB dynamics by integrating signals over space and time and by averaging over multiple laser shots, which may have measurement inaccuracy in many scenarios, including sample variations, changes of the physical and chemical properties of the sample surface, and laser-fluctuation-induced variations in plasma's characteristics. Examples of LIB spectroscopy may be found in Santos Jr, D. et al. Laser-induced breakdown spectroscopy for analysis of plant materials: a review. *Spectrochim. Acta B* 71, 3-13 (2012), Bonse, J., Bachelier, G., Siegel, J. & Solis, J., "Time- and space-resolved dynamics of melting, ablation, and solidification phenomena induced by femtosecond laser pulses in germanium," Phys. Rev. B 74, 134106 (2006), and Michel, A. P., "Applications of single-shot laser-induced breakdown spectroscopy," Spectrochim. Acta B 65, 185-191 (2010), which are hereby incorporated by reference in their entireties. To overcome these limitations, single-shot LIB imaging, time- and/or space-resolved LIB imaging and polarization-resolved LIB imaging have been developed individually. An example of time- and/or space-resolved LIB imaging may be found in Dikmelik, Y., McEnnis, C. & Spicer, J. B., "Femtosecond and nanosecond laser-induced breakdown spectroscopy of trinitrotoluene," Opt. Express 16, 5332-5337 (2008) and Hori, T. & Akamatsu, F., "Laser-Induced Breakdown Plasma Observed using a Streak Camera," Jpn. J. Appl. Phys. 47, 4759 (2008), which are hereby incorporated by reference in their entireties. An example of time polarization-resolved LIB imaging may be found in Zhao, Y., Singha, S., Liu, Y. & Gordon, R. J. "Polarization-resolved laser-induced breakdown spectroscopy," *Opt. Lett.* 34, 494-496 (2009), which is hereby incorporated by reference in its entirety. These developments suggest that leveraging all the information from space, time, and polarization in a single-shot acquisition appears to be an optimal LIB detection strategy. An example of imaging with temporal and spatial information may be found in Corsi, M. et al., "Temporal and spatial evolution of a laser-induced plasma from a steel target," *Appl. Spectrosc.* 57, 715-721 (2003), which is hereby incorporated by reference in its entirety.

Certain aspects of SP CUP systems and/or methods may resolve transient light intensity and polarization evolutions in space (See, e.g., FIGS. 15-20). In certain aspects, SP-CUP systems and/or methods may improve measurement accuracy and expand application scope of LIB imaging, particularly in composition analysis in organic chemistry and biology in which multi-shot LIB techniques may fall short due to easy degradation of chromophores by repeated irradiation of photons. Some examples of LIP applications may be found in De Lucia Jr, F. C., Gottfried, J. L., Munson, C. A. & Miziolek, A. W., "Current status of standoff LIBS security applications at the United States Army Research Laboratory (2009), Markiewicz-Keszycka, M. et al., "Laser-induced breakdown spectroscopy (LIBS) for food analysis: a review," Trends Food Sci. Technol. 65, 80-93 (2017), Gorkič, A., Kovačič, D. & Diaci, J., "Analysis of sonic waves generated during laser engraving of printed circuits," Int. J. Adv. Manuf. Technol. 42, 138 (2009), and Tong, T., Li, J. & Longtin, J. P., "Real-time control of ultrafast laser micromachining by laser-induced breakdown spectroscopy, Appl. Opt. 43, 1971-1980 (2004), which are hereby incorporated by reference in their entireties.

2. Polarized Emission from Early-Stage Plasma Polarized Emission in LIB

There is also interest in exploring the origin of polarized emission in LIB as may be discussed in De Giacomo, A. & Hermann, J. "Laser-induced plasma emission: from atomic to molecular spectra," J. Phys. D 50, 183002 (2017), which is hereby incorporated by reference in its entirety. Various theoretical models have been established to deduce possible sources of the observed polarization. Some examples of these models may be found in Astapenko, V., Bureyeva, L. & Lisitsa, V., "Polarization mechanism for bremsstrahlung and radiative recombination in a plasma with heavy ions," Plasma Phys. Rep. 28, 303-311 (2002) and Milchberg, H. & Weisheit, J., "Polarization of recombination radiation from nonequilibrium plasmas," Phys. Rev. A 26, 1023 (1982), which are hereby incorporated by reference in their entireties.

Among them, the theory based on an anisotropic electron distribution hypothesizes polarized emission on a picosecond time scale, followed by a decreased polarization over time as plasma comes to a steady state. Previous research, utilizing systems of nanosecond temporal resolution 54, could not distinguish the plasma emission in such an early stage. An example of utilizing systems of nanosecond temporal resolution may be found in Penczak Jr, J. S., Liu, Y., Schaller, R. D., Rich, D. H. & Gordon, R. J., "The mechanism for continuum polarization in laser induced breakdown spectroscopy of Si (111)," Spectrochim. Acta B 74, 3-10 (2012), which is hereby incorporated by reference in its entirety.

In contrast, the SP-CUP systems and methods of certain implementations have picosecond-level temporal resolution, and have been used to directly observe decreased DoLP of the plasma emission in the early stage (i.e., 0-3 ns). Furthermore, with the SP-CUP systems and methods, it was observed that the AoP of the emission is approximately aligned with that of the incident femtosecond pulse. The results suggest that the plasma emission is likely determined jointly by the excitation pulse's properties and the electron distribution in the plasma. Examples of discussion regarding laser-induced breakdown plasma emission may be found at Aghababaei Nejad, M., Soltanolkotabi, M. & Eslami Majd, A., "Polarization investigation of laser-induced breakdown plasma emission from Al, Cu, Mo, W, and Pb elements using nongated detector," J. Laser Appl. 30, 022005 (2018) and Majd, A. E., Arabanian, A. & Massudi, R., "Polarization resolved laser induced breakdown spectroscopy by single shot nanosecond pulsed Nd: YAG laser," Opt. Laser Eng. 48, 750-753 (2010), which are hereby incorporated by reference in their entireties.

3. Studying Transient Phenomena in Marine Biology

Certain aspects pertain to SP-CUP systems and methods that can perform real-time stereo-polarimetric ultrafast [i.e., (x, y, z, t, ψ)] imaging in a scattering medium. These SP-CUP systems and methods may have particular application for in situ studies of sonoluminescence produced by snapping shrimps. An example of in situ studies of sonoluminescence produced by snapping shrimps may be found in Qian, Z. et al., "Structure, mechanical properties and surface morphology of the snapping shrimp claw," J. Mater. Sci. 53, 10666-10678 (2018), which is hereby incorporated by reference in its entirety. The intense flash of light, generated by violent collapse of bubbles, has a duration less than 10 ns while underwater visibility degrades quickly with increasing distance between the camera and objects. An example of discussion regarding the duration of the bubbles can be found in Lohse, D., Schmitz, B. & Versluis, M. Snapping shrimp make flashing bubbles. Nature 413, 477 (2001), which is hereby incorporated by reference in its entirety. Thus far, the underlying physics of this transient luminescence remains elusive, despite many theoretical efforts in sonochemistry and fluid or plasma physics. An example of discussion of theoretical efforts in sonochemistry may be found in Brenner, M. P., Hilgenfeldt, S. & Lohse, D., "Single-bubble sonoluminescence," Rev. Mod. Phys. 74, 425 (2002), which is hereby incorporated by reference in its entirety.

In certain aspects, the stereo vision and polarization imaging from SP-CUP systems and/or methods could suppress scattering in 3D ranging, which is highly desired for undisturbed in situ observation. An example of using stereo vision and polarization may be found Sarafraz, A., Negandaripour, S. & Schechner, Y. Y., "Enhancing images in scattering media utilizing stereovision and polarization," 2009 Workshop on Applications of Computer Vision (WACV) 1-8, which is hereby incorporated by reference in its entirety.

4. General Applicability

Certain aspects of SP-CUP systems and/or methods may provide the world's fastest single-shot high-dimensional imaging modality to date. In certain implementations, SP-CUP systems and/or methods have an imaging speed up to 250 Gfps, a sequence depth up to 300 frames, and a (x, y) pixel count of 0.3 megapixels (500×600 pixels) per frame. Moreover, by deploying different polarization components in different projected views (e.g., one or more views of Views 1-6), the AoP and DoLP may be measured. Finally, certain aspects of SP-CUP systems and/or methods adopt stereoscopy enabling simultaneous extraction of five photon tags (x, y, z, t, ψ) from the compressively acquired snapshots. Collectively, the SP-CUP systems and/or methods of certain implementations may feature high light throughput, high spatial and temporal resolutions, and a large sequence depth, as well as its attractive ability to image non-repeatable and difficult-to-reproduce high-dimensional transient events.

In one aspect, a SP-CUP method may include algorithms based on deep neural networks to improve the speed of high-dimensional reconstruction while retaining the reconstruction fidelity. Some examples of deep neural networks may be found in Yang, C. et al., "Optimizing codes for compressed ultrafast photography by the genetic algorithm," Optica 5, 147-151 (2018) and Zhu, B., Liu, J. Z., Cauley, S. F., Rosen, B. R. & Rosen, M. S., "Image reconstruction by domain-transform manifold learning" Nature 555, 487 (2018), which are hereby incorporated by reference in their entireties.

Modifications, additions, or omissions may be made to any of the above-described embodiments without departing from the scope of the disclosure. Any of the embodiments described above may include more, fewer, or other features without departing from the scope of the disclosure. Additionally, the steps of described features may be performed in any suitable order without departing from the scope of the disclosure. Also, one or more features from any embodiment may be combined with one or more features of any other embodiment without departing from the scope of the disclosure. The components of any embodiment may be integrated or separated according to particular needs without departing from the scope of the disclosure.

It should be understood that certain aspects described above can be implemented in the form of logic using computer software in a modular or integrated manner. Based on the disclosure and teachings provided herein, a person of ordinary skill in the art will know and appreciate other ways and/or methods to implement the present invention using hardware and a combination of hardware and software.

Any of the software components or functions described in this application, may be implemented as software code using any suitable computer language and/or computational software such as, for example, Java, C, C#, C++ or Python, LabVIEW, Mathematica, or other suitable language/computational software, including low level code, including code written for field programmable gate arrays, for example in VHDL. The code may include software libraries for functions like data acquisition and control, motion control, image acquisition and display, etc. Some or all of the code may also run on a personal computer, single board computer, embedded controller, microcontroller, digital signal processor, field programmable gate array and/or any combination thereof or any similar computation device and/or logic device(s). The software code may be stored as a series of instructions, or commands on a CRM such as a random access memory (RAM), a read only memory (ROM), a magnetic medium such as a hard-drive or a floppy disk, or an optical medium such as a CD-ROM, or solid stage storage such as a solid state hard drive or removable flash memory device or any suitable storage device. Any such CRM may reside on or within a single computational apparatus, and may be present on or within different computational apparatuses within a system or network. Although the foregoing disclosed embodiments have been described in some detail to facilitate understanding, the described embodiments are to be considered illustrative and not limiting. It will be apparent to one of ordinary skill in the art that certain changes and modifications can be practiced within the scope of the appended claims.

The terms "comprise," "have" and "include" are open-ended linking verbs. Any forms or tenses of one or more of these verbs, such as "comprises," "comprising," "has," "having," "includes" and "including," are also open-ended. For example, any method that "comprises," "has" or "includes" one or more steps is not limited to possessing only those one or more steps and can also cover other unlisted steps. Similarly, any composition or device that "comprises," "has" or "includes" one or more features is not limited to possessing only those one or more features and can cover other unlisted features.

All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the present disclosure and does not pose a limitation on the scope of the present disclosure otherwise claimed. No language in the specification should be construed as indicating any non-claimed element essential to the practice of the present disclosure.

Groupings of alternative elements or embodiments of the present disclosure disclosed herein are not to be construed as limitations. Each group member can be referred to and claimed individually or in any combination with other members of the group or other elements found herein. One or more members of a group can be included in, or deleted from, a group for reasons of convenience or patentability. When any such inclusion or deletion occurs, the specification is herein deemed to contain the group as modified thus fulfilling the written description of all Markush groups used in the appended claims.

What is claimed is:

1. A stereo-polarimetric compressed ultrafast photography (SP-CUP) system, comprising:
    a dual-channel subsystem configured to receive light scattered by a subject being imaged and pass light as a first series of images and a second series of images rotated with respect to the first series of images;
    a first camera configured to receive light relayed from the dual-channel subsystem and record raw images of a first view and a second view;
    a spatial-encoding subsystem configured to (i) receive light relayed from the dual-channel subsystem, (ii) spatially encode the first series of images with a first set of complementary patterns to generate a third series of spatially-encoded images and a fourth series of spatially-encoded images, and (iii) spatially encode the second series of images with a second set of complementary patterns to generate a fifth series of spatially-encoded images and a sixth series of spatially-encoded images; and
    a streak camera configured to (i) receive light relayed from the spatial-encoding subsystem, (ii) temporally shear each spatially-encoded image of the third series of spatially-encoded images and spatiotemporally integrate the temporally sheared images to record at a third view, (iii) temporally shear each spatially-encoded image of the fourth series of spatially-encoded images and spatiotemporally integrate the temporally sheared images to record a fourth view, (iv) temporally shear each spatially-encoded image of the fifth series of spatially-encoded images and spatiotemporally integrate the temporally sheared images to record a fifth view, (v) temporally shear each spatially-encoded image of the sixth series of spatially-encoded images and spatiotemporally integrate the temporally sheared images to record a sixth view.

2. The SP-CUP system of claim 1, further comprising one or more polarizers inserted in at least one of the first view, the second view, the third view, the fourth view, the fifth view, and the sixth view.

3. The SP-CUP system of claim 2, further comprising a computing device in electrical communication with the first camera and the streak camera to receive image data, wherein the computing device is configured to reconstruct a series of stereo-polarimetric images using image data from one or more of the first view, the second view, the third view, the fourth view, the fifth view, and the sixth view.

4. The SP-CUP system of claim 3, wherein the series of stereo-polarimetric images is at a frame rate of about 10 trillion frames per second.

5. The SP-CUP system of claim 2, further comprising a computing device in electrical communication with the first camera and the streak camera to receive image data, wherein the computing device is configured to reconstruct a plurality of images using image data of one or more of the first view, the second view, the third view, the fourth view, the fifth view, and the sixth view, wherein the plurality of images reconstructed are one of stereo-polarimetric images, plano-polarimetric images, and planar images.

6. The SP-CUP system of claim 1, wherein the streak camera is configured to temporally shear each spatially-encoded image by deflecting a distance according to time-of arrival.

7. The SP-CUP system of claim 1, wherein the streak camera comprises an entrance slit that is in a fully opened position while light is received from the spatial-encoding subsystem.

8. The SP-CUP system of claim 1, further comprising a pulsed laser configured to illuminate the subject being imaged with a single light pulse during image acquisition by the first camera and the streak camera.

9. The SP-CUP system of claim 1, wherein the dual-channel subsystem comprises at least one optical component configured to receive light and generate a first component relayed to the first camera and a second component relayed to the spatial-encoding subsystem.

10. The SP-CUP system of claim 1, wherein the dual-channel subsystem comprises at least one optical component configured to rotate the first view and/or the second view such that the first view is rotated by 180° in image coordinates relative to the second view.

11. The SP-CUP system of claim 10, wherein the at least one optical component comprises a pair of dove prisms.

12. The SP-CUP system of claim 1, wherein at least one of the first set of complementary patterns and the second set of complementary patterns is a pseudo-random binary spatial pattern.

13. The SP-CUP system of claim 1, wherein the spatial-encoding subsystem comprises a digital micromirror device.

14. The SP-CUP system of claim 13, wherein the digital micromirror device comprises an array of micromirrors, each micromirror operable to be in a first position to reflect light at a first reflection angle or in a second position to reflect light at a second reflection angle.

15. The SP-CUP system of claim 14, wherein the spatial-encoding subsystem receives a first light beam at a first region and a second light beam at a second region from the dual-channel subsystem;
wherein the third series of spatially-encoded images includes portions of the first series of images reflected by micromirrors in the first region that are in the first position;
wherein the fourth series of spatially-encoded images includes portions of the first series of images reflected by micromirrors in the first region that are the second position;
wherein the fifth series of spatially-encoded images includes portions of the second series of images reflected by micromirrors in the second region that are in the first position; and
wherein the sixth series of spatially-encoded images includes portions of the second series of images reflected by micromirrors in the second region that are the second position.

16. The SP-CUP system of claim 1, further comprising front optics configured to collect light scattered by the subject being imaged and relay light to the dual-channel subsystem.

17. A stereo-polarimetric compressed ultrafast photography (SP-CUP) method, comprising:
rotating a first series of images and/or a second series of images with respect to each other;
record the first series of images of a first view and the second series of images of a second view;
spatially encoding the first series of images with a first set of complementary pseudo-random binary spatial patterns to generate a third series of spatially-encoded images and a fourth series of spatially-encoded images;
spatially encoding the second series of images with a second set of complementary pseudo-random binary spatial patterns to generate a fifth series of spatially-encoded images and a sixth series of spatially-encoded images;
temporally shearing each spatially-encoded image of the third series of spatially-encoded images, spatiotemporally integrating the temporally sheared images, and recording a third view;
temporally shearing each spatially-encoded image of the fourth series of spatially-encoded images, spatiotemporally integrating the temporally sheared images, and recording a fourth view;
temporally shearing each spatially-encoded image of the fifth series of spatially-encoded images, spatiotemporally integrating the temporally sheared images, and recording a fifth view; and
temporally shearing each spatially-encoded image of the sixth series of spatially-encoded images, spatiotemporally integrating the temporally sheared images, and recording a sixth view.

18. The SP-CUP method of claim 17, further comprising polarizing light of at least one of the first view, the second view, the third view, the fourth view, the fifth view, and the sixth view.

19. The SP-CUP method of claim 18, further comprising reconstructing a series of stereo-polarimetric images using image data recorded from the first view, the second view, the third view, the fourth view, the fifth view, and the sixth view.

20. The SP-CUP method of claim 19, wherein the series of stereo-polarimetric images is at a frame rate of about 10 trillion frames per second.

21. The SP-CUP method of claim 18, wherein temporal shearing and spatiotemporally integrating is performed by a streak camera with an entrance slit in a fully opened position.

* * * * *